US008368749B2

(12) United States Patent  (10) Patent No.: US 8,368,749 B2
Lambdin et al.  (45) Date of Patent: Feb. 5, 2013

(54) ARTICLE INSPECTION APPARATUS

(75) Inventors: Thomas Eldred Lambdin, Auburn, NY (US); Bradford Morse, Syracuse, NY (US); Clark A. Bendall, Syracuse, NY (US); Edward B. Hubben, Skaneateles, NY (US); Thomas W. Karpen, Skaneateles, NY (US); Bruce A. Pellegrino, Far Hills, NJ (US)

(73) Assignee: GE Inspection Technologies LP, Schenectady, NY (US)

( * ) Notice: Subject to any disclaimer, the term of this patent is extended or adjusted under 35 U.S.C. 154(b) by 1548 days.

(21) Appl. No.: 11/645,082

(22) Filed: Dec. 22, 2006

(65) Prior Publication Data

US 2007/0226258 A1 Sep. 27, 2007

Related U.S. Application Data

(60) Provisional application No. 60/786,829, filed on Mar. 27, 2006.

(51) Int. Cl.
*H04N 7/18* (2006.01)

(52) U.S. Cl. ......................................................... 348/92

(58) Field of Classification Search .................. None
See application file for complete search history.

(56) References Cited

U.S. PATENT DOCUMENTS

| | | | |
|---|---|---|---|
| 2,524,651 A | 10/1950 | Cooley | |
| 2,949,071 A | 8/1960 | Foures | |
| 3,561,432 A | 2/1971 | Yamaki et al. | |
| 4,042,823 A | 8/1977 | Decker et al. | |
| 4,078,864 A | 3/1978 | Howell | |
| 4,139,822 A | 2/1979 | Urich et al. | |
| 4,253,447 A | 3/1981 | Moore et al. | |
| 4,261,344 A | 4/1981 | Moore et al. | |
| 4,298,312 A | 11/1981 | MacKenzie et al. | |
| RE31,289 E | 6/1983 | Moore et al. | |
| RE31,290 E | 6/1983 | Moore et al. | |
| 4,557,598 A | 12/1985 | Ono et al. | |
| 4,573,450 A | 3/1986 | Arakawa | |
| 4,576,147 A | 3/1986 | Hashiguchi | |
| 4,588,294 A | 5/1986 | Siegmund | |
| 4,621,284 A | 11/1986 | Nishioka et al. | |

(Continued)

FOREIGN PATENT DOCUMENTS

| | | |
|---|---|---|
| DE | 10305384 | 8/2004 |
| EP | 1447770 | 8/2004 |
| JP | 2004243516 | 9/2004 |
| WO | WO-2005020577 A1 | 3/2005 |
| WO | 2005124594 A1 | 12/2005 |
| WO | 20050124594 A1 | 12/2005 |
| WO | WO-2005124594 | 12/2005 |

OTHER PUBLICATIONS

GE Inspection Technologies, "Krautkramer UltraLog, Organized Spot Weld Inspection-Custom Package Solution" GEInspection Technologies.com, 1 page, 2004.

(Continued)

*Primary Examiner* — Sath V Perungavoor
*Assistant Examiner* — Christopher Findley
(74) *Attorney, Agent, or Firm* — Global Patent Operation; Catherine J. Toppin

(57) ABSTRACT

An inspection apparatus can be operated to collect files during performance of an inspection. An inspection apparatus can associate metadata to a collected file. In one embodiment metadata associated with a collected file can include an article identifier. In one embodiment metadata that is associated with a collected file can include data input into an inspection apparatus by an inspector. In one embodiment metadata that is associated with a collected media file can include sensor output data. An inspection apparatus in one embodiment can include an application guiding an inspector in the performance of an inspection.

12 Claims, 28 Drawing Sheets

U.S. PATENT DOCUMENTS

| | | | |
|---|---|---|---|
| 4,621,618 | A | 11/1986 | Omagari |
| 4,651,201 | A | 3/1987 | Schoolman |
| 4,656,508 | A | 4/1987 | Yokota |
| 4,659,195 | A | 4/1987 | D'Amelio et al. |
| 4,667,656 | A | 5/1987 | Yabe |
| 4,700,693 | A | 10/1987 | Lia et al. |
| 4,727,859 | A | 3/1988 | Lia |
| 4,733,937 | A | 3/1988 | Lia et al. |
| 4,735,501 | A | 4/1988 | Ginsburgh et al. |
| 4,787,369 | A | 11/1988 | Allred, III et al. |
| 4,790,294 | A | 12/1988 | Allred, III et al. |
| 4,794,912 | A | 1/1989 | Lia |
| 4,796,607 | A | 1/1989 | Allred, III et al. |
| 4,827,909 | A | 5/1989 | Kato et al. |
| 4,862,253 | A | 8/1989 | English et al. |
| 4,862,873 | A | 9/1989 | Yajima et al. |
| 4,887,154 | A | 12/1989 | Wawro et al. |
| 4,909,600 | A | 3/1990 | Ciarlei et al. |
| 4,913,369 | A | 4/1990 | Lia et al. |
| 4,926,257 | A | 5/1990 | Miyazaki |
| 4,941,454 | A | 7/1990 | Wood et al. |
| 4,941,456 | A | 7/1990 | Wood et al. |
| 4,962,751 | A | 10/1990 | Krauter |
| 4,979,498 | A | 12/1990 | Oneda et al. |
| 4,980,763 | A | 12/1990 | Lia |
| 4,989,581 | A | 2/1991 | Tamburrino et al. |
| 4,998,182 | A | 3/1991 | Krauter et al. |
| 5,010,876 | A | 4/1991 | Henley et al. |
| 5,014,515 | A | 5/1991 | Krauter |
| 5,014,600 | A | 5/1991 | Krauter et al. |
| 5,018,436 | A | 5/1991 | Evangelista et al. |
| 5,018,506 | A | 5/1991 | Danna et al. |
| 5,019,121 | A | 5/1991 | Krauter |
| 5,045,935 | A | 9/1991 | Kikuchi |
| 5,047,848 | A | 9/1991 | Krauter |
| 5,052,803 | A | 10/1991 | Krauter |
| 5,061,995 | A | 10/1991 | Lia et al. |
| 5,066,122 | A | 11/1991 | Krauter |
| 5,070,401 | A | 12/1991 | Salvati et al. |
| 5,114,636 | A | 5/1992 | Evangelista et al. |
| 5,140,319 | A | 8/1992 | Riordan |
| 5,140,975 | A | 8/1992 | Krauter |
| 5,191,879 | A | 3/1993 | Krauter |
| 5,202,758 | A | 4/1993 | Tamburrino |
| 5,203,319 | A | 4/1993 | Danna et al. |
| 5,222,477 | A | 6/1993 | Lia |
| 5,275,152 | A | 1/1994 | Krauter et al. |
| 5,278,642 | A | 1/1994 | Danna et al. |
| 5,314,070 | A | 5/1994 | Ciarlei |
| 5,323,899 | A | 6/1994 | Strom et al. |
| 5,335,662 | A | 8/1994 | Kimura et al. |
| 5,345,339 | A | 9/1994 | Knieriem et al. |
| 5,347,989 | A | 9/1994 | Monroe et al. |
| 5,365,331 | A | 11/1994 | Tamburrino et al. |
| 5,373,317 | A | 12/1994 | Salvati et al. |
| D358,471 | S | 5/1995 | Cope et al. |
| 5,435,296 | A | 7/1995 | Vivenzio et al. |
| 5,633,675 | A | 5/1997 | Danna et al. |
| 5,701,155 | A | 12/1997 | Wood et al. |
| 5,734,418 | A | 3/1998 | Danna |
| 5,751,341 | A | 5/1998 | Chaleki et al. |
| 5,754,313 | A | 5/1998 | Pelchy et al. |
| 5,857,963 | A | 1/1999 | Pelchy et al. |
| 5,895,350 | A | 4/1999 | Hori |
| 5,911,036 | A | 6/1999 | Wright et al. |
| 5,941,818 | A | 8/1999 | Hori et al. |
| 5,966,168 | A | 10/1999 | Miyazaki |
| 5,989,185 | A | 11/1999 | Miyazaki |
| 6,066,090 | A | 5/2000 | Yoon |
| 6,083,152 | A | 7/2000 | Strong |
| 6,097,848 | A | 8/2000 | Salvati |
| 6,139,490 | A | 10/2000 | Breidenthal et al. |
| 6,221,007 | B1 | 4/2001 | Green |
| 6,432,046 | B1 | 8/2002 | Yarush et al. |
| 6,468,201 | B1 | 10/2002 | Burdick |
| 6,471,642 | B1 | 10/2002 | Igarashi |
| 6,483,535 | B1 | 11/2002 | Tamburrino et al. |
| 6,487,479 | B1 | 11/2002 | Nelson |
| 6,494,739 | B1 | 12/2002 | Vivenzio et al. |
| 6,538,732 | B1 | 3/2003 | Drost et al. |
| D473,306 | S | 4/2003 | Motoki et al. |
| 6,590,470 | B1 | 7/2003 | Burdick |
| 6,614,872 | B2 | 9/2003 | Bueno et al. |
| 6,668,272 | B1 | 12/2003 | Keller et al. |
| 6,697,794 | B1 | 2/2004 | Milby |
| 6,697,805 | B1 | 2/2004 | Choquier et al. |
| 6,746,164 | B1 | 6/2004 | Albright et al. |
| 6,758,403 | B1 | 7/2004 | Keys et al. |
| 6,763,175 | B1 | 7/2004 | Trottier et al. |
| 6,764,009 | B2 | 7/2004 | Melick et al. |
| 6,772,098 | B1 | 8/2004 | Stark et al. |
| 6,772,947 | B2 | 8/2004 | Shaw |
| 6,830,545 | B2 | 12/2004 | Bendall |
| 6,834,807 | B2 | 12/2004 | Ehrhart et al. |
| 6,908,034 | B2 | 6/2005 | Alleshouse |
| 6,942,151 | B2 | 9/2005 | Ehrhart |
| 6,950,829 | B2 | 9/2005 | Schlabach et al. |
| 6,953,432 | B2 | 10/2005 | Schiefer |
| 6,982,763 | B2 | 1/2006 | Perry |
| 7,111,787 | B2 | 9/2006 | Ehrhart |
| 7,134,993 | B2 | 11/2006 | Lia et al. |
| 7,321,673 | B2 | 1/2008 | Watai et al. |
| 7,346,221 | B2 | 3/2008 | Chanas et al. |
| 7,832,638 | B2 * | 11/2010 | Wetzel et al. .................. 235/385 |
| 2002/0128790 | A1 | 9/2002 | Woodmansee |
| 2002/0172498 | A1 | 11/2002 | Esenyan et al. |
| 2003/0004397 | A1 | 1/2003 | Kameya et al. |
| 2003/0097042 | A1 | 5/2003 | Eino |
| 2003/0105565 | A1 | 6/2003 | Loda et al. |
| 2003/0128400 | A1 | 7/2003 | Watai et al. |
| 2004/0064323 | A1 | 4/2004 | Kemper et al. |
| 2004/0183900 | A1 | 9/2004 | Karpen et al. |
| 2004/0189631 | A1 | 9/2004 | Kazi et al. |
| 2004/0193016 | A1 | 9/2004 | Root et al. |
| 2004/0215413 | A1 | 10/2004 | Weldum et al. |
| 2004/0223649 | A1 | 11/2004 | Zacks et al. |
| 2004/0225185 | A1 | 11/2004 | Obata et al. |
| 2005/0015480 | A1 | 1/2005 | Foran |
| 2005/0041097 | A1 | 2/2005 | Bernstein et al. |
| 2005/0050707 | A1 | 3/2005 | Scott et al. |
| 2005/0129108 | A1 | 6/2005 | Bendall et al. |
| 2005/0162643 | A1 | 7/2005 | Karpen |
| 2005/0187739 | A1 | 8/2005 | Baust et al. |
| 2005/0219263 | A1 | 10/2005 | Thompson et al. |
| 2005/0281520 | A1 | 12/2005 | Kehoskie et al. |
| 2006/0015919 | A1 | 1/2006 | Karppinen et al. |
| 2006/0050983 | A1 | 3/2006 | Bendall et al. |
| 2006/0072903 | A1 | 4/2006 | Weldum et al. |
| 2007/0074035 | A1 * | 3/2007 | Scanlon et al. ............... 713/176 |
| 2007/0106536 | A1 | 5/2007 | Moore |
| 2007/0106754 | A1 | 5/2007 | Moore |
| 2007/0182829 | A1 | 8/2007 | Zacks et al. |
| 2008/0071143 | A1 | 3/2008 | Gattani et al. |

OTHER PUBLICATIONS

GE Inspection Technologies, "Krautkramer Database Manager, Organized Spotweld Testing-Advanced Test Management" GEInspection Technologies.com, 1 page, 2004.

GE Inspection Technologies, "Krautkramer UltraLOG 3, A Further Advancement in the Tailored Complete Solution for Spot Weld Testing" GEInspection Technologies.com, 1 page, 2004.

GE Inspection Technologies, "Krautkramer Application Software for Spotweld Testing" GEInspection Technologies.com, 1 page, 2005.

Extended European Search Report for Patent Application No. 07104855.7, dated Dec. 21, 2007 (6 pages).

Extended European Search Report for Patent Application No. 07104854.0, dated Dec. 27, 2007 (4 pages).

CN Patent Application No. 200710128288.0, Office Action, Feb. 12, 2010.

Patent Application No. 200710142200.0, China First Office Action, Jul. 30, 2010.

* cited by examiner

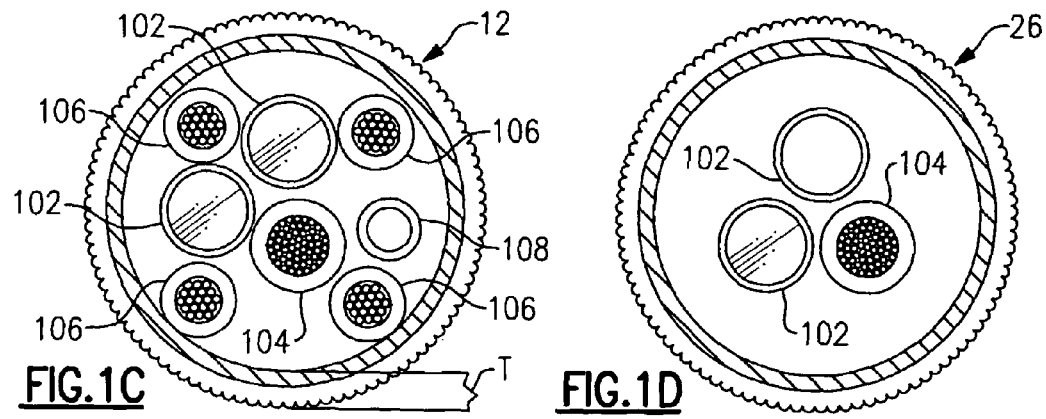
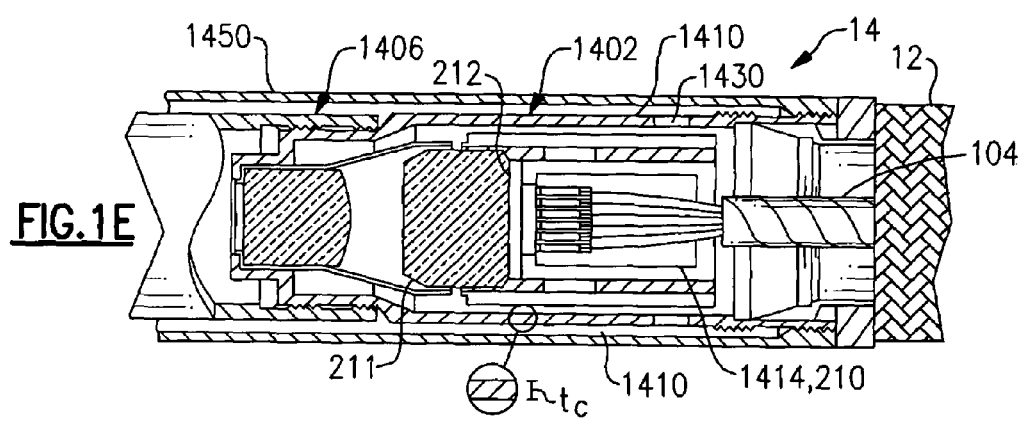
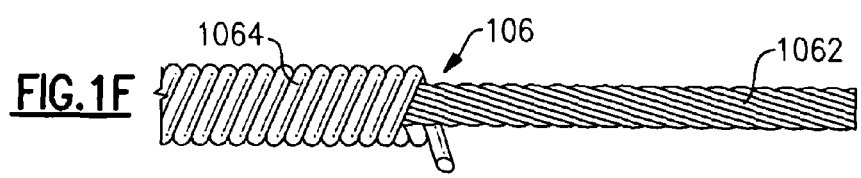

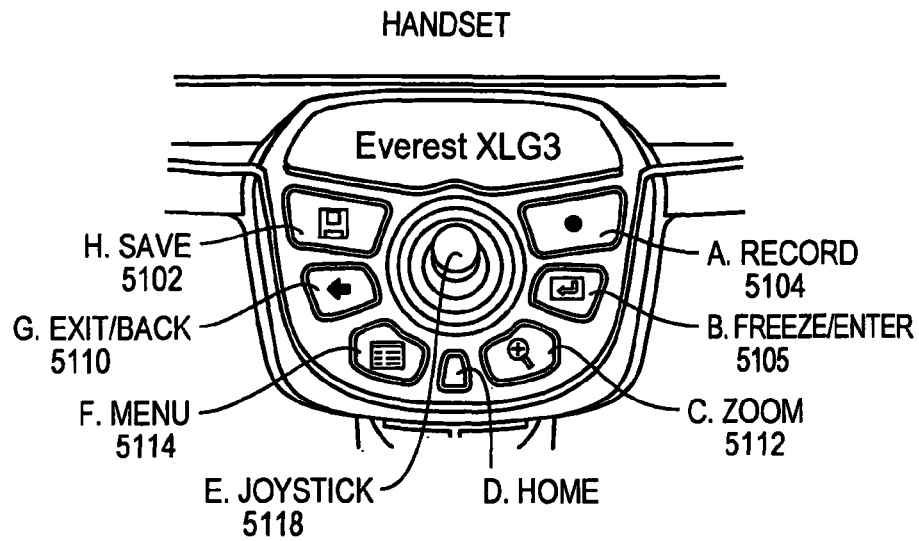

| ITEM | DESCRIPTION |
|---|---|
| A. RECORD ● | STARTS AND PAUSES VIDEO RECORDING. SEE "WORKING WITH VIDEOS" ON PAGE 53. |
| B. FREEZE/ENTER ⏎ | PERFORMS SAME FUNCTIONS AS THE TRIGGER (ITEM I ON PAGE 5). <br> • FREEZES AND UNFREEZES IMAGES. <br> • SELECTS HIGHLIGHTED ITEMS. |
| C. ZOOM 🔍 | CHANGES THE ZOOM LEVEL. SEE "ZOOMING" ON PAGE 46. |
| D. HOME | STRAIGHTENS THE BENDING NECK. SEE "TO STRAIGHTEN THE BENDING NECK" ON PAGE 42. |
| E. JOYSTICK | CONTROLS THE PROBE TIP, PANS AROUND ZOOMED IMAGES, MOVES THROUGH MENUS, AND NAVIGATES THE DESKTOP. FOR DETAILS ON CONTROLLING THE PROBE TIP, SEE "AIMING THE CAMERA" ON PAGE 41. |
| F. MENU ≡ | OPENS AND EXITS MENUS. SEE "NAVIGATING THE MENUS" ON PAGE 13. |
| G. EXIT/BACK ← | EXITS A MENU OR OPERATION. |
| H. SAVE 💾 | OPENS THE SAVE MENU. SEE "SAVING AN IMAGE" ON PAGE 51. |

FIG. 3C-1

REMOTE CONTROL

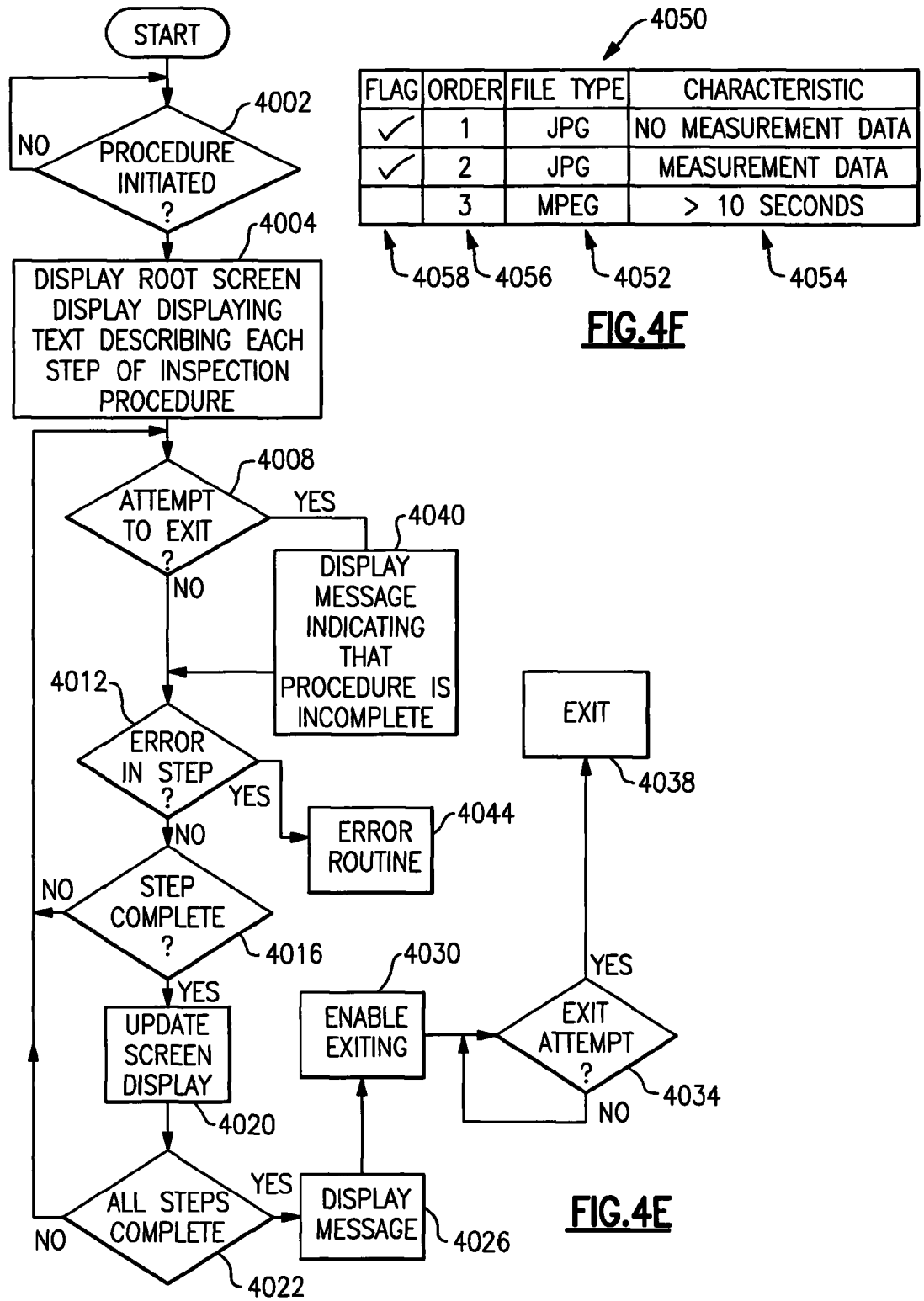

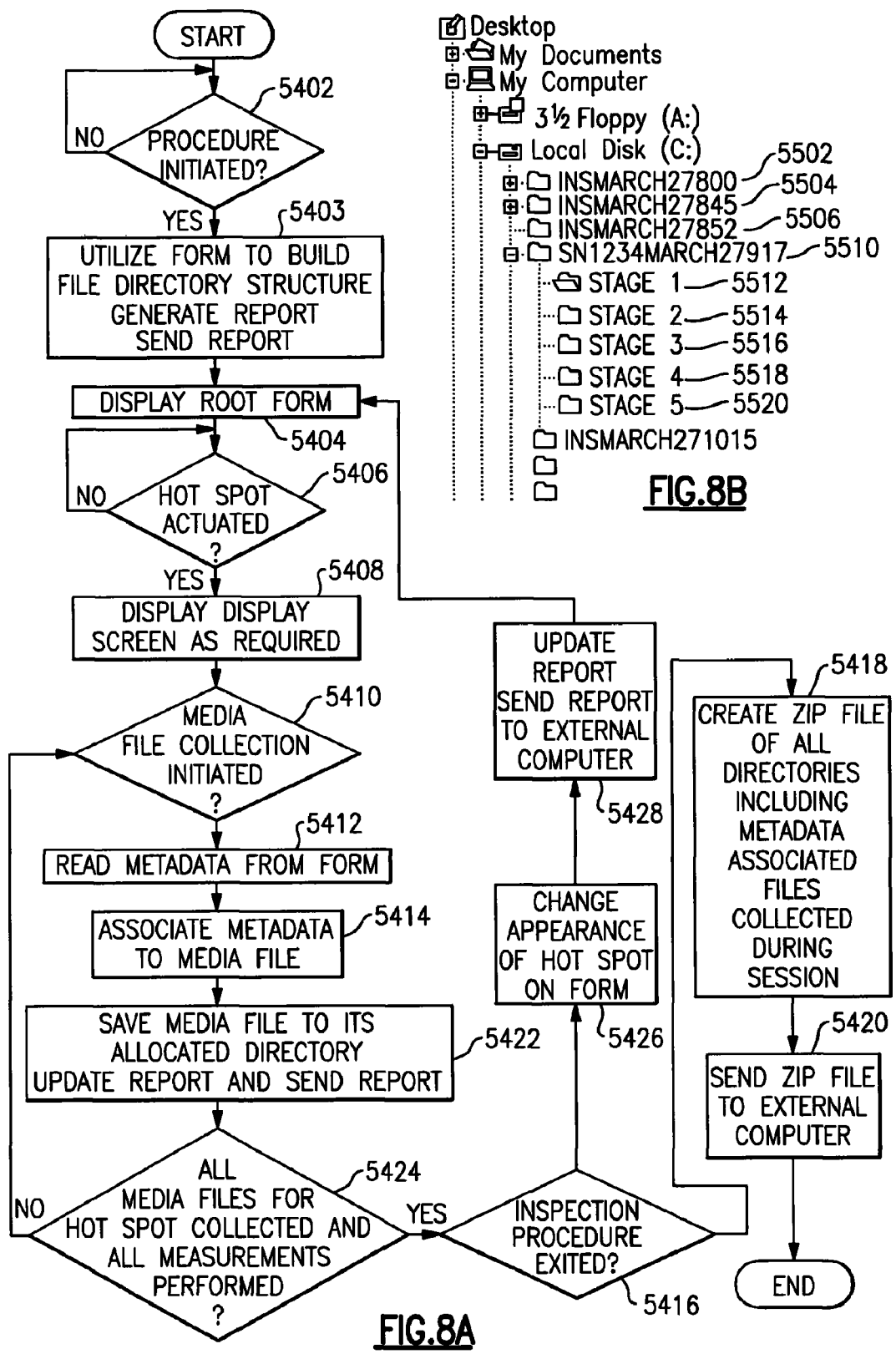

US 8,368,749 B2

ARTICLE INSPECTION APPARATUS

CROSS REFERENCE TO RELATED APPLICATIONS

The present application claims priority under 35 U.S.C. §119(e) to U.S. Provisional Patent Application No. 60/786,829 filed Mar. 27, 2006 which is incorporated herein by reference. The present application is also related to U.S. Non-Provisional Patent Application No. (Not Yet Assigned), filed Dec. 22, 2006 entitled, "Inspection Apparatus For Inspecting Articles" which is also incorporated herein by reference.

FIELD OF THE INVENTION

The invention relates to methods and systems for inspection in general and, in a particular embodiment, to methods and systems that can incorporate an inspection apparatus.

BACKGROUND OF THE INVENTION

Industrial visual inspection apparatus, such as borescopes, can be used to collect media files such as image files and video files, including audiovisual (multimedia) files. Operators of such apparatus have historically manually associated data records with collected media files using; for example, a written notepad and have used printed materials (e.g., printed instruction manuals or printed job guides) to guide them through an inspection procedure. Inspectors who rely on written notes and printed materials may lose track of where they are in an inspection process. For example, inspectors may "snap away" aimlessly when performing inspections capturing repetitive video and still images several times over as a result of having lost track of what images have already been collected and what images need to be collected. At the same time, equipment articles being inspected are often online industrial process machines or power plant machines, or replacement articles for such machines, which desirably are inspected with a minimum of down time. The inability of present day inspectors to keep track of what images need to be collected can result in protracted down time of process machinery and significant economic losses owing both to protracted down times for completion of inspections and required re-inspections where steps of an inspection process were not completed by an inspector. Further, unlabeled and undescribed media files hinder an expert data management agent's capacity to decide if a collected image or video should be considered 'pass' or 'fail.' Because undescribed media files inhibit proper comparison with reference to images and videos, inspection procedures often have to be duplicated. The efficiency of an inspector is further limited by the requirement of taking written notes. The capacity of an inspector to remain focused on the required steps of an inspection are compromised by forcing the inspector to write written notes and leaf through printed material while performing an inspection.

The use of written notes to record data, in addition to compromising an inspector's ability to remain focused on an inspection, also makes it difficult to review and analyze media files collected during an inspection procedure. For correlation of a collection of media files with a certain job task, an inspector or other data management personnel might, after a collection of media files has been collected, view the handwritten notes taken by the operator in connection with the multimedia files at a workstation and then manually associate a job task index to the media by way of keyed-in data entry at a workstation. The above described data management method results in data entry error and judgment error. For example, inspectors using the above method may make inaccurate written notes regarding a scene being subject to image file or video file collection. Inspectors have also been observed to avoid taking written notes altogether when faced with time pressures for collecting media files or when encountering stressful (e.g., high heat or poor air quality wearing gloves in a cold environment) working conditions. The result of a commonly encountered multimedia file collection effort is simply a large collection of unorganized image files and/or video files with no indexing and no written notes and with the only guide for organizing the files being the memory of the human inspector operating the inspection apparatus.

BRIEF DESCRIPTION OF THE DRAWINGS

The objects and features of the invention can be better understood with reference to the drawings described below, and the claims.

FIG. 1c is a cross sectional view of an elongated inspection module of a visual inspection apparatus;

FIG. 1d is a cross sectional view of an interconnect module of a visual inspection apparatus;

FIG. 1e is a cross sectional side view of a camera head assembly of a visual inspection apparatus;

FIG. 1f is a detailed side view of an articulation cable of an inspection apparatus;

FIG. 3c-3c-2 are perspective views of a control and display module of a visual inspection apparatus showing a user interface including buttons and a joystick.

FIG. 4e is a flow diagram associated with the screen shots of FIGS. 4a through 4d illustrating a guide feature for guiding an inspector;

FIG. 4f illustrates a list representing steps of an inspection procedure that can be retained by an inspection apparatus;

FIG. 8a is a flow diagram illustrating operation of a visual inspection apparatus in one embodiment where the apparatus utilizes an inspection guide form to establish a set of directories and to generate a report useable at the inspection apparatus and at a computer external to the inspection apparatus;

FIG. 8b shows a possible file directory structure that can be established by an inspection apparatus;

FIG. 9b is a view of computer external to a visual inspection apparatus displaying the report form displayed by a control and display module display in the view of FIG. 9a;

DETAILED DESCRIPTION OF THE INVENTION

Figure 1A:
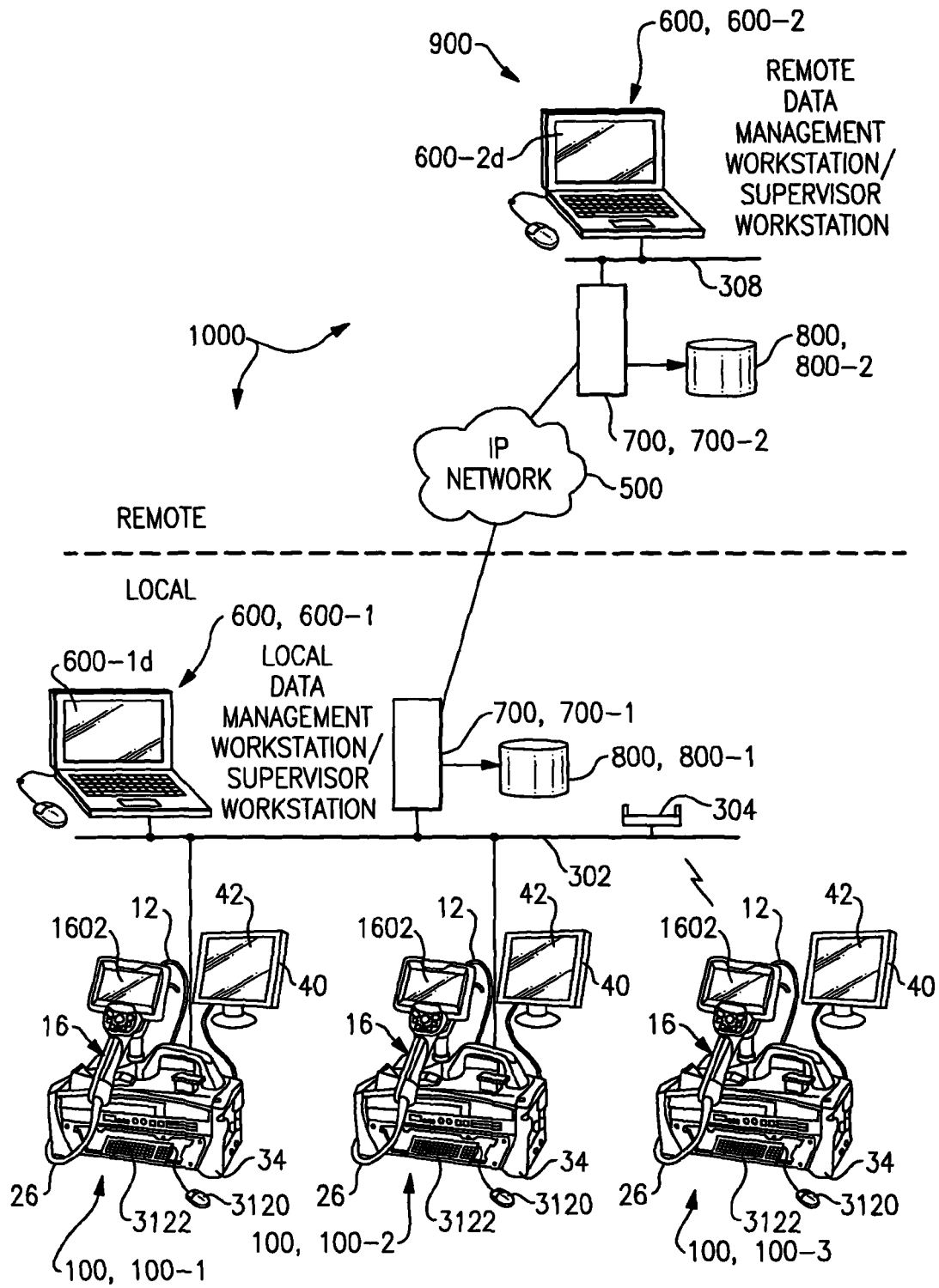
FIG. 1a is a view of a visual inspection system which in the embodiment shown has local and remote computers.

An inspection apparatus can be operated to collect files during performance of an inspection. An inspection apparatus can associate metadata to a collected file. In one embodiment metadata associated with a collected file can include an article identifier. In one embodiment metadata that is associated with a collected file can include data input into an inspection apparatus by an inspector. In one embodiment metadata that is associated with a collected media file can include sensor output data. An inspection apparatus in one embodiment can include an application guiding an inspector in the performance of an inspection. In one embodiment, an inspection apparatus can be provided by a visual inspection apparatus incorporated in a visual inspection system and configured so that media files can be collected utilizing the inspection apparatus. Accordingly, in one embodiment there is provided in a visual inspection system features that improve the quality of data collection such as media file collection in a visual inspection system. A technical effect of features described herein is improved quality of data collection.

Methods and apparatus for performing visual inspection of industrial components, such as aircraft engines, nuclear reactors, and fluid conduits, are provided. Such methods may include, with the assistance of an electronic manual or instruction set, performing the steps of disposing an inspection module near a component such as an equipment article to be inspected, gathering data regarding the component, and storing the gathered data with appropriate notations. Additional steps may also be performed, such as measuring an aspect (e.g., length of a defect, temperature) of the inspected component and associating inspection-specific data (e.g., inspector identification, time/place of inspection, identifying indicia of the inspected component) with media information gathered during the inspection. The visual inspection apparatus may comprise a demountable inspection module, an interconnect module, a unitary control and display module, and a base module.

In one aspect the features relate to guiding an inspector through an inspection procedure. The guiding can include displaying one or more elements of information about the present inspection procedure, displaying requirements of the procedure, providing negative feedback where a procedure requirement is not adhered to, providing positive feedback when a procedure is adhered to and enabling or disabling controls of an inspection apparatus in a manner depending on an inspector performance during an inspection procedure. In one specific example, an inspector can be guided by an electronic instruction manual for completing an inspection procedure. The guiding features help an inspector remain focused on required procedure steps and thereby limit instances of erroneous or improper or redundant file collections.

In another aspect the features relate to associating "metadata," i.e., "data about the data" to collected files collected during an inspection procedure. Metadata can be, e.g., data from sensors in proximity with an equipment article being subject to inspection, time stamp data, data describing the inspection procedure being performed, e.g., job # equipment #, site, customer, inspector, component, and defect type. Metadata can be defined by a software developer programming a computer of the inspection system or by an inspector by entering of data. The associating of metadata makes collected media files easier to manage and analyze. A set of metadata associated files is thereby in a form suitable for searching. A set of metadata associated files can be processed by an application which processes the files into a form that further enhance the capacity of the media files to be searched and/or analyzed. In that metadata associated files always contain the media file and the descriptive metadata, one does not have to manually enter descriptive data when sending to an external computer for analysis or review.

Guiding features and metadata associating features can be deployed completely independent of one another. That is, in one embodiment, a visual inspection system can have guiding features but no metadata associating features. In another useful embodiment, a visual inspection system can have metadata associating features but no guiding features. Nevertheless, in accordance with another embodiment, guiding features and metadata-associating features are combined into a single visual inspection system. The combination of guiding features and metadata associating features produces a synergistic effect. While a purpose of a guiding feature is to improve collection speed and accuracy by helping an inspector remain focused on a procedure, this purpose is also advanced by incorporation of a metadata associating feature which relieves an inspector of the burdensome task of recording written notes and allows an inspector to pay even greater attention to the requirements of a procedure. While a purpose of the metadata associating feature is to improve the organization of collected data making the data easier to manage and analyze, this, purpose is also advanced by the incorporation of a guiding feature which reduces instances of erroneous, missed and redundant data collections.

In one embodiment, forms can be provided for use in the visual inspection system. Forms, in one example, can be provided by HTML files viewable by; for example, a web browser program. The forms can be utilized to develop both guiding features and metadata associating features. For example, regarding guiding features, the forms can include one or more of viewable text providing instructions to an inspector, hot spots (control buttons) for guiding an inspector, helping the inspector to maintain track of required operations, and graphics (including of an equipment article being inspected). Regarding metadata associating features, the forms can carry data for use in metadata association, such as job #, equipment #, component name, defect type defined by the person developing the form. The forms can also include data entry fields for receiving data input from an inspector (e.g., inspector #) for use as metadata to be associated with collected files.

There can also be provided in the visual inspection system a form builder including a graphical user interface that allows an organization involved in running inspection operations to quickly develop forms for aiding an inspection process. New forms can be rapidly developed with use of the form builder. The form builder can include features allowing a developer to easily define, without typing of any program code, a complex interrelated set of screen views for display on a visual inspection apparatus that is customized for a particular visual inspection procedure. Because the form builder can be configured to build complex and highly featurized forms without typing in any program code, the software developer developing forms with use of the form builder can be a person without any understanding of computer languages or program coding.

In another aspect, a visual inspection apparatus of a visual inspection system can be configured to generate an organized user interactive report organizing files collected during an inspection procedure. A report may be generated utilizing a set of one or more forms for display on an apparatus display, and in one embodiment is always available for viewing by an inspector and any person within view of a display equipped computer within a visual inspection system. At any time during execution of an inspection procedure, the report can be viewed on an apparatus display or on an external display. A report can comprise a root form with hot spots linking various files collected during execution of an inspection procedure, and the files, in one particular embodiment can be saved into a set of file directories established utilizing information from a form. The set of file directories can reside on a computer memory or removable media. The interactive report can be transferred onto a network, solid state memory or any memory device for viewing. In one simplified embodiment, a report is provided by a simple listing of one or more files and associated metadata.

In another aspect, an application for guiding an inspector in performing an inspection can be modified. In one embodiment an application for guiding an inspector can be modified responsively to data collected by an inspection apparatus of an inspection system. In another embodiment, an application for guiding an inspector can be modified responsively to data output by a data output device.

There is provided in one embodiment an inspection apparatus which can be used to inspect industrial inspection articles in which an inspector is guided through an inspection procedure. There is provided in another embodiment an inspection apparatus that can associate metadata to collected media files. In another embodiment, a form is used to provide guiding features and metadata associating features. The form can include metadata for association with a media file. The form can, in one embodiment, be utilized in the generation of a report that can be viewed at the inspection apparatus by the inspector and at an external work station by a supervisor or a data management agent.

Operating Environment and Components

There is shown in FIG. 1a an exemplary visual inspection system 1000 including a plurality of visual inspection apparatuses 100-1, 100-2, 100-3, a local data management workstation 600-1 and a remote data management workstation 600-2. System 1000 can have both local and remote components as indicated by the dashed border of FIG. 1a. Local data management workstation 600-1 and visual inspection apparatuses 100 and the remaining component indicated below the dashed border can be included in a common local facility having equipment or other subject matter in need of visual inspection. Examples of facilities in which the local components of system 1000 may be deployed include manufacturing facilities and power plants. Referring to further aspects of system 1000, visual inspection apparatuses 100 can be in communication with local data management workstation 600-1 via Ethernet bus 302. Apparatuses 100-1 and 100-2 are wireline connected to bus 302 while apparatus 100-3 is in wireless communication with bus 302 via access point 304 such as may be provided by an IEEE 802.11 access point. In the local operating environment there can also be included a server 700-1 storing an inspection records database 800-1. Local server 700-1 is in communication with a remote server 700-2 which can be located miles to thousands of miles from local server 700-1. Remote server 700-2 can also store an inspection record database 800-2. Remote server 700-2 and local server 700-1 can be connected via an IP network 500 and suitable gateways and routers where necessary (not shown) can be disposed between IP network 600 and servers 700-1 and 700-2 respectively. In the embodiment of FIG. 1a, remote data management workstation 600-2 is depicted as being in communication with server 700-2 via an Ethernet bus 308 at a common data management facility with remote server 700-2. Data management facility 900 can be in network communication with computers at several local facilities having networks as in the depicted local facility (i.e., having all the components shown below the dashed-in border). Referring to visual inspection apparatuses 100, each visual inspection apparatus 100 can have a base module 34, a control and display module 16 including a control and display module display 1602, an elongated inspection module 12, an interconnect module 26, and an associated monitor 40 having a display 42 in communication with base unit 34. An alternative view of visual inspection system 1000 with greater emphasis on the components of visual inspection apparatus 100 is described in connection with FIG. 1b. All of the computers of FIG. 1a; namely, computer 100-1, computer 100-2, computer 100-3, computer 600-1, computer 700-1, computer 700-2, and computer 600-1 can incorporate the TCP/IP protocol stack and are IP addressable.

Figure 1B:
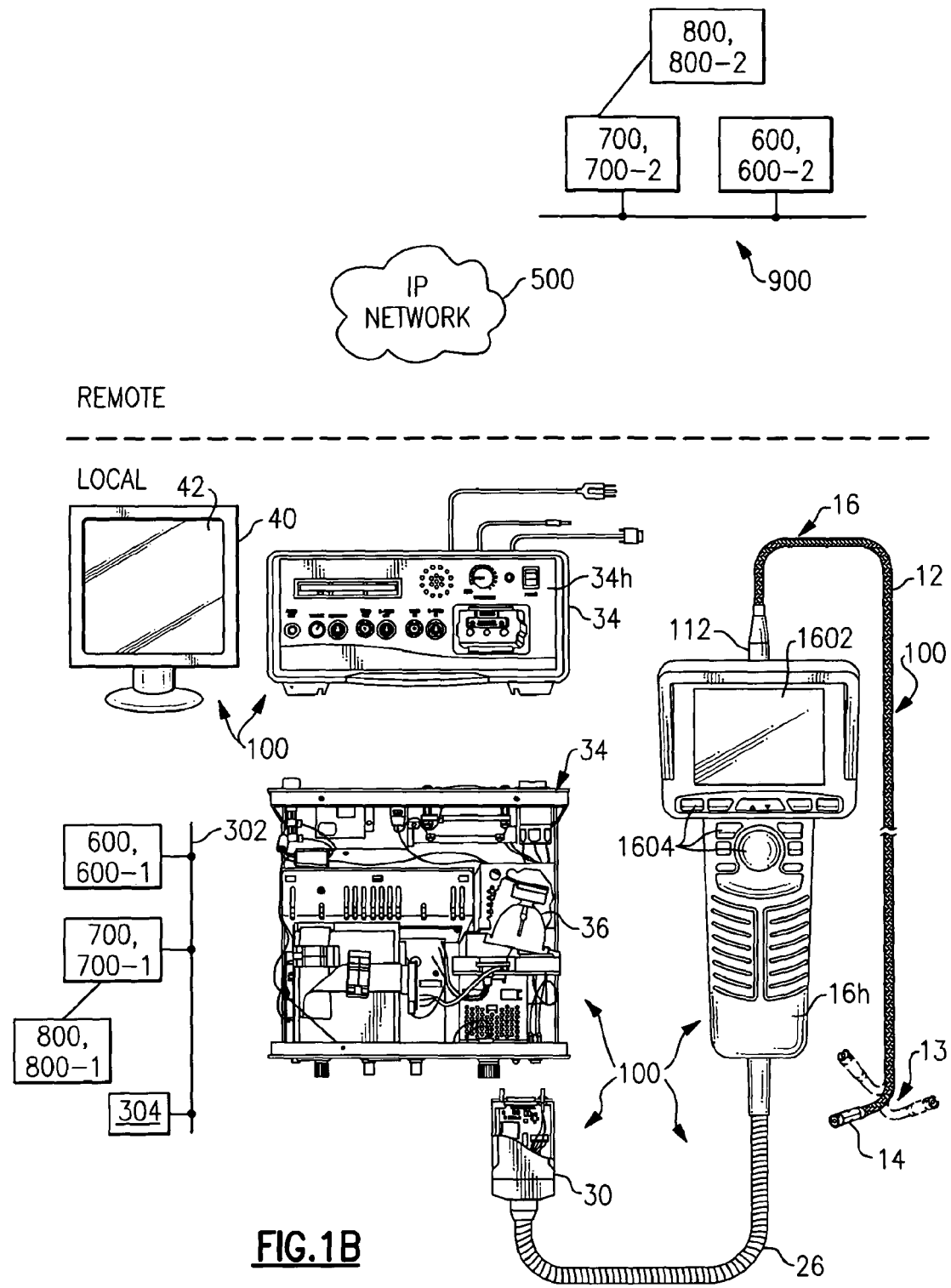
FIG. 1b is an alternative view of the system of FIG. 1a with additional emphasis on features of a visual inspection apparatus.

Referring now to the view of FIG. 1b, visual inspection apparatus 100 can include visual inspection system 1000, an elongated inspection module 12, a camera head assembly 14, a control and display module 16, an elongated interconnection module 26, power plug 30 and base module 34. Control and display module 16 and base module 34 can have separate housings 16h and 34h respectively. As shown, control and display module 16 can be disposed at a proximal end 112 of the elongated inspection module 12. Housing 16h which can have a handle portion 116 (element labeled in FIG. 3c) can be sized and shaped to be grasped by a human hand. Because housing 16h can be configured to be a hand held control and display module 16 can in an embodiment described be regarded as being hand held or hand graspable. Visual inspection apparatus 100 may also include a monitor 40 including a display 42 in communication with base module 34. Monitor 40 may be in communication with visual inspection apparatus 100 via several communication circuitries of base module 34. The components described of the local operating environment may be in communication with components of a remote operating environment. As indicated in the view of FIG. 1b, the components of the local operating environment may be in communication with a network at data management facility 900 which can include at least one server 700-2 and a user interface equipped computer such as PC 600-2 serving as a data management workstation. Remote data management facility 900 can be located miles to thousands of miles from the local operating environment and can be in communication with the components of the local operating environment by way of an IP network 500. One or more of control and display module 16 and base module 34 can have suitable network interface hardware and software providing network connectivity with IP network. Visual inspection system 1000 may be in accordance with the remote video inspection system described in U.S. patent application Ser. No. 10/768,761 filed Jan. 29, 2004, entitled "Remote Video Inspection System" incorporated herein by reference.

Referring to more detailed aspects of visual inspection system 1000 disposed in base module 34 is a light source 36 which may be, e.g., a 50-watt arc lamp. Base module 34 may further carry an image processing circuit as will be described herein. Light source 36 of base module 34 directs light through interconnect module 26, through control and display module 16, through elongated inspection module 12 and outwardly from camera head assembly 14. In one embodiment, the system can have a modular light source that allows the user to change a light engine (e.g., a lamp, a ballast, and a mounting mechanism) conveniently and quickly. Different light engines can be employed in different embodiments. Light engines that provide white light can be based on LEDs, arc discharge lamps (such as xenon, high pressure mercury, or metal halide lamps). Light engines that provide UV or IR illumination can be based on LEDs, filtered arc discharge lamps, or lasers. The light sources are also configurable at the time of manufacture. In some embodiments the light source can be located in a distal end of an elongated inspection module, or it can be located in a control and display module.

As seen by the interconnect module cross section view of FIG. 1d, interconnect module 26 encases and supports fiber optic bundles 102. As seen by the elongated inspection module cross section view of FIG. 1c, elongated inspection module 12 also supports and encases fiber optic bundles 102. Referring to further aspects of interconnect module 26, interconnect module 26 further encases and supports wiring cable bundle 104. Part of the wires of wiring cable bundle 104 are branched off within control and display module 16 as is suggested by the electrical block diagram of FIG. 2 which will be discussed later herein.

The remainder of wires of bundle 104 extend through elongated inspection module 12 as is indicated by bundle 104 of elongated inspection module cross sectional view of FIG. 1c. Referring to elongated inspection module 12, elongated inspection module 12 as best seen in FIG. 1c carries fiber optic bundles 102, cable wiring bundle 104 (including flexible electrical conductors), articulation cable assemblies 106, and working channel 108. In one embodiment, an inspection module may be readily interchanged for another inspection module. For example, a second replacement elongated inspection module to be used when a user detects a problem in the use of the first elongated inspection module, or a second replacement elongated inspection module that has a different diameter, a different length, or a different stiffness as compared to the first elongated inspection module. The elongated inspection module may be connected to the display module by use of a connector that provides electrical and optical connections to handle all of the following communications: optical communication of light generated at the light source to the target by way of optical fibers in the cable via the unitary display module/manually operated control module to the elongated inspection module having an optical transmission path, such as an optical fiber, for illumination of a target; and a selected one of a communication of reflected light from the target to a sensor housed in the unitary display module/manually operated control module, and a communication of electrical signals to and from a sensor situated at a distal end of the elongated inspection module. In some embodiments, the elongated inspection module comprises a replaceable tip. For example, a thread-on tip that can be attached or removed.

The articulation cables extending from the control and display module are, in one embodiment, preferably made at least partially from tungsten to improve articulation performance and reduce stretch of the articulation cable material. In an alternative embodiment or optionally, the control and display module may be coupled in fluid communication with the elongated inspection module so that the elongated inspection module is articulated by pneumatic or hydraulic pressure applied by way of the fluid. The elongated inspection module comprises a double braid construction to enable small bending radii, and hence small diameter storage. In some embodiments, the inner braid may be provided to control the stiffness of the probe. Probes may be designed and constructed to vary in stiffness by controlling the relative angle between the strands forming a braid layer. The use of two braided layers can, in some instances, also provide improvements in shielding electromagnetic interference.

In one embodiment, the demountable inspection module includes a helically wound spiral tube, a first braided tube disposed over at least a portion of the helically wound spiral tube, a second braided tube disposed over at least a portion of the first braided tube, a first polymeric layer disposed between said first braided tube and said second braided tube and a second polymeric layer coating the outer periphery of the second braided tube.

The first wire braid tube may have a first braid angle. As used herein, the term "braid angle" is defined as the angle between the longitudinal axis of a braided tube and the wires or metallic fibers that are interwoven to form the braided tube. The inspection apparatus elongated inspection module further may include a second wire braid tube disposed over at least a portion of the first wire braid tube. The second wire braid tube has a second braid angle that is different than the first braid angle. The elongated inspection module further may include a first polymeric layer disposed between the first wire braid tube and the second wire braid tube. A second polymeric coating covers the second wire braid tube. Articulation cable assemblies 106 provide for bending of elongated inspection module at distal end 13. As seen in the detail view of FIG. 1f, articulation cable assemblies 106 can be provided by a stranded cable 1062 encased by an outer spring conduit 1064. Working channel 108 allows manipulation of a tool (e.g., a hook, a brush, or a magnet) extending from camera head assembly 14. While visual inspection system 1000 having the elongated inspection module embodiment of FIG. 1b includes fiber optic bundles 102, it will be understood that the illumination system having light source 36 and bundles 102 can be replaced or supplemented by an illumination system comprising light sources such as a plurality of LEDs incorporated in head assembly 14. LEDs in head assembly 14, like image sensor 212 (FIG. 1e, also referred to herein as an "imaging sensor") and image signal conditioning circuit 210 (FIG. 2), may be powered by power delivery conductors of bundle 104.

Figure 2:
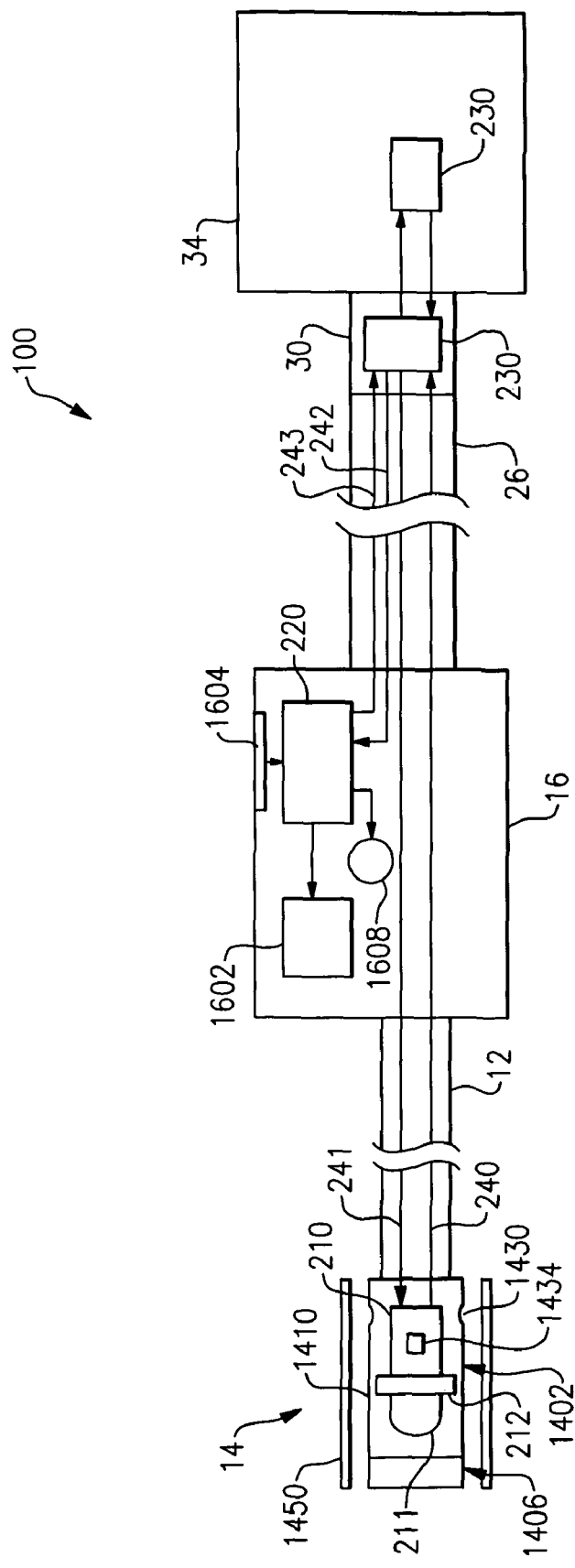
FIG. 2 is a high level circuit diagram of circuitry that can be incorporated in a visual inspection apparatus.

A functional block electrical layout diagram is shown in FIG. 2. Various electrical circuits are distributed throughout a visual inspection apparatus 100 of visual inspection system 1000. In one typical layout scheme, a visual inspection apparatus 100 of a visual inspection system 1000 includes an image signal conditioning circuit 210, a control and display module control circuit 220, and an image processing circuit 230. Image signal conditioning circuit 210 receives image signal clocking and controls signals from image processing circuit 230 for control of imaging sensor 212, and conditions analog image signals generated by image sensor 212 so that the signals can be delivered to image processing circuit 230. Imaging sensor 212 is typically a 2D color solid state imaging sensor. In one embodiment, the distal end of the imaging sensor may include a camera housing surrounding a camera assembly comprising, in an illustrative embodiment, an objective window, an aperture, an acromat, a light baffle, and an imaging assembly. The imaging sensor is required for converting reflected light from a target to an electrical signal representative of the reflected light. In some embodiments, the sensor may be an imager conforming to the NTSC, PAL, or progressive scan computer video standards. The system includes the capability to generate PAL, NTSC and progressive scan video output standards. In some embodiments, the sensor comprises a lead frame design. In some embodiments, the imaging sensor is situated at a distal end of an elongated inspection module. In other embodiments, the imaging sensor is situated within the control and display module or within the proximal end of the elongated inspection module. In another embodiment, a general purpose camera, such as an electronic CCD camera, may be used to provide troubleshooting diagnostics for the system, as well as to create general purpose inspection photos.

Image processing circuit 230 may be partially distributed in power plug 30 and partially distributed in base module 34. Among other functions, image processing circuit 230 receives analog image signals as transmitted by image signal conditioning circuit 210, converts such signals into digital form utilizing an analog-to-digital converter and buffers frames of image data so that frames of image data can be subjected to various processing. The processing which may be performed by image processing circuit 230 can include such processing as single frame storage, measurement determination, and object recognition. Image processing circuit 230 can also perform such functions as overlaying of menu interface selection screens on displayed images, and transmitting output video signals to various displays such as hand piece display 1602 and monitor display 40. In addition to housing image processing circuit 230, power plug 30 and base module 34 also carry various electrical circuitries for delivering electrical power to various components of visual inspection system 1000. Electrical communication between the various circuits is provided by signal lines 240, 241, 242, and 243, each of which represents one or more electrical conductors. Signal lines 244, 245 to be discussed further herein also represent one or more electrical conductors. Referring to further aspects of base module 34, the base module, in an illustrative embodiment, can have defined in a side thereof one or more apertures for use with electronic, magnetic and/or optical storage media. Present within the base module and accessible through various apertures may be the electronic components (e.g., floppy disk drive, DVD drive, CD/CD-R/CD-RW drive, or Compact Flash/PCM-CLA/PC card/SD adapter) that accommodate and read from and/or write to the storage media that can be employed by a user of the remote video inspection system. As an alternative to downloading information from a remote location to the inspection system, any of these mobile media interaction means may be used to provide the manual and/or forms or other templates discussed in greater detail herein. The base module provides on-board MPEG-2, MPEG-4 or DV video compression. In other embodiments, other known video compression methods and formats can be employed. The base module also can include various connectivity options, e.g. serial ports, USB ports, Firewire® (IEEE 1393) ports, etc. for connecting to other electronic systems; for example, a digital personal assistant. The base module may comprise a cooling fan and an optional dust filter to accommodate the thermal loads that the illumination lamp of the light source module presents during operation. The base module may be designed to be substantially waterproof.

Control and display module control circuit 220, among other functions, receives video signals from image processing circuit 230, and displays such signals on display 1602 of control and display module 16, receives user input and commands input via hand piece controls 1604 and interprets such inputs to perform various operations. One important function of control and display module control circuit 220 is to receive elongated inspection module control inputs. Control circuit 220 interprets user inputs to develop control signals for controlling control servomotor 1608 which moves articulation cables 1062 so that a distal end 13 of elongated inspection module 12 is moved into a desired orientation. The control and display module may combine the display and control features that are necessary and useful for a user of the video inspection system to monitor and control the operation of the video inspection system, and to observe, evaluate and record the results of an inspection. The control and display module may also provide electrical, optical, mechanical and fluid communication as necessary between the various cable and replaceable probes that are used in the operation of the video inspection system.

The display module in one embodiment may be a WVGA (Wide VGA) liquid crystal display (LCD) providing a 16:9 format and high display brightness, with a display quality similar to that of a high definition video display. The display module in other embodiments can comprise other suitable displays, such as; for example, an OLED or plasma display.

In one embodiment, manually operated control and display module 16 may comprise a joystick 5118 (FIG. 3c) that is used to control the motion of the distal end of the elongated inspection module in directions normal to the end of the elongated inspection module (e.g. "up"-"down", "y-direction", and "right"-"left" or "x-direction" motion of the distal end of the elongated inspection module). The "up"-"down" and "right"-"left" motion of the distal end of the elongated inspection module is controlled by servomotors or articulation motors which drive lead screws in a pod assembly. The articulation motors may be housed in the control and display module. The lead screws and their attachment to the articulation cables may be housed in the pod.

Control and display module 16 can include, by way of example, an LCD monitor (which displays images seen by the imaging device), a joystick control (for articulating a distal end of the imaging device), and a button set (for accessing measurement, digital, and measurement controls associated with the imaging device). The control and display module may also be connected to an elongated inspection module, which terminates in a distal end and which is interfaced to a control and display module at a proximal end. As used herein, the term "distal" shall mean in the direction of the tip of the borescope furthest from the control and display module. The control and display module may be ergonomically designed such that the grip section is hand-sized and includes a non-slip grip area. Interchangeable elongated inspection modules for the flexible endoscopic or borescopic probe may be provided that can be selectively and interchangeably connected to the control and display module. According to one embodiment, manual control comprises articulation motors that are retained in a proximal end of the manual control, the articulation motors located so as to provide balance to the control and display module. The manually operated control module may be ergonomically designed for ease and comfort of use.

Image processing circuit 230 and control and display module processing circuit 220 are typically microprocessor based; that is, they are conveniently established utilizing one or a plurality of readily available programmable off-the-shelf microprocessor integrated circuit (IC) chips. Microprocessor IC chips often have on-board volatile and nonvolatile memory structures and are typically disposed in communication with external volatile and nonvolatile memory devices.

FIG. 1e shows a detailed view of a camera head assembly 14 in an illustrative embodiment. Camera head assembly 14 includes head 1402 and tip 1406. Tip 1406, normally of detachable construction includes various lenses which determine a field of view (e.g., straight view, right angle view, narrow right angle, wide right angle, etc.) while head 1402 carries camera components. More specifically, head 1402 includes metal canister 1410 which encapsulates lens 211, imaging sensor 212 and IC chip 1414 in which the elements of the aforementioned image signal conditioning circuit 210 are incorporated. In one embodiment, a detachable tip of camera head assembly 14 can be configured to project an auxiliary image onto an object being measured, such as a shadow of a constant diameter pattern such as a ring pattern. Further, apparatus 100 can be configured to operate in a measurement mode of operation wherein an inspector can set electronic cursors on a control and display module display 1602 using controls 1604. In addition, a circuit of apparatus 100 typically provided by processor 3106 of base module 34, appropriately programmed, can calculate a distance measurement. Apparatus 100 can calculate a distance measurement by running an image data processing program to calculate dimension information (inches or centimeters) of the object designated by placement of the cursors by processing of the image data including a representation of the projected pattern. Dimensioning (distance, i.e., length measuring) inspection apparatus in accordance with the above description are described in greater detail in U.S. Pat. Nos. 4,980,763 and 5,633,675, the entire disclosures of which are incorporated by reference herein. Further, as described in copending patent applications Ser. No. 10/853,817, filed May 25, 2004, and Ser. No. 11/294, 285, filed Dec. 5, 2005, the entire disclosures of which are hereby incorporated by reference herein, distance measurements when calculated can be associated or embedded to a media file designated for collection by writing the measurement data to a media file corresponding to the image data subject to measurement, such that measurement data is destructively superimposed on a displayed image displayed when an image file is displayed, and optionally, the image is reconstructed using saved data in order to remove the destructive overlay. It will be seen that the media files discussed herein can contain measurement data calculated during execution of an inspection procedure. Accordingly, in one aspect, apparatus 100 can be configured to operate in a measurement mode in which cursors can be positioned on display 1602 for enabling an inspector to designate an area of a displayed image to be subject to a distance measurement. In a measurement mode, apparatus 100 can calculate a distance measurement between a pair of points designated to be subject to a distance measurement by placement of said cursors. Furthermore, the inspection module can be configured to be used in a "multi-modal" fashion such as by, for example, using eddy currents to determine the thickness of, for example, a conductive coating, as taught in U.S. Pat. No. 6,670,808, the entire disclosure of which is hereby incorporated by reference herein. As described in U.S. Pat. No. 6,697, 764, the entire disclosure of which is incorporated by reference herein, this multi-modal capacity can extend to detecting a plurality of sensed conditions, such as ultrasound readings, laser ultrasound readings, magnetic readings, infrared readings, eddy current readings, fluorescent penetrant readings, and x-ray images, or one or more action conditions, such as cleaning, cutting, grasping, stapling, nitrogen-purging, grinding repairs, blasting repairs, and drilled repairs.

There is therefore provided an elongated inspection module, a camera assembly and a hand graspable control and display module, the camera assembly including an imaging sensor and a lens focusing an image of an industrial equipment article onto said imaging sensor, the hand graspable control and display module being disposed at a proximal end of said elongated inspection module, the hand graspable control and display module including a display and a user interface, the user interface enabling a user to input commands into said apparatus, said user interface further enabling said inspector to control a position of said elongated inspection module relative to an industrial equipment article being inspected, wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors.

Figure 3A:
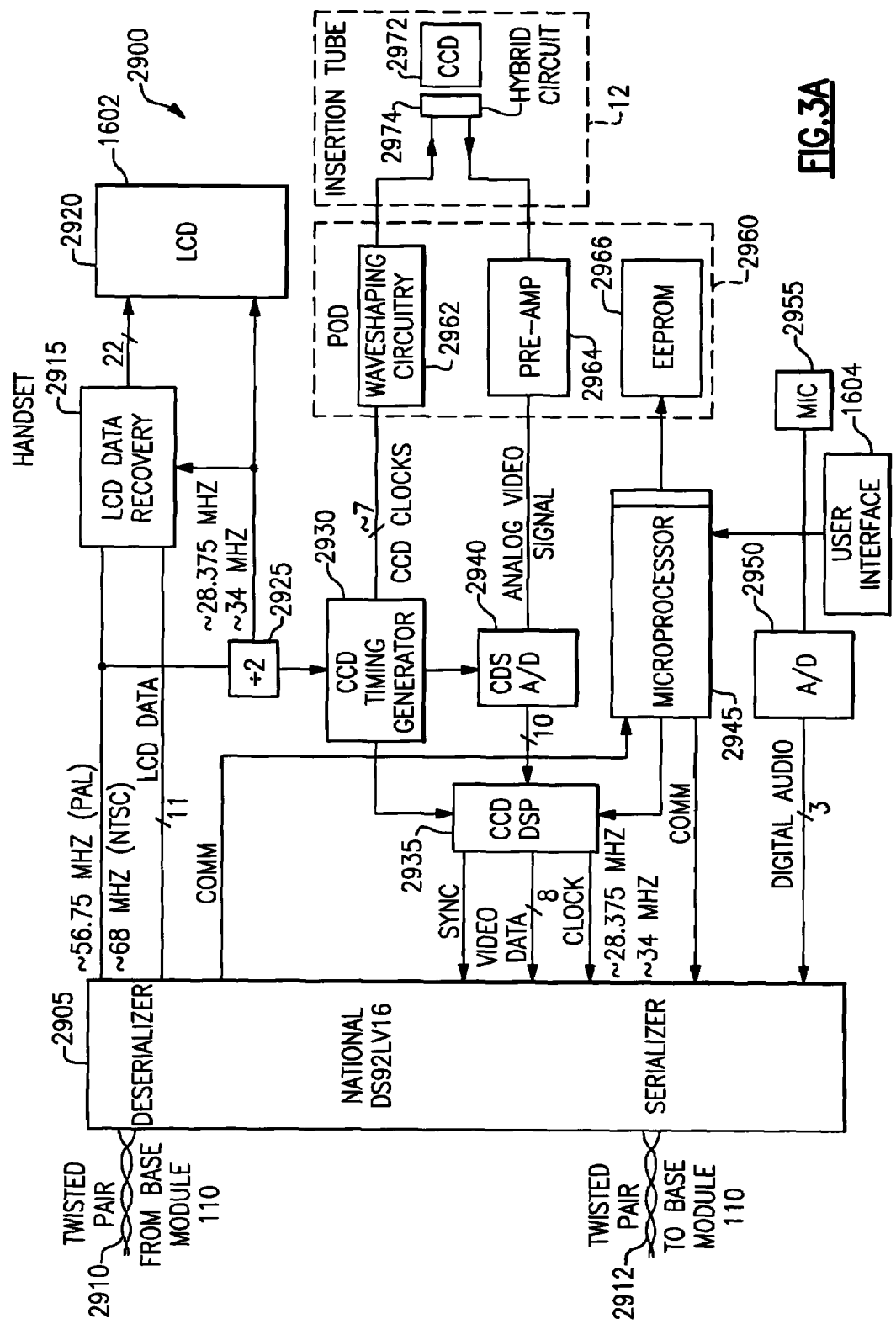
FIG. 3a is high level circuit diagram of a circuit that may be incorporated in a visual inspection apparatus in one embodiment.

FIG. 3a is a high level block diagram of an example of a circuit 2900 that can be used for interfacing an elongated inspection module 12 with a control and display module. In one embodiment, the elongated inspection module 12 comprises an imager, such as CCD sensor 2972 that converts received light into electrical signals representing an image, and a hybrid circuit 2974 that manipulates the electrical signals. In one embodiment, the hybrid circuit 2974 includes a mixed mode ASIC that provides these functions. In another embodiment, the mixed mode hybrid comprises the video buffer, and one or more filters, and creates the imager drive signals from a single master clock signal into a digital timing circuit on the ASIC. The output of this timing circuit is level shifted as necessary to meet the input levels required by the imager. Optionally, distortion correction of the image captured by the CCD sensor 2972 can be corrected for distortion, as described in; for example, U.S. Pat. No. 5,070,401 or copending application No. 60/691,359, filed Jun. 17, 2005 the entire disclosures of which are incorporated by reference herein. The elongated inspection module 12 is connected to a pod 2960 that interfaces to the control and display module, as described herein above. The pod 2960 in one embodiment comprises wave shaping circuitry 2962, a pre-amplifier 2964, and an EEPROM 2966. The pre-amplifier 2964 amplifies the signals provided by the CCD sensor 2972 as manipulated by the hybrid circuit 2974. The wave shaping circuitry 2962 is active to control the behavior of the CCD sensor 2972 as a function of time. The EEPROM 2966 is a memory that contains information relating to the type of elongated inspection module 12, and in some instances, to a particular elongated inspection module 12, the information useful for optimizing the behavior of the elongated inspection module 12.

As previously described, the pod 2960 is in electrical communication with the control and display module. The EEPROM 2966 is in bi-directional digital communication with a microprocessor 2945 that controls data acquisition from the elongated inspection module 12 and processing of the acquired data. The pre-amplifier 2964 is in electrical communication with an analog-to-digital converter (A/D) 2940. An analog video signal provided by the pre-amplifier is digitized by the A/D 2940. The output of the A/D is a parallel output, shown in the embodiment as a 10-bit side output. A hash mark crossing a connector with a numerical value there above is intended to indicate the number of parallel lines that the connection represents. In this regard, a connection from the A/D 2940 to the CCD digital signal processor (DSP) 2935 has a hash mark thereon and the numerical value 10 there above. The wave shaping circuitry 2962 receives a 7-bit signal representing seven different clocks needed to drive a CCD imager of the type used, (e.g., 4 vertical, 2 horizontal, and 1 reset gate clocks) from the CCD timing generator 2930. The CCD timing generator 2930 also provides a timing signal for the CCD DSP 2935 and for the A/D 2940, thereby synchronizing the A/D 2940 and the CCD DSP 2935. The microprocessor 2945 is bi-directionally connected to the CCD DSP 2935 to permit the adjustment of various processing parameters of the CCD DSP 2935 as needed when an elongated inspection module 12 is replaced or changed, and to permit the CCD DSP 2935 to send data to the microprocessor 2945. Microprocessor 2945 can receive control inputs from control interface 1604 and, where applications are run at the base module 34, can transfer the inputs for receipt and interpretation by processor 3106 of the base module 34.

A National Semiconductor DS92LV16 serializer/deserializer 2905 is used to transmit information from the control and display module to the base module by way of the cable, and is also used to receive information sent from the base module to the control and display module by way of the cable. As described hereinabove, there are advantages to limiting the number of conductors required to communicate between the control and display module and the base module. In the present embodiment, a twisted pair of conductors 2910 carries serialized digital signals from the base module to the control and display module, and a twisted pair of conductors 2912 carries serialized digital signals from the control and display module to the base module. In one embodiment, the serializer/deserializer 2905 receives the following digital signals from the control and display module components and converts the signals into a serial stream of bits: one bit of synchronization signal from the CCD DSP 2935; 8 bits of video data from the CCD DSP 2935; one bit of clock signal from the CCD DSP 2935; optionally, 3 bits of audio data from the combination of a microphone 2955 which generates an audio analog signal that is then digitized in an A/D 2950; and command signals from the microprocessor 2945. In this embodiment, the deserializer portion of the serializer/deserializer 2905 receives a digital stream from the base module, and separates and formats the information contained in the digital stream into the following signals: a one-bit video clock signal at a selected one of approximately 56.75 MHz for PAL video formatting or approximately 68 MHz for NTSC video formatting; 11 bits of LCD data for operating an LCD display; and command signals for use by the microprocessor 2945. As will be explained with regard to FIG. 3*b*, the video clock signal is generated at the base module. The video clock signal is provided to each of a LCD data recovery device 2915 and to a divide-by-2 module 2925. The output of the divide-by-2 is provided to all of the LCD data recovery device 2915, the LCD 2920, and the CCD timing generator 2930. The LCD data is provided to the LCD data recovery device 2915. The LCD data recovery device 2915 produces a 22-bit signal, comprising a one-bit timing signal, a one-bit horizontal synch signal and a one-bit vertical synch signal, and an 18-bit video signal for display by the LCD display 1602.

Figure 3B:
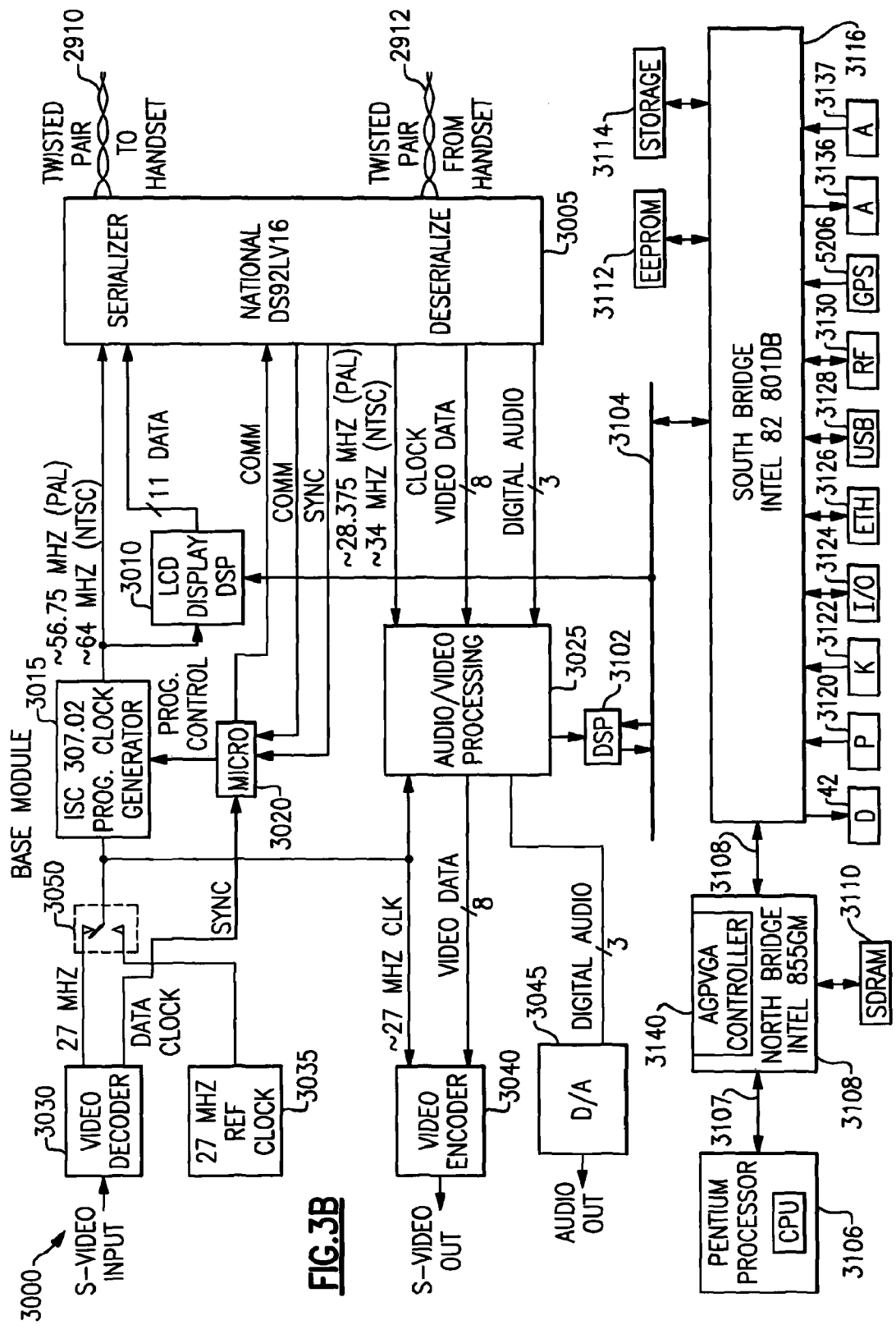
FIG. 3b is a high level circuit diagram of a circuit that can be incorporated in a base module of a visual inspection apparatus.

FIG. 3*b* is a high level block diagram of a base module circuit 3000 used for interfacing a base module with a control and display module. Circuit 3000 can be incorporated within housing 34*h* of base module 34. A second National Semiconductor DS92LV16 serializer/deserializer 3005 is used to transmit information from the base module to the control and display module by way of the cable, and is also used to receive information sent by the control and display module to the base module by way of the cable. As described herein above, there are advantages to limiting the number of conductors required to communicate between the control and display module and the base module. In the present embodiment, a twisted pair of conductors 2910 carries serialized digital signals from the base module to the control and display module, and a twisted pair of conductors 2912 carries serialized digital signals from the control and display module to the base module. In one embodiment, the serializer/deserializer 3005 receives the following digital signals from the base module components and converts the signals into a serial stream of bits: a one-bit video clock signal at a selected one of approximately 56.75 MHz for PAL video formatting or approximately 68 MHz for NTSC video formatting from a programmable clock generator 3015, for example the ISC307-02, a copy of which signal is also provided to the LCD display DSP 3010; 11 bits of LCD data for operating an LCD display from the LCD display DSP 3010; and command signals from microprocessor 3020. In this embodiment, the deserializer portion of the serializer/deserializer 3005 receives a digital stream from the control and display module, and separates and formats the information contained in the digital stream into the following signals: one bit of synchronization signal for use by the microprocessor 3020; 8 bits of video data for use by the audio/video processor 3025; one bit of clock signal for use by the audio/video processor 3025; optionally, 3 bits of audio data for use by the audio/video processor 3025; and command signals for the microprocessor 3020. The microprocessor 3020 provides command signals for program control to the programmable clock generator 3015.

There are also input and output signals associated with the base module. The audio/video processor 3025 provides 3 bits of digital audio signals to the digital-to-analog converter (D/A) 3045 which generates analog audio, that is provided to an audio output terminal. The audio/video processor 3025 provides 8 bits of digital video signals to a video encoder 3040. A clock signal having approximately 27 MHz frequency is provided to the video encoder 3040, which provides an output signal in the s-video format. The approximately 27 MHz frequency clock signal is also provided to the programmable clock generator 3015, which uses the signal to generate the PAL and/or NTSC video clocks, and to the audio/video processor 3025. The approximately 27 MHz clock signal is provided by one of a video decoder 3030 that accepts an s-video input, or by a 27 MHz reference clock. A switch 3050 is used to connect one, and only one, of the two 27 MHz signal sources to the programmable clock generator 3015, the video encoder 3040, and the audio/video processor 3025. When the s-video input 3030 is active, a synch signal is provided from the input 3030 to the microprocessor 3020.

Referring to additional circuit components that can be incorporated into base module 34, circuit 3000 can include a Pentium M microprocessor 3106, host bus 3107, a North Bridge Intel 855GM chip 3108 with AGP VGA controller 3140 which is coupled to a volatile memory SD RAM labeled reference numeral 3110, a hub interface, and a South Bridge INTEL 82801 DB chip 3116. South Bridge 3116 is coupled to the described video signal processing over PCI bus 3104. Referring to further aspects of circuit 3000, circuit 3000 includes program memory EEPROM 3112 coupled to South Bridge 3116, and a storage device 3114 such as a hard drive couples to South Bridge 3116. South Bridge 3116 is also coupled to a variety of input/output and user interface devices including pointer controller 3120 (e.g., mouse, trackball) a keyboard 3122, I/O interface 3124, Ethernet interface 3126, and USB interface 3128. As is indicated by block 3130, apparatus 100 can have one or more radio transceiver cards for providing radio communication with an external radio transceiver or radio block 3130 can be provided by one or more of an IEEE radio transceiver or a Bluetooth radio transceiver. As explained in connection with the description of FIG. 6a, apparatus 100 can include a GPS location detector 5206 outputting location coordinate values which can be coupled to South Bridge. Apparatus 100 can also include DSP block 3102 for processing digital signals received from audio/video processing block 3025. For collecting a media file apparatus 100 can save a media file into one or more suitable memory devices such as working memory device 3110 and/or storage device 3114. Apparatus 100 can utilize pipelining methods and/or frame buffering methods for associating metadata to media file.

Processor 3106 in one embodiment runs a multitasking operating system such as LINUX or WINDOWS XP and supports the TCP/IP protocol stack together with an HTTP web browser supporting HTTP communications. The processor 3106 can run advanced applications such as those capable of interpreting script and presenting graphical user interface applications in which a GUI can be displayed on display 1602 including, e.g., Internet Explorer, spreadsheet applications. Pointer such as pointer 7026 in such applications can be controlled with use of interface 1604; where joystick 5118 and a pair of buttons, e.g., buttons 5106 and 5114 are used as a pointer controller. A dedicated laptop style touchpad pointer 5138 can also be integrated into control and display module 16 as shown in FIG. 3d.

In one embodiment microprocessor 2945 of control and display module 16 like processor 3106 and computers 600-1, 700-1, 600-2, 700-2 can run a multitasking operating system, incorporate the TCP/IP protocol stack, and incorporate an HTTP web browser to supports HTTP communications. In another embodiment microprocessor 2945 does not incorporate a web browser, but nevertheless is able to display HTML files such as form 7000 when provided by an HTML file and form 8000 when provided by an HTML file. Any computer of system 1000, e.g., computer 100-1, 100-2, 100-3, 600-1, 600-2, 700-1, or 700-2, can be configured to be capable of searching stored files to identify desired files, such as for example, files relating to prior inspections of industrial components or manuals associated with such components. As discussed more fully herein in connection with metadata, the search ability of the system may optionally be enhanced by tying searching for files to indexing metadata associated with the files. When searching is performed at apparatus 100, searching commands can be input into a user interface of the base module 34 or, alternatively, the control and display module 16. The specific software usable for such searching may be by means of a custom LINUX-based application or by an existing commercial application, such as; for example, GOOGLE DESKTOP or WINDOWS EXPLORER. For enabling control and display module display 1602 to display web pages without incorporating web browsing software into control and display module 16, desktop display images created at base module 34 can be captured by base module processor 3106 and sent over serializer circuit 3005. For display of a form provided by an HTML file at display 1602 of control and display module 16, processor 3106 can capture desktop images developed at AGP VGA controller 3140 of North Bridge; send the VGA image data to DSP 3010 at a rate of about 10 frames per second. DSP 3010 in turn can feed the image data to serializer circuit 3005 for receipt at control and display module 16. While the visual inspection system described herein is particularly useful in an industrial equipment article visual inspection system it will be appreciated that its features can find use in other inspection systems including visual inspection systems for inspecting objects other than industrial equipment articles.

Figure 3C:
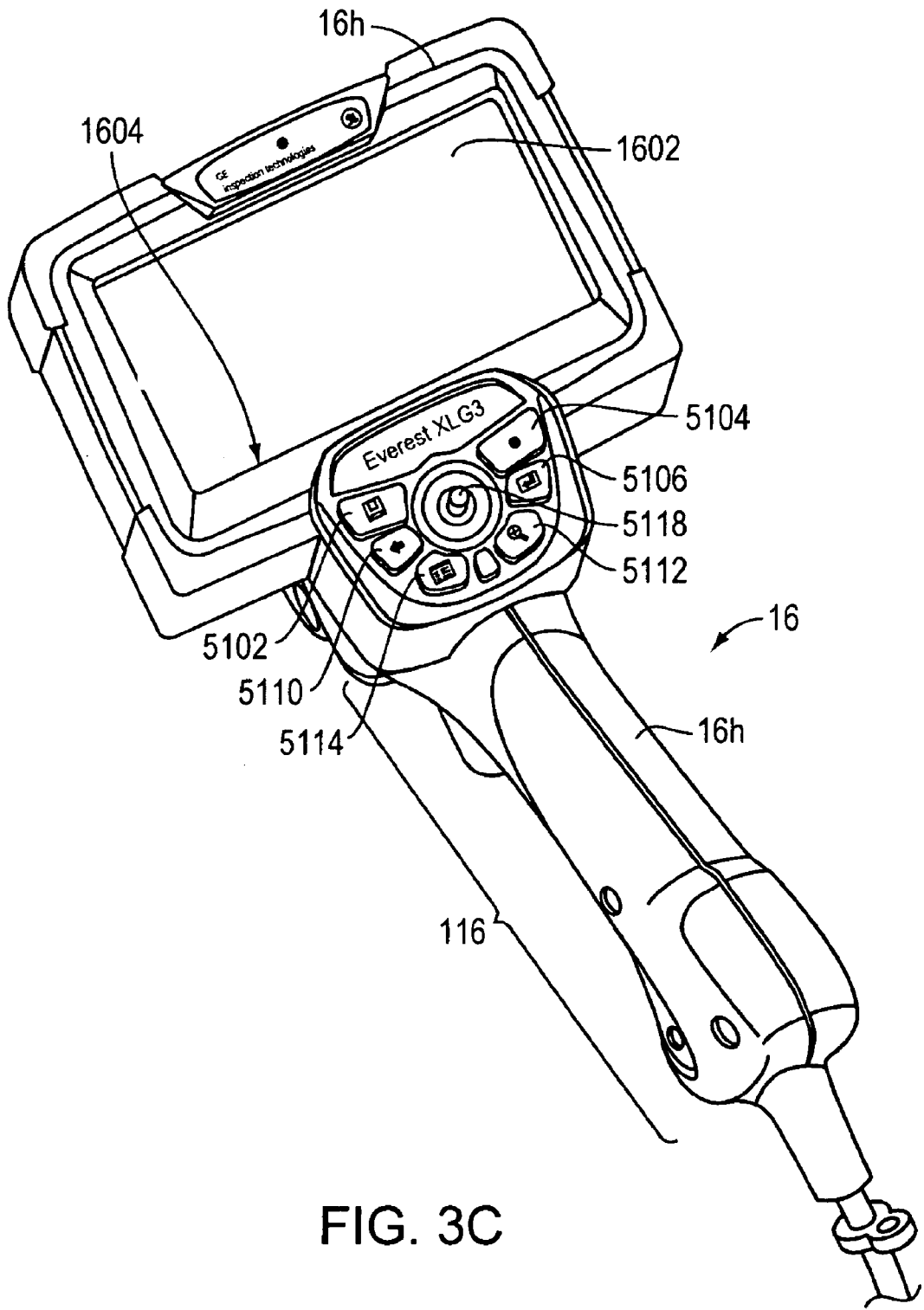
Figures 2, 3C:
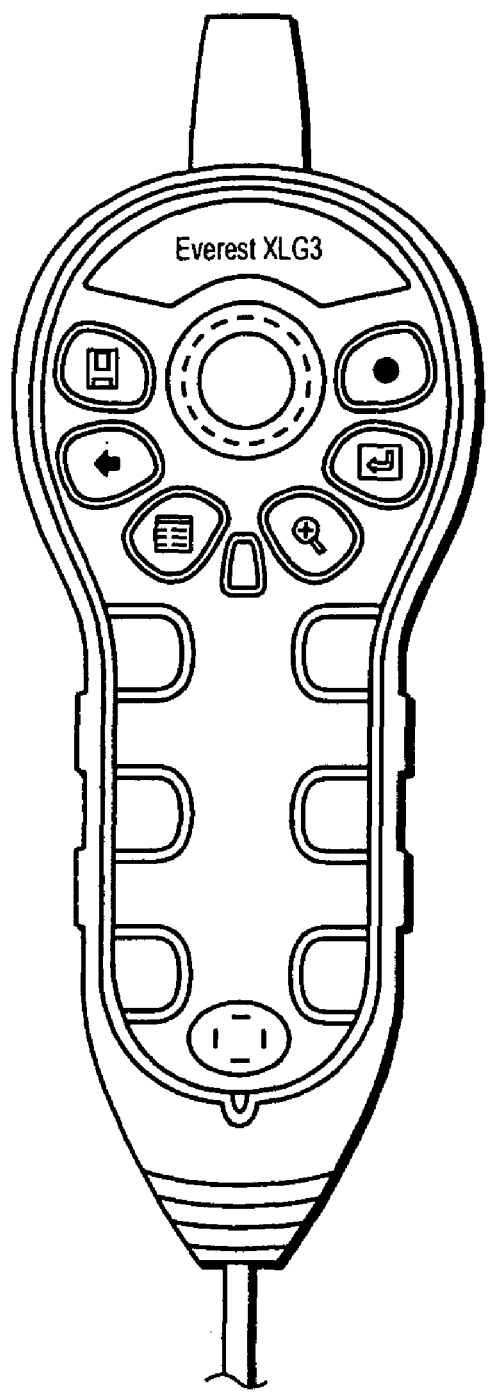
Figure 3D:
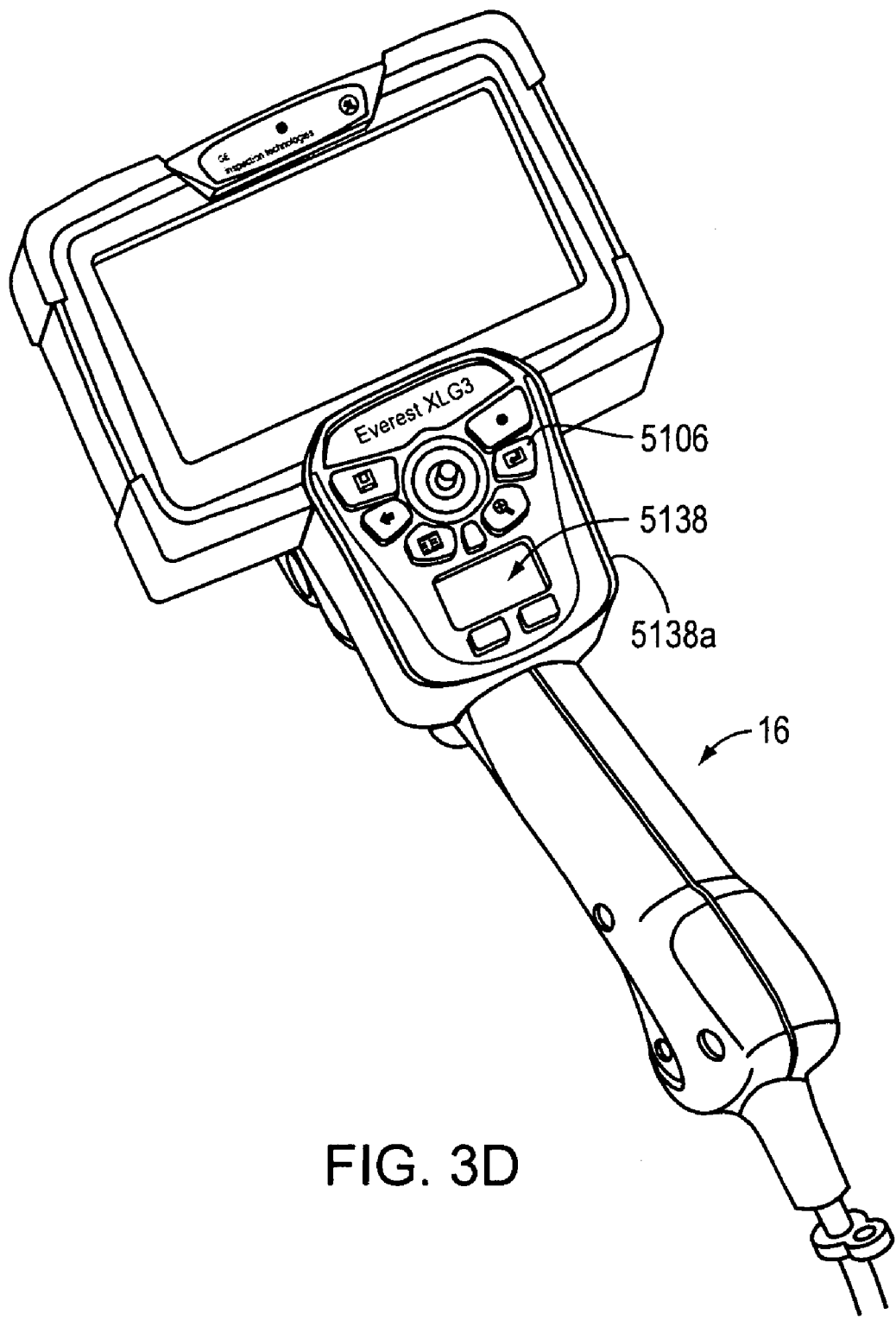
FIG. 3d illustrates an alternative configuration for a control and display module wherein a dedicated pointer controller is integrated into a control user interface of the control and display module.

FIG. 3c is a perspective drawing that illustrates features of a control and display module 16. A drawing of the front face of the control and display module, including an embodiment of a user control interface 1604 is shown. Various buttons are provided for the user to depress in order to issue commands, such as the button 5110 marked with an arrow that causes a then active program to exit when the button 5110 is depressed. Other buttons are marked, and perform preprogrammed functions as follows: the button 5112 marked "Zoom" permits the operator to zoom in (or with the use of a toggle switch, to zoom out) on an image of interest; the button 5102 marked "Save" permits the operator to save the current image; the button 5104 marked "Record" permits the user to record video; the button 5114 marked "Menu" upon activation by a user displays a menu, and when activated a second time, turns off the display of the menu. Joystick 5118 enables an inspector to manipulate a position of elongated inspection module 12. In FIG. 3c there is also shown content from an excerpt from a product manual. Appendix A which is attached as an appendix to U.S. Provisional Patent Application No. 60/786, 829 filed Mar. 27, 2006 is also incorporated herein by reference. The appendix describes exemplary configurations for actuators of control interface 1604 and numerous additional features that can be incorporated into system 1000. In another embodiment, control interface 1604 can include a touch screen overlay disposed over display 1602.

Guiding an Inspector

In one embodiment apparatus 100 can be configured to guide an inspector in performance of an inspection procedure. In the illustrative example described with reference to the screen shot views of FIGS. 4a-4d and the flow diagram of FIG. 4e apparatus 100 guides an inspector through a process of inspecting an equipment article such as an aircraft engine or another industrial equipment article. In the example described apparatus 100 can be configured (adapted) to provide feedback to an inspector indicating when a step of a procedure has been completed. Apparatus 100 in the described example can also be configured to indicate to an inspector when a procedure has been completed and can be configured to encourage an inspector to complete a procedure by disabling user interface controls which normally allow an inspector quit performance of an inspection procedure. In effect apparatus 100 operates as an electronic instruction manual having all of the content of a paper instruction manual with the content of the instruction manual being interactively communicated to an inspector. In the screen shot views the scene displays can be displayed on display 1602 of hand held control and display module 16. These views in a default mode of apparatus 100 can be simultaneously displayed on monitor 42 of apparatus 100.

Figure 4A:
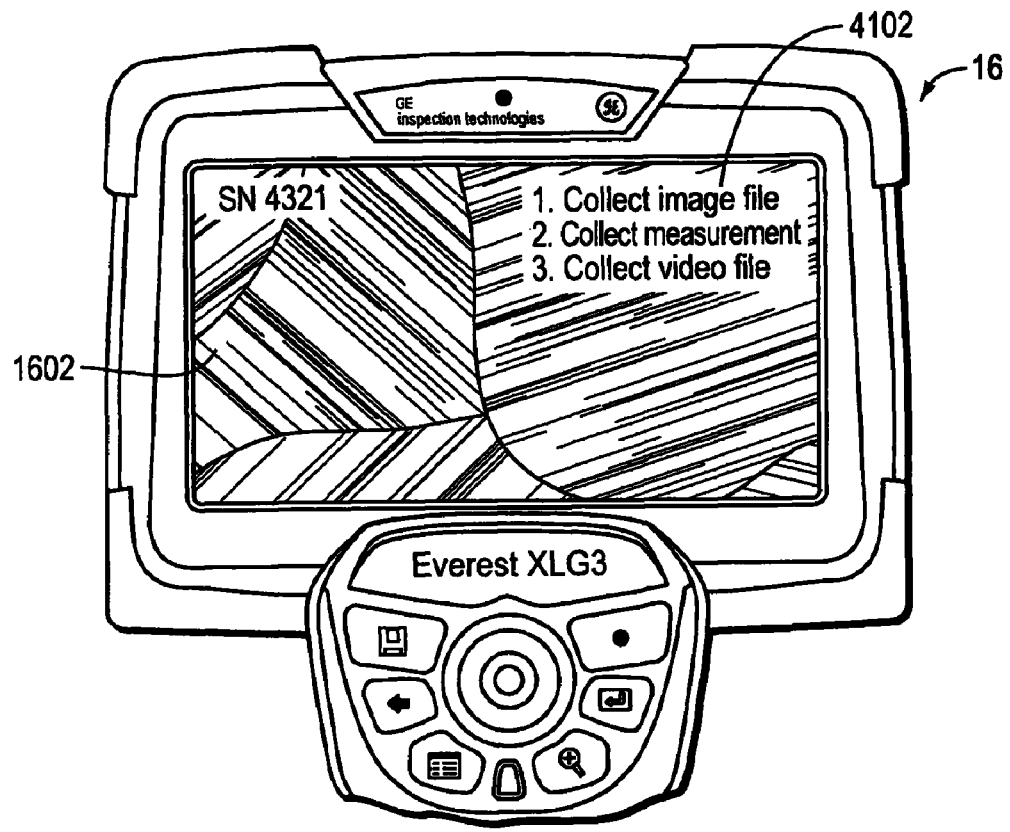
FIGS. 4a through 4d are a series of screen shots showing screen displays that illustrate a guide feature for guiding an inspector.
Figure 4B:
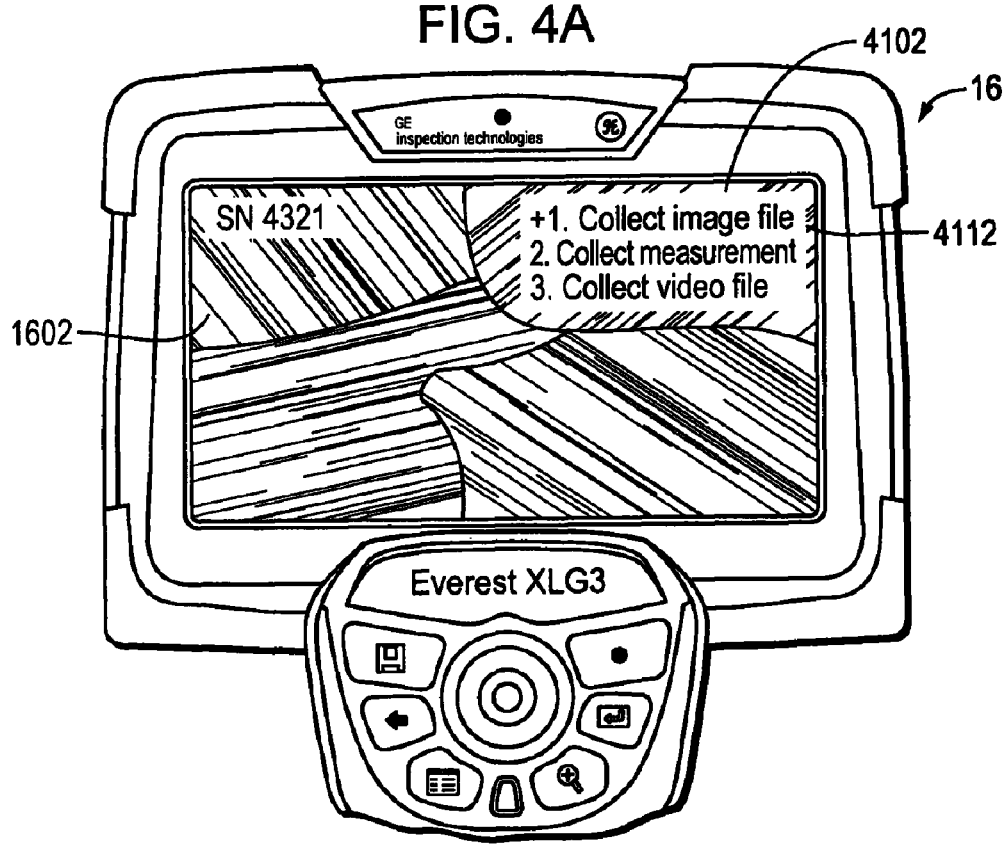
Figure 4C:
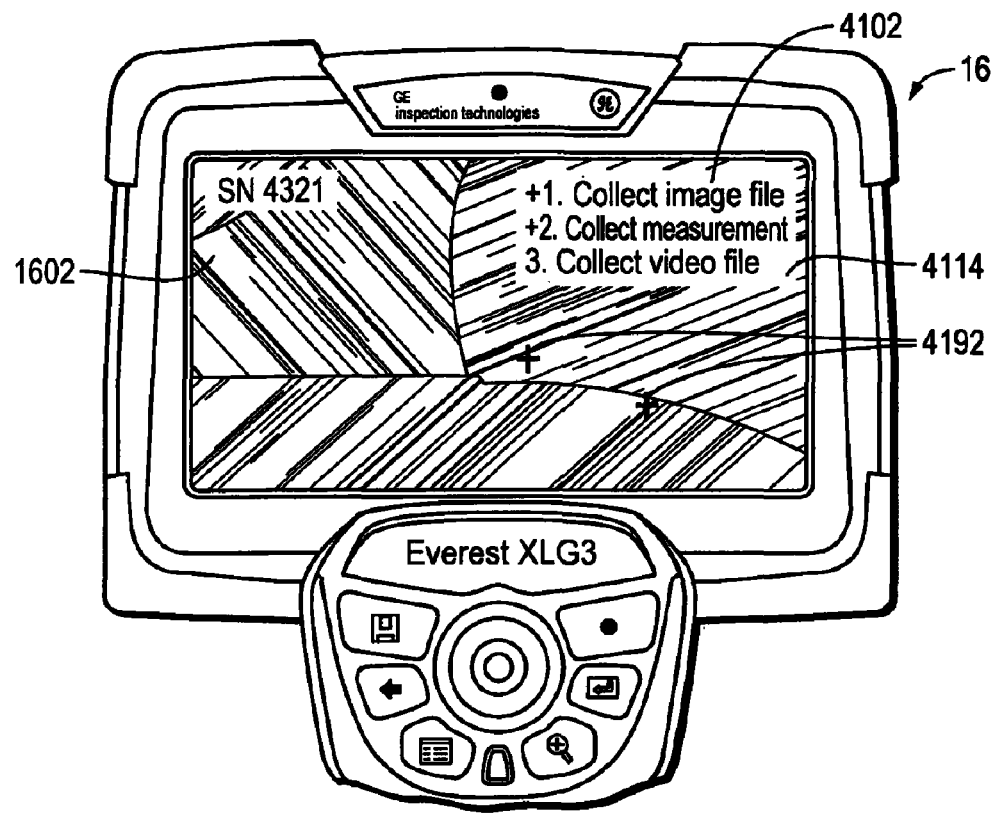

Referring to the flow diagram of FIG. 4e, apparatus 100 at block 4002 can wait for an inspector to initiate a procedure for inspecting a specific equipment article. At block 4002 apparatus 100 may be displaying menu screen with text indicating a number of candidate inspection procedures. The text may be the serial number of several equipment articles, each serial number indicating a different candidate inspection procedure. When a specific one of the inspection procedure menu options is selected, e.g., by actuating button 5106, apparatus 100 can proceed to block 4004 to display a root screen display displaying text describing each step of an inspection procedure. As shown in FIG. 4a, by way of example a root screen display can display at area 4102 text describing the steps of an inspection procedure including the steps of 1, collect image file, 2, collect measurement, and 3, collect video file. Of course an inspection procedure can have different types of steps (e.g., an audio file collection step) a greater number of steps a fewer number of steps, a different arrangement of steps and/or redundant steps (e.g., two image capture steps). System 1000 in some embodiments as will be described herein can be configured to support a data entry step and a step performance acknowledgement step. In the example of FIGS. 4a-4d, apparatus 100 displays on display 1602 a live streaming video view of the equipment article being inspected throughout the time an inspection procedure is being conducted.

Referring again to the flow diagram of FIG. 4e, apparatus 100 after executing optional decision blocks 4008, 4012 which will be described in greater detail herein can proceed to block 4016 to determine whether a step of the procedure has been completed. Apparatus 100 can carry out the processing of block 4016 in a number of alternative ways. For example, apparatus at block 4016 can determine whether an appropriate combination of controls of user interface, e.g., interface 1602 has been actuated. Also at block 4016, apparatus 100 can monitor the contents of a memory of apparatus 100, e.g., memory 3110 or 3114 to determine whether the apparatus has collected a file that is consistent with the requirement of a step. For example, if a step requires there to be an image file collected, apparatus 100 can monitor at block 4016 whether apparatus 100 has collected an image file. For configuring apparatus 100 to determine whether a step of an inspection procedure has been completed, apparatus 100 can retain a list 4050 an exemplary illustration of which is shown in FIG. 4f. List 4050 can include at least one column 4052 indicating the file types of files that need to be collected but in some embodiment as is indicated in FIG. 4f the list can be a table having additional columns such as characteristics column 4054 and ordering column 4056 where a completion of a procedure in a specific ordering is required. For execution of the processing at block 4016, apparatus 100 can compare a last collected file collected by apparatus 100 to the retained list 4050 to determine whether the last collected file corresponds to a file required by list 4050. List 4050 can be regarded to represent steps of an inspection procedure to be performed. If apparatus 100 at block 4016 determines that a step has been completed, apparatus 100 can proceed to block 4020 to update the screen display so that the screen display displayed by apparatus 100 displays an updated screen display providing feedback to the user indicating that apparatus 100 has determined that a step of the procedure has been completed. An exemplary operation of screen display update of block 4020 is illustrated in connection with the screen shot views of FIGS. 4a and 4b. If apparatus 100 determines that apparatus 100 has successfully collected an image file satisfying step 1 of the illustrated procedure apparatus 100 can at block 4020 update the screen display so that the screen display is in the form shown in FIG. 4b with text 4112 describing the collect image file step of the procedure highlighted. In the example provided, the text 4112 describing the image file collection step is displayed in bold font and a checkmark is displayed adjacent the text. It will be understood that other types of highlighting would be suitable, e.g., different color, different font, removal of the text altogether. In addition or in the alternative at the time apparatus 100 executes block 4020 to update a screen display, apparatus 100 may emit a beep or other acoustic output to confirm to an inspector that apparatus 100 has determined that a step has been completed. Whether a display is updated or an acoustic output is actuated an inspector can be provided with feedback indicating apparatus 100 has determined that a step has been successfully completed.

Referring again to the flow diagram of FIG. 4e apparatus 100 at block 4022 can determine whether all of the steps of a present procedure have been performed, e.g., by referencing list 4050 and can proceed to block 4022 if all of the steps have been completed. List 4050 can have a flag column 4058 having a flag for each represented step that is raised when apparatus 100 determines that a step of an inspection procedure has been completed. In the described example apparatus 100 will not proceed to block 4026 until a measurement step (step 2) has been completed and a video file collection step (step 3) has been collected. For completion of a measurement step an inspector may input controls into user interface 1602 to enter a measurement mode in which cursors 4192 are displayed on display 1602. The cursors can be positioned on said display for enabling an inspector to designate an area of a displayed image to be subject to a distance (length) measurement. In a measurement mode, the apparatus can calculate a distance (length) measurement between a pair of points designated to be subject to a distance measurement by placement of the cursors. In measurement mode, a distance (length) measurement may be collected by apparatus 100, e.g., relating to a length of a crack on an equipment article being inspected. When a distance measurement is collected the measurement data may be included into an image file, e.g., by writing the measurement data into an empty field of the image file. Accordingly, where media files are referred to herein it is understood that such reference can be a reference to measurement data such as distance measurement data. At block 4016 apparatus 100 may determine that a measurement step has been successfully performed by reference to list 4050. Specifically, apparatus 100 may reference characteristic column 4054 and determine that measurement step has been successfully completed if apparatus 100 determines that an image file including measurement data has been collected. Referring to the screen shot view of FIG. 4c, apparatus 100 when determining that a measurement step has been completed (block 4016) may update the screen display (block 4020) so that text 4114 describing the measurement step is highlighted.

Figure 4D:
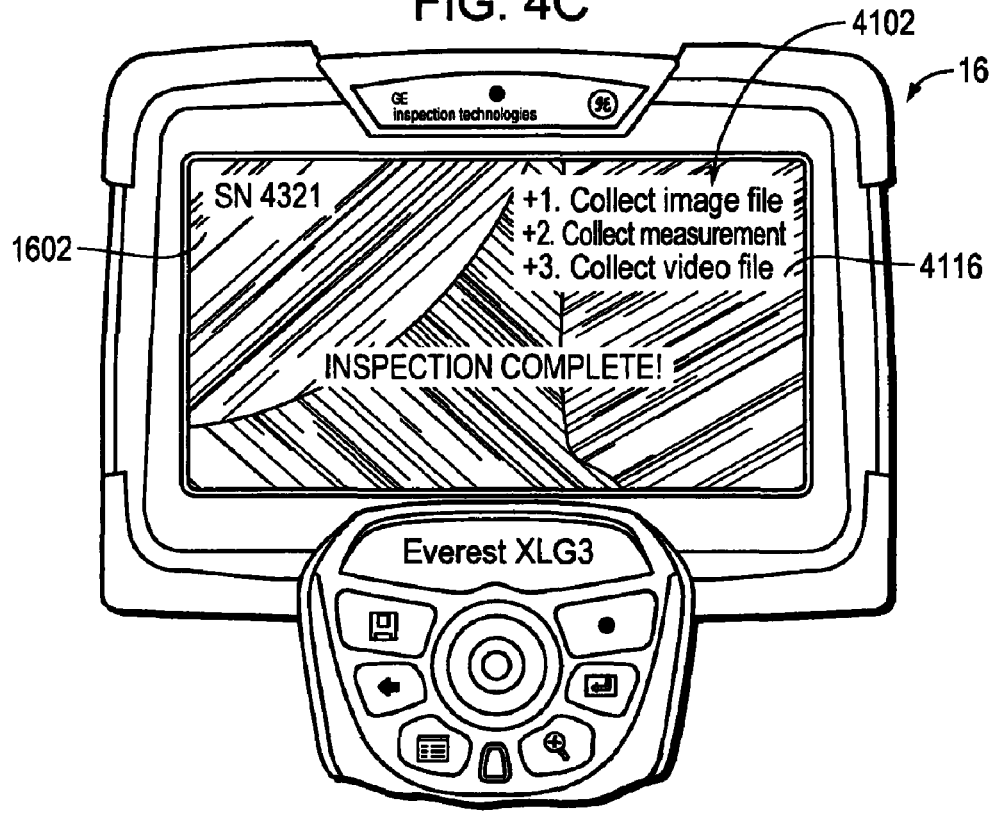

Referring still the flow diagram of FIG. 4e, apparatus 100 can determine that step 3 of the described procedure (video file collection) has been completed when apparatus 100 determines referencing list 4050 that a video file has been collected. When determining that a video file has been collected (block 4016) apparatus 100 can proceed to block 4020 to update the screen display so that displayed on display 1602 is a screen display as shown in FIG. 4d with text 4116 describing the video file collection step highlighted. After updating the screen display to the state indicated by area 4102 of apparatus 100 in executing block 4022 may (again referencing list 4050) determine that all steps of the inspection procedure have been completed and can thereafter proceed to block 4026 to display a confirmation message on display such as "INSPECTION PROCEDURE COMPLETE!" as indicated in the view of FIG. 4d providing positive feedback to the inspector indicating that a procedure has been completed. Apparatus 100 can then proceed to block 4030 to enable exiting, e.g., by restoring an exit functioning to an exit button as will be described and then to block 4034 to determine, e.g., if an exit button 5110 has been actuated. If an enabled exit button is actuated, apparatus 100 may proceed to block 4038 to exit the current inspection procedure and return to a previous mode such as the previously described menu display mode. As an alternative to block 4038 apparatus 100 may automatically exit the current inspection procedure mode after a confirmation message is displayed at block 4026 for time sufficient for the inspector to comprehend the message (e.g., 2 seconds).

In one embodiment, apparatus 100 may have a user interface button, such as button 5110 (FIG. 3c) which is normally configured to execute an EXIT function. For example, apparatus 100 can be configured so that when EXIT button 5110 is actuated, program control reverts to previous program or a present mode of operation is exited. For example, apparatus 100 can be configured so that actuation of EXIT button 5110, when a live streamlining video image is being displayed on display 1602, causes apparatus 100 to exit the live view mode and return to previous non live view mode such as menu mode active prior to the live view mode being commenced wherein a variety of menu options are displayed (e.g., a plurality of candidate inspection procedure options).

In accordance with a particular guide related feature, apparatus 100 can be configured so that as part of block 4004 apparatus 100 disables an exit function of an EXIT button 5110 of apparatus 100 such that actuation of the exit button will not be effective to provide a normal exit function normally associated with actuation of the button until apparatus 100 restores the exit functioning. It will be seen that disabling of an exit functioning in the manner described in connection with the flow diagram of FIG. 4e can encourage an inspector to complete every step of a procedure to significantly reduce incidents where an inspection procedure has to be re-performed as a result of all of the required data shot being collected.

Additional aspects of an illustrative guide feature are described with reference to blocks 4008 and block 4012. At block 4008 apparatus 100 can determine whether an inspector has made an attempt to exit the present inspection procedure, e.g., by actuating EXIT button 5110 previously disabled at block 4004 prior to a determination by apparatus 100 at block 4022 that all steps required of the present inspection procedure have been completed. If apparatus 100 at block 4008 determines the inspector has made a prohibited attempt to exit prior to the required steps of a procedure being completed, apparatus 100 can proceed to block 4040 to display a message on display 1602 for a period of time that allows comprehension such as "INSPECTION PROCEDURE NOT COMPLETE" or "MORE STEPS REQUIRED" or another similar message indicating to an inspector that a present inspection procedure is not complete. As part of executing block 4040, apparatus 100 can also send a message to an external computer 600-1, 600-2 indicating that an inspector has made an attempt to exit an inspection procedure prior to its completion. System 1000 can be configured so that an external computer 600-1, 600-2 in response to receipt of such a message actuates an acoustic output and or displays a message on a display 600-1d, 600-2d of the external computer. A supervisor at external computer 600-1 and/or 600-2 can control the external computer to send a command to apparatus 100 to enable exit button 5110 if the supervisor decides to grant clearance to exit the inspection procedure prior to completion. An activation of an EXIT button when exiting is prohibited in one aspect and can be regarded to be a request to override the EXIT control disablement.

At block 4012 apparatus 100 can determine whether there has been an error in attempting to complete a step of a procedure. For example, if a specific ordering of collection of media files is required in an inspection procedure, apparatus 100 at block 4016 can determine that there has been an error in an attempt to complete a step if apparatus 100 has collected a new file but in referencing list 4050 determines that the new file is not of the type required to be collected in view of the required ordering. Apparatus 100 can also determine at block 4012 that there has been an error in attempt to complete a step if a new file has been collected but is not of a file type present on list 4050 or is present on list 4050 but already collected. Apparatus 100 can also determine at block 4012 that there has been an error in an attempt to perform a step if correct file type has been collected but that the file type does not satisfy specified requirements. Referring to characteristic column 4054 of list 4050 there can be requirement that a collected video file have a certain duration requirement. If apparatus 100 were to collect a video file of less than 10 seconds in the illustrative example, apparatus 100 can determine that there has been an error in an attempted performance of a step. Where apparatus 100 determines that there has been an error in an attempt to perform a step, apparatus 100 can proceed to block 4044 to execute an error routine. Such a routine can comprise, e.g., displaying a message on display 1602, e.g., "FILE ARLEADY COLLECTED" "INSUFFICIENT VIDEO LENGTH" corresponding to the situation to indicate to an inspector that the apparatus 100 has determined that there has been an error in an attempt to complete a step. Such negative feedback can be expected to discourage the inspector from repeating the error and to focus the attention of the inspector. In addition, as part of the error routine, block 4040 apparatus 100 can erase any partial or full files that it determines were collected pursuant to an attempt to complete a step made in error. Such erasure saves memory space, adds clarity to generated reports, and eliminates time that would have to be compiled by data management agents in analyzing erroneous data.

While a useful embodiment has been described with reference to FIG. 4a-4f wherein an inspector is guided through an inspection procedure, it will be described later herein that guiding of an inspector can be enhanced with use of forms which among other advantages efficiently allow an inspector to enter inspector-defined data and efficiently allow reconfiguring of apparatus so that apparatus performs a developer-defined guiding function. For example, the program function described with reference to the processing functions of the flow diagram of FIG. 4e together with the data of list 4050 can be provided for with script that is included in a form. While different flow diagram are included herein to highlight specific features it is understood that apparatus 100 need not incorporate all of the functions of any given flow chart and furthermore that apparatus 100 can advantageously combine collectively and simultaneously all of the advantages described with reference to each flow diagram.

Metadata Association

In one aspect of system 1000, media files (image files and video files including audiovisual files) can be associated with "metadata," i.e., data about the data, and in one embodiment, data that describes the files. Files can be associated 1 with metadata at apparatus 100 so that the files can later be easily organized and analyzed. The associating can be accomplished, e.g., by referencing a collected media file within a text file having the metadata expressed in text of the text file suitable for referencing a media file (e.g., HTML, XML) or by embedding the metadata within a media file. The set of metadata-associated files are thereby in a form suitable for searching. Further, the set of metadata-tagged files can be processed by an application which processes the files into a form that further enhances the capacity of the media files to be searched and/or analyzed.

Figure 5A:
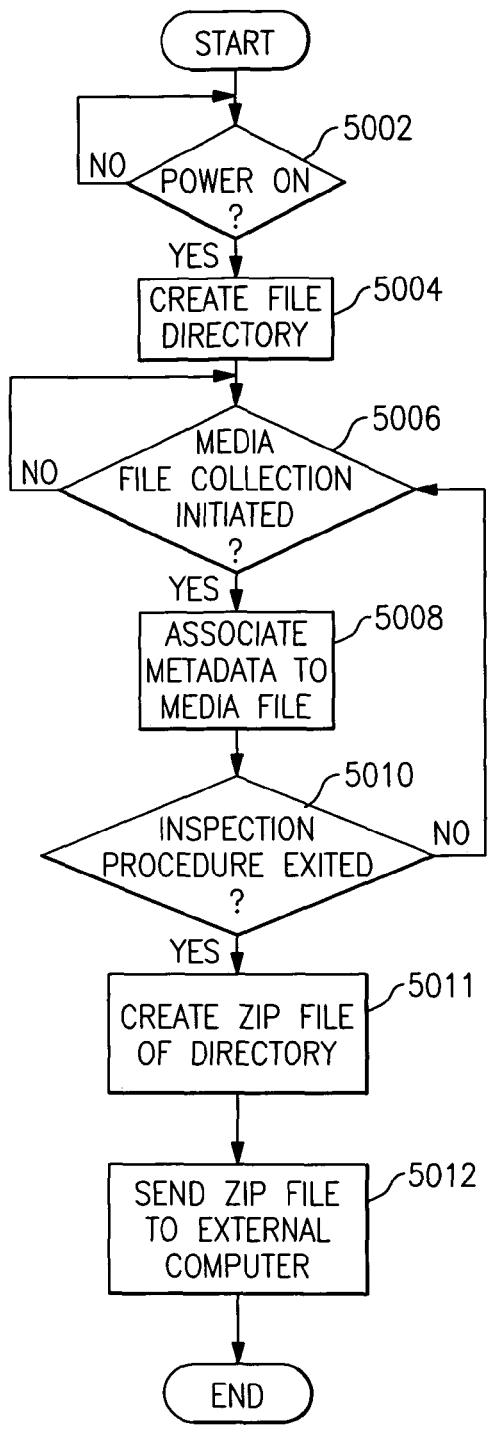
FIG. 5a is a flow diagram illustrating a method that can be carried out by a visual inspection apparatus.
Figure 5B:
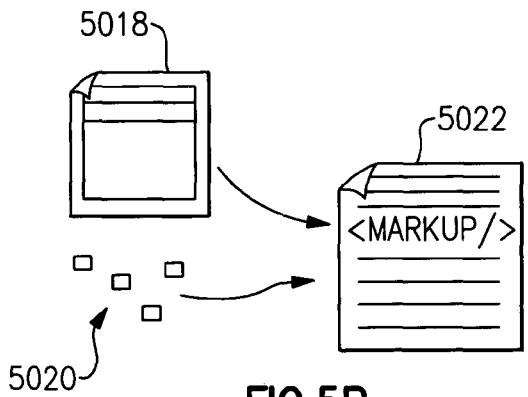
FIG. 5b is a set of diagrams illustrating a possible method of associating metadata and a media file.
Figure 5C:
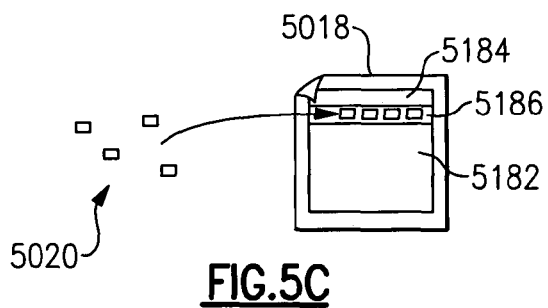
FIG. 5c is a set of diagrams illustrating another possible method of associating metadata and a media file.

Metadata can be regarded as being data that describes other data. In the presently described system 1000 metadata can be data that describes media files. In examples provided, metadata can include among other types of data, data indicating an environment condition, equipment or job number of a media collection procedure. A flow diagram illustrating steps of associating metadata to media files is shown in FIG. 5a. At block 5002 apparatus 100 waits for apparatus 100 to be powered up. At block 5004, apparatus 100 creates a file directory (folder) for all media data to be collected during an inspector's procedure that lasts from the time of power up at block 5002 until the time the procedure is exited at block 5010. At block 5006 apparatus 100 waits for an inspector to initiate collection of a media file. To initiate media file collection, an inspector may press button 5102 to initiate collecting a still image file or may press Button 5104 to initiate collection of a video file. When initiating a media file collection, an inspector may be operating apparatus 100 in a measurement mode in which cursors can be positioned on said display for enabling an inspector to designate an area of a displayed image to be subject to a distance (length) measurement. In a measurement mode, the apparatus can calculate a distance (length) measurement between a pair of points designated to be subject to a distance measurement by placement of the cursors. When a media file collection is initiated with the apparatus in a measurement mode a media file collected pursuant to the initiation can include measurement data. At block 5008 apparatus 100 associates metadata with media file data. At block 5008 apparatus 100 can associate metadata in a variety of different ways examples of which are described with reference to FIGS. 5b and 5c. Referring to FIG. 5c, an apparatus 100 can associate a media file 5018 and metadata 5020 by writing a reference to a media file 5018 and the metadata 5020 to a common file 5022. In the embodiment illustrated, the text file 5022 can be in a markup language text file format, such as XML or HTML suitable for retaining text and for retaining a reference to media file 5020 such as an image file and video file. In the embodiment illustrated with reference to FIG. 5b, apparatus 100 associates metadata 5020 with a media file by writing the metadata 5020 to the media file 5018. As indicated in the view of FIG. 5c, a media file 5018 can have image/video data fields 5182, file characterizing fields 5184 e.g., compression information and empty fields 5186. For associating metadata with a media file apparatus 100 can write the metadata to an empty field 5186 of media file 5018. Media file 5018 in the example of FIG. 5c can be e.g., a PDF file, a TIF file, a BMP file, a JPG file, an AVI file, an MOV file, an MPEG file, an ASF file or another type of image or video file including audiovisual (multimedia files). Media file 5018 can also be an audio file (e.g., WAV). In the example of FIG. 5c, metadata 5020 is included into a media file 5018. Media file 5018 having metadata 5020 can be transferred to a computer, e.g., 600-1, 700-1, 600-2, 700-2 external and spaced apart from apparatus 100 so that both a media file and metadata associated with the media file can be transferred with a transfer of the single media file. Metadata 5020 can be conveniently expressed in N-bit values such as byte (8-bit) values. In one embodiment apparatus 100 can associate metadata to a media file by redundantly executing both of the methods described in connection with FIGS. 5b and 5c.

Still referring to the flow diagram of FIG. 5a, apparatus 100 at block 5010 may determine whether a media file collection procedure (inspection procedure) has been completed. At block 5010 apparatus 100 may determine whether an inspector has ended a media file collection procedure by pressing a procedure exit button such as button 5110. If an exit button has not been pressed, apparatus 100 can proceed back to block 5006 to wait for an inspector to press button 5102 or 5104 to initiate a collection of another media file. If at block 5006 apparatus 100 determines an inspection procedure has been elected, apparatus 100 proceeds to block 5011 to package the metadata-associated media files. At block 5011 apparatus 100 may package metadata associated media files by writing all of the files of the present media file collection procedure into a common folder. Alternatively, all of the metadata associated media files of the procedure may already have, by default, been written into a common folder. Apparatus 100 can then process all of the files or the folder into a packaging file for containing several files such as a ZIP file, processing the folder containing the several metadata associated files into a ZIP file compressing the files. At block 5012 apparatus 100 may transfer the ZIP file to an external computer such as computer 600-1, 700-1, 600-2, 700-2 for further processing. Apparatus 100 may carry out all of the steps described in FIG. 5a automatically without user input other than the input initiating the media file collection.

Figure 6A:
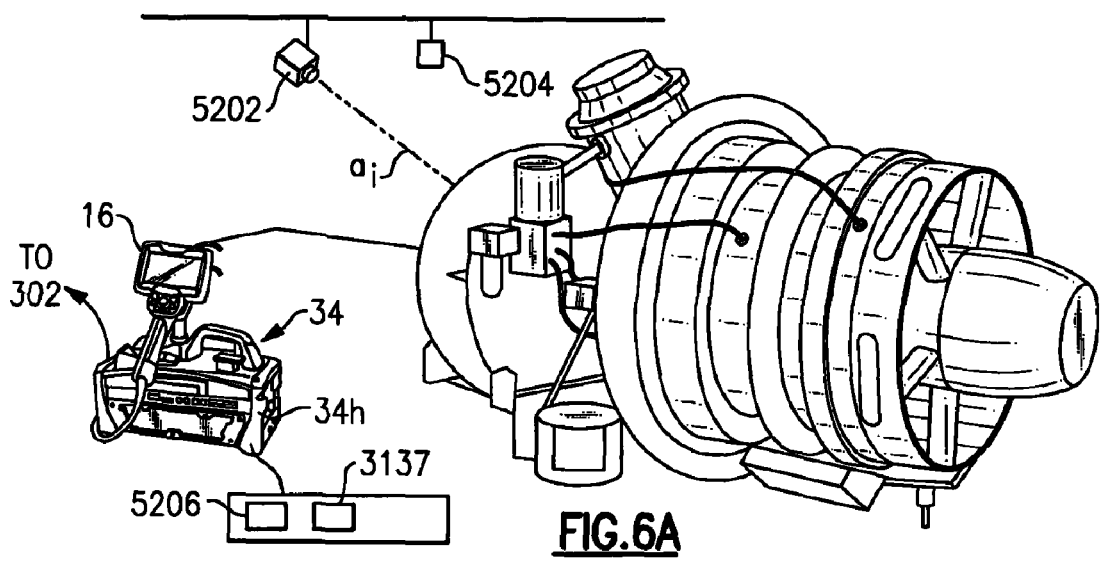
FIG. 6a is a diagram illustrating a free metadata association mode of operation.

In a free metadata-association mode, which can also be regarded as a passive metadata associating mode, the inspector can interact with an inspection apparatus much in the manner of the prior art (e.g., can be taking hand written notes regarding files collected), but nevertheless benefits from having media files associated (tagged) with metadata. In the free metadata-association mode an inspection apparatus receives input from one or more sensors in proximity with the location of inspection—external cameras, location sensors (e.g., GPS), temperature sensors, audio sensors, and the like and associates the collected media files with data from the sensors together with a timestamp from the apparatus. The set of metadata associated files can be processed by an application to generate a standardized index for the files (equipment #, job #) using the metadata and the index can be applied to the files. In the free metadata-association mode an inspector can rather carelessly "snap away" collecting media files without annotating the collection either manually of through data input and still collect a set of files that are indexed for searching and/or analysis. Referring to FIG. 6a, a free metadata association mode is described in further detail. In the mode of operation depicted in FIG. 6a, apparatus 100 passively receives metadata from a variety of sensors and automatically associates the metadata with each media file that is collected by apparatus 100 in response to user input during a media file collection procedure. In the embodiment of FIG. 6a, apparatus 100 receives sensor input from mounted camera 5202 external to apparatus 100 and thermal sensor 5204 external to apparatus 100. Camera 5202 and sensor 5204 can be appropriately configured with suitable hardware and software to send sensor signals to apparatus 100 and apparatus 100 can be appropriately configured with hardware and software for receiving such signals. Apparatus 100 can also have a plurality of internal sensors disposed within housing 34h such as a GPS sensor 5206 and audio sensor 3137 (e.g., microphone) as shown in FIG. 3b. Apparatus 100 can also have a temperature sensor that can be disposed within camera head assembly as is described in U.S. patent application Ser. No. 10/869,822 filed Jun. 16, 2004, entitled "Borescope Comprising Fluid Supply System" incorporated herein by reference. Processor 3106 shown in FIG. 3b can be configured to receive signals from all of the above types of sensors, develop metadata from the signals, and associate all of the above types of data into each media file that is collected during an inspection procedure or media file collection procedure so that each media file collected is a metadata associated media file. Another type of metadata that can be associated with media files, together with the sensor output metadata is a time stamp. Apparatus 100 can be configured to periodically request an accurate time from a remote server (not shown) on the Internet through IP network in order to periodically update an internal clock which used by apparatus 100 to time stamp collected files so that collected files are associated with metadata in the free metadata association mode. The free metadata association mode can be carried out simultaneously with other operating modes. For example in all applications where procedure specific data is associated with collected files as metadata, the sensor device output data and timestamp data can also be associated with collected files as metadata.

As indicated, in addition to utilizing data from sensors and a time stamp as metadata it may be desirable to utilize as metadata for association with collected files data particular to a current inspection procedure being performed such as equipment # (e.g., serial number), site, component name, component #, area of interest, kind of defect, job #, inspector and the like. Such data can, according to the principles set forth herein be defined by a developer. For example, a developer developing a program running the application described in connection with the flow diagram of FIG. 4e can incorporate such procedure specific data into the code of the program which code may be either compiled code or script. One advantage of utilizing forms as will be described further herein is that with forms, robust procedure specific data for association with media files and other files can be easily defined by any person including persons without any understanding of computer language or program coding. Another advantage accruing from the use of forms as will be described herein is that with forms features which guide an inspector in performing an inspection are readily defined.

Use of Forms in Guided Metadata Associating Application

Figure 7C:
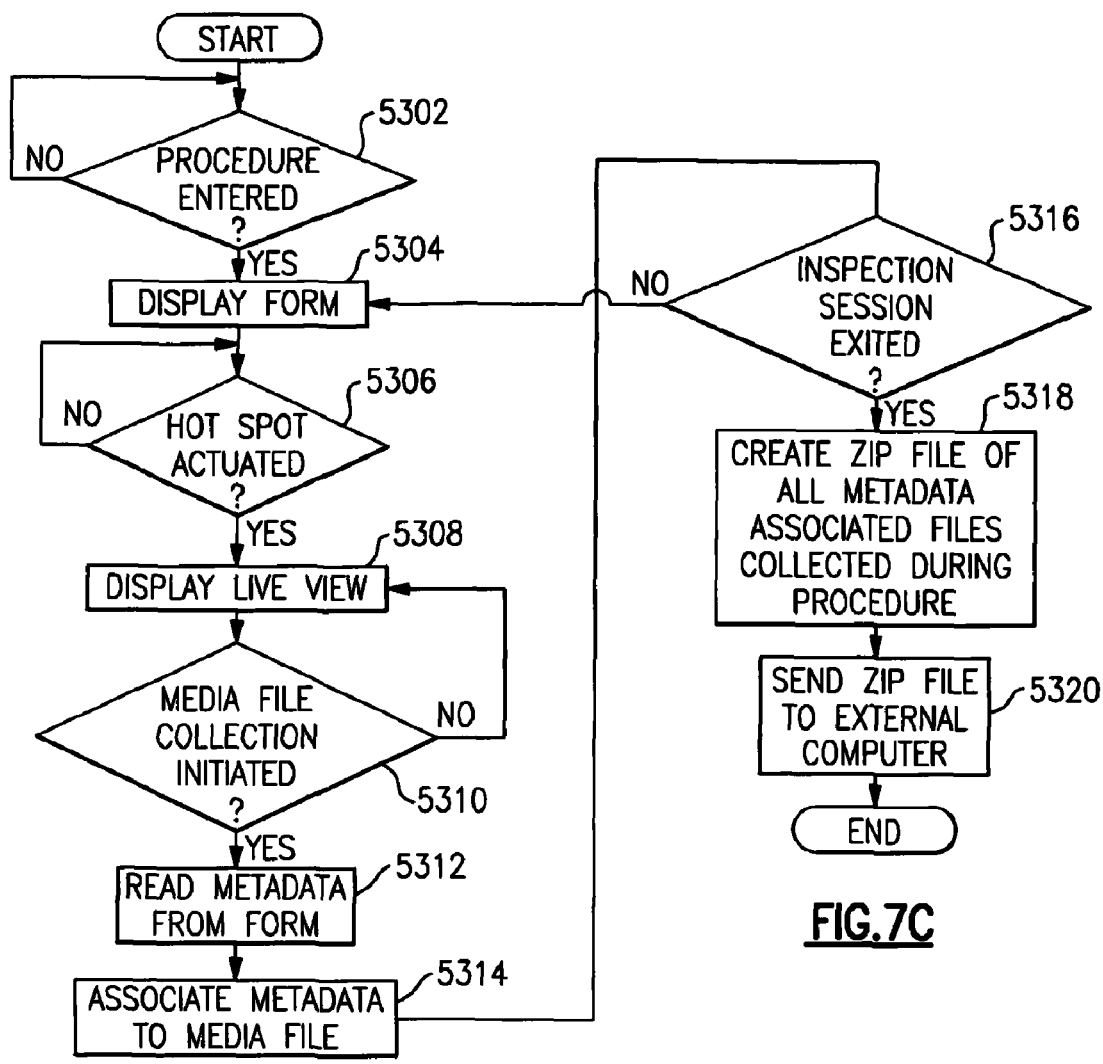
FIG. 7c is a flow diagram illustrating operation of a visual inspection apparatus in one embodiment when reading metadata from a form for association to a media file.
Figure 7A:
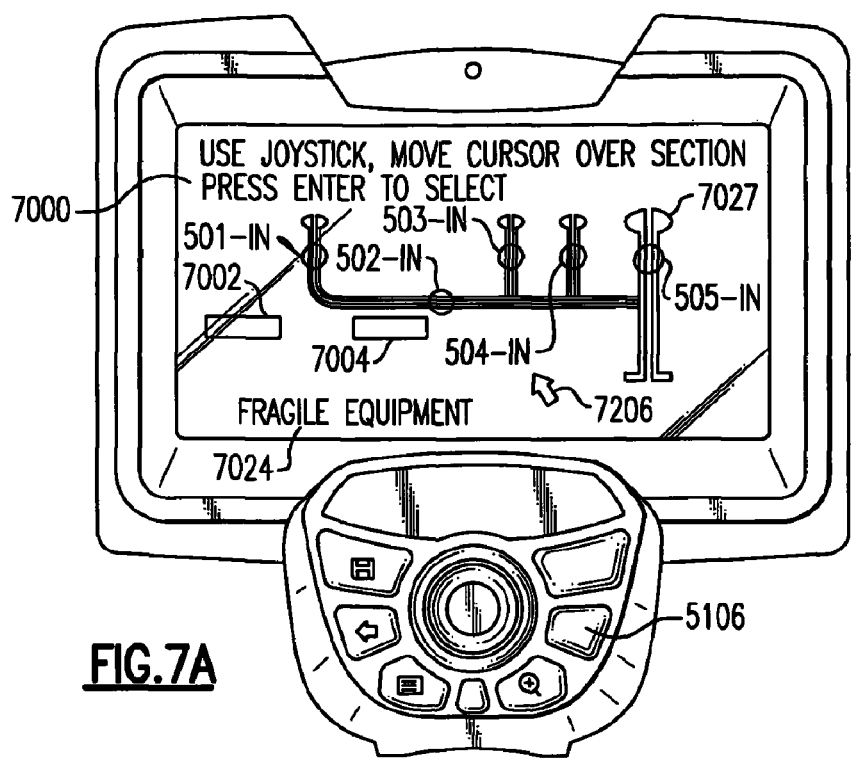
FIG. 7a is a view of a control and display module of a visual inspection apparatus when displaying a guide form.
Figure 7B:
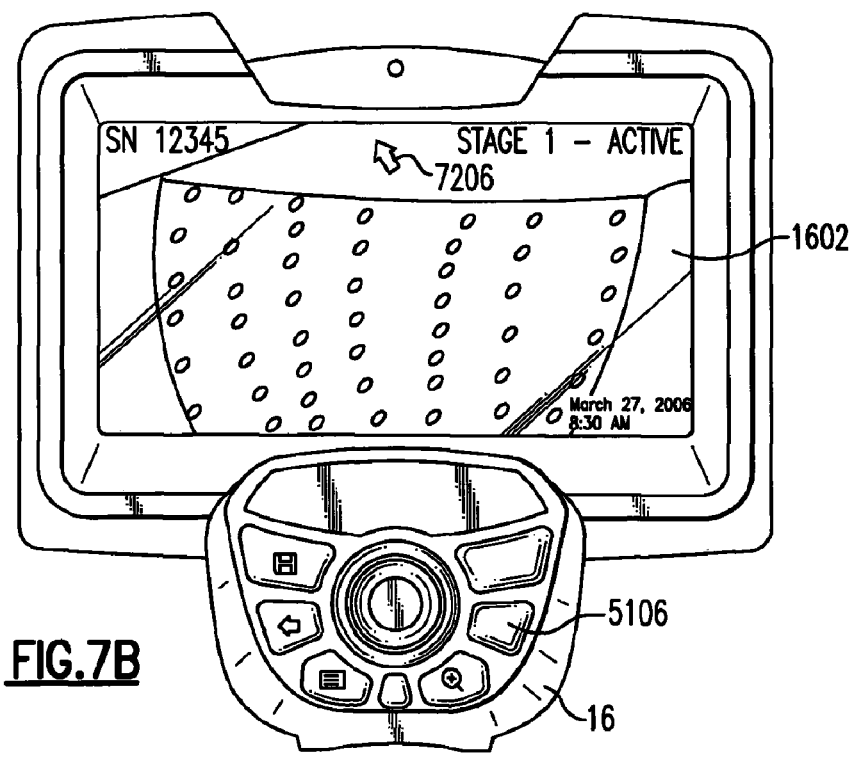
FIG. 7b is a view of a hand set of a visual inspection apparatus in a possible state subsequent to a hot spot of a guide form being actuated.

In the illustrative example described with reference to FIGS. 7a and 7c an application is described in which forms are utilized to guide an inspector in performing an inspection procedure and are further utilized in defining and accessing through inspector input data that associated into collected files as metadata. Forms as are described herein can contain instructions guiding an inspector regarding, e.g., still image pictures to be taken of an equipment article and or measurements to be taken of an article and have features that allow an inspector to maintain accurate knowledge as to where the inspector is in an inspection procedure. For example, it will be appreciated from the present description that an inspection procedure application having all of the inspector guiding features described in the embodiment of FIGS. 4a-4f and numerous additional guiding features can be implemented utilizing forms. Included in file data of the forms described in the example of FIGS. 7a-7c can be data, such as job # or equipment #, suitable for use as metadata when media files are collected. In the example of FIG. 7a-7c data for use as metadata can be data that is parsed from a form and passed as metadata into a metadata associated file. In addition the forms can prompt an inspector to enter data into a data entry field and such input data can passed as metadata into a metadata associated file. In one embodiment the forms are provided by a set of linked HTML files.

Referring to the illustrative example more specifically, FIG. 7a shows a view (screen shot) of screen display displayed on display 1602 of control and display module 16. Apparatus 100 by default can simultaneously display the content of a screen display that is displayed on display 1602 of module 16 on monitor 42. Apparatus 100 can alternately by default also display a "desktop" display screen as will be described herein at display 42 simultaneously while display 1602 is displaying a live streaming video view. Thus, the screen shots described with reference to FIGS. 7a and 7b and all those depicting display by control and display module 16 can be regarded as screen shots displayed on monitor 42. In FIG. 7a, there is shown a screen display wherein apparatus 100 displays a form 7000 on display 1602. Form 7000 aids an inspector in collecting metadata during an inspection procedure. Form 7000 can carry metadata for associating with collected media files, e.g., according to an association method described herein above. Form 7000 can be built prior to the time that it is displayed as shown in FIG. 7a for use during a media file collection procedure. Form 7000 can be built, e.g., at apparatus 100 or at another computer 600-1, 700-1, 600-2, 700-2 and then transferred to apparatus 100. In one embodiment, form 7000 is an HTML file shown in displayed (opened) form. When form 7000 is built, metadata can be coded into the form. For example, metadata expressed as text can be written into an HTML file providing the form. Such metadata can include, e.g., job # or equipment #. Accordingly, when form 7000 resides at apparatus 100, apparatus 100 can parse the metadata from the form and pass the metadata to any collected media file. Referring to aspects of form 7000, form 7000 includes a depiction 7027 of an equipment article being subject to an inspection procedure plurality of "hot spots," 501-IN, 502-IN, 503-IN, 504-IN, 505-IN. The hot spots are located at spaced apart locations of an equipment article depiction (in the case shown a piping system) corresponding to spaced apart physical locations of the equipment article being subject to inspection. The hot spots indicate specific areas of an equipment article requiring inspection.

The hot spots 501-IN, 502-IN, 503-IN, 504-IN, 505-IN prompt an inspector to conduct an inspection procedure in a series of stages wherein data relating to a different physical area of an equipment article is to be collected during execution of each stage. In the example of FIG. 4a-4f, steps of a procedure were defined. In the example of FIGS. 7a-7c it is seen further that, for purposes of guiding an inspector, stages can be defined for an inspection procedure, wherein each stage can have one or more procedure steps. In the example of FIGS. 7a-7c each stage relates to a specific physical area of an equipment article, i.e., the data to be collected during completion of a particular stage should relate to a particular physical area of an equipment article being inspected. However, it will be noted stage definitions can be provided for an inspection procedure for purposes of improving an organization of a procedure to thereby guide an inspector without the stages relating to an area of physical location.

Referring again to the screen display (view) of FIG. 7a, when any one of the hot spots is actuated (selected), a live view corresponding to the present field of view of camera head assembly 14 can be viewed by an inspector. A hot spot as in all the views showing hot spots displayed on a control and display module 16 can be actuated by moving cursor 7026 using joystick 5118 and then clicking on using a designated button of user interface 1604. A flow diagram illustrating a form driven metadata assembly method is presented in FIG. 7c. At block 5302 an inspector enters a media file collection procedure e.g., by clicking button 5106 to drive apparatus 100 from a mode in which it displays a menu of candidate inspection procedure applications and at block 5304 apparatus 100 displays form 7000. At block 5306 apparatus 100 waits for a hot spot to be actuated and at block 5308 a live view is actuated by pressing an appropriate button of control and display module 16 or base module 34 to actuate a hot spot, e.g., 503-IN. The hot spots coupled with the equipment article depiction of form 7000 guide an inspector by presenting an indication of an equipment article being inspected and a graphical depiction of separate physical areas of an equipment article subject to inspection. At block 5310 apparatus 100 determines if an inspector has depressed an appropriate button to initiate media file collection. When initiating a media file collection, an inspector may be operating apparatus 100 in a measurement mode in which cursors can be positioned on said display for enabling an inspector to designate an area of a displayed image to be subject to a distance (length) measurement. In a measurement mode, the apparatus can calculate a distance (length) measurement between a pair of points designated to be subject to a distance measurement by placement of the cursors. At block 5312 apparatus 100 proceeds to read (parse) metadata from form 7000. The metadata parsed form, form 7000 can be, e.g., metadata indicating equipment # or job #. At block 5312 apparatus 100 can also read data input into a form by an inspector. As shown in FIG. 7a, form 7000 can have data entry fields 7002, 7004. Within data entry fields 7002, 7004 an inspector can input various data for use as media file associated metadata. Such metadata can include, e.g., inspector number, inspector name, or inspector comments. At block 5314 apparatus 100 can associate the read metadata at block 5312 with a media file using an association method described herein. At block 5316 apparatus 100 determines if a procedure exit button has been actuated and if not, apparatus 100 returns to block 5304 to display form 7000 and to wait for an inspector to actuate another hot spot. When an inspector exists a media file collection procedure, e.g., by depressing procedure exit button 5110, apparatus 100 proceeds to block 5318 to create a ZIP file containing all of the metadata associated media files collected in the just competed media file collection (inspection procedure) procedure. Apparatus 100 can be configured by default to retain all media files collected in a media file collection procedure into a common folder. At block 5320, apparatus 100 can transfer the ZIP file created at block 5318 to a spaced apart external computer such as computer 600-1, 700-1, 600-2, 700-2 for further processing. Where not otherwise noted, all of the steps of the flow diagram may be executed automatically by apparatus 100 without any inspector control input to user interface 1604 or interface 3120, 3122. As part of block 5320, apparatus 100 can also store the ZIP file into a storage device of apparatus 100.

Report Generation Utilizing Forms

In the illustrative embodiment described with reference to FIGS. 8a and 8b, another application is described in which a set of one or more forms is utilized to guide an inspector in performing an inspection and in associating metadata to media files collected during an inspection. According to a noteworthy guiding feature in the example of FIGS. 8a and 8b, a procedure is divided into "stages" of inspection each stage relating to a different physical location of an equipment location that is designated by a hot spot on a form depiction 7027 corresponding the equipment article being inspected. In the example of FIGS. 8a and 8b an inspector is provided with feedback indicating when a stage of inspection has been completed. In the example of FIGS. 8a and 8b there is also provided an example of a report that be generated with use of a form.

A visual inspection apparatus 100 can be configured to generate an organized, user-interactive report organizing files collected during an inspection procedure and enabling each of an inspector and other persons at external workstations to contemporaneously review the report during execution of an inspection procedure and after an inspection is complete. A report may be generated utilizing a set of one or more forms for display on an apparatus display, and in one embodiment is always available for viewing by an inspector and by persons in viewing range of each display equipped computer of the visual inspection system. At any time during process of inspection the report can be viewed real time on the apparatus display or external display. A report can comprise a root form with hotspots linking various files collected during execution of an inspection procedure, and the files, in one particular embodiment can be saved into a set of file directories established utilizing information from a form. The set of file directories can exist on computer memory or removable media. The interactive report can be transferred onto a network, solid state memory, or any storage device for viewing. A report can also be a simple listing of the files and associated metadata with one file.

Enhanced operations that can be carried out by apparatus 100 when an inspector carries out an inspection procedure as are described with reference to the flow diagram of FIG. 8a. The processes of the flow diagram are similar to those described with reference to the flow diagram of FIG. 7c with certain enhancements as indicated hereinabove. Specifically, apparatus 100 according to the flow diagram of FIG. 8a at block 5403 utilizes a form set including at least one form to build a file directory structure and to generate a report; at block 5422 saves each file collected to an allocated directory; at block updates a report for review of collected media files and at block 5406 relative to a guiding feature changes an appearance of a hot spot on the root form 5426.

Referring to the steps of the flow diagram of FIG. 8a more specifically, apparatus 100 at block 5402 can wait for an inspection procedure application to be initiated. An inspector can initiate an inspection procedure application, e.g., by opening a procedure form developed for guiding the inspection being conducted. The form can be opened, e.g., by using an interface to locate the form in a memory of apparatus 100 and then opening the file or by sending a URL from apparatus 100 if the desired form file is stored on server 700-2 where server 700-2 is an Internet server. Also, as has been indicated in the example of FIG. 7a and through 7c apparatus at block 5402 can be in a mode displaying a menu of candidate inspection procedure applications such that selection of one of the menu options with use of a button of interface 1604 causes apparatus to enter a procedure application. When a procedure has been initiated, apparatus 100 proceeds to block 5403 to utilize the form to build a file directory structure for saving of media files collected during the procedure. More particularly, at block 5403 apparatus 100 can examine or otherwise utilize a stage definition of an inspection procedure application in establishing a directory structure. In one embodiment, apparatus 100 in establishing a directory structure can establish a specific file directory for each stage that has been defined in a stage definition for an inspection procedure application. It has been mentioned that inspection procedures for purposes of guiding an inspector and for improved data organization can be broken down into stages each stage including one or more procedure steps. In the example of the form 7000 of FIG. 7*a* an area of an equipment article to be inspected during each stage is designated on an equipment article depiction with a hot spot disposed on specific area of an equipment article depiction. Accordingly, it is seen that where hot spots are used on form to indicate particular areas of an equipment article to be inspected during execution of a stage of a procedure, or otherwise indicate a stage definition of an inspection procedure application, apparatus 100 can determine a stage definition for an inspection procedure application by determining a number of hot spots on a form. Therefore, in executing block 5403, apparatus 100 can examine a number of hot spots on form 7000 and can set up a root directory (folder) corresponding to the procedure and one child folder for each hot spot of the form. Also, an apparatus 100 can utilize a form and more particularly a stage definition of an inspection procedure application by way of executing code (e.g., code instructing the establishing of a directory structure) included on a form that was built by a form builder based on a stage definition established with use of the form builder. In the example of FIG. 7*a*, root form 7000 has five hot spots. Accordingly, apparatus 100 at block 5403 can establish a root directory (folder) for the procedure and five child folders, one child folder for each hot spot. If subpages of the form have hot spots defining substages, apparatus 100 can set up a directory structure having more than two tiers of hierarchy. An example of a possible file directory of apparatus is shown in FIG. 8*b*. Folders 5502, 5504, 5506 can be folders for inspection procedures conducted without stage definitions (e.g. as in the example of FIGS. 4*a*-4*f*) and without use of a form containing hotspots. Folders 5502, 5504, 5506 are, nevertheless, named advantageously using timestamps corresponding to the time that the inspection was completed. Folders 5510, 5512, 5514, 5516, 5518, 5520 are a set of folders set up where a form having hot spots is used to guide an inspection. Folder 5510 is root folder for the inspection procedure and folders 5512, 5514, 5516, 5518, 5520 are child folders there being one child folder for each hot spot. It can be seen from the naming scheme of the folders that apparatus 100 can read data from a form set including at least one form in naming folders. In naming folder 5510 corresponding to the equipment # of the equipment being subject to inspection apparatus 100 can read equipment # data included in a form set. In naming child folders 5512, 5514, 5516, 5518, 5520 corresponding to the hot spots, apparatus 100 can also read data from the form set. It can be seen that apparatus 100 can utilize a form in establishing a file directory in a variety of different ways. In establishing a number of directories apparatus 100 can examine the content of a form set or else may run script included in the form set established by form builder for use by apparatus 100 in establishing such directories. In determining the names of folders that are set up, apparatus can read data from the set of forms. Also at block 5403 apparatus 100 can generate a report and can broadcast a report as will be described herein.

Referring still to the flow diagram of FIG. 8*a*, apparatus 100 at block 5404 can display a root form such as root form 7000 described with reference to FIG. 7*a* and at block 5406 apparatus 100 can wait for a hot spot of the form to be actuated. When a specific hot spot has been actuated, apparatus 100 proceeds to block 5408 to display a display screen having an appearance as required by the coding of the hyperlink actuated by the hot spot actuation. In one exemplary embodiment, an inspector can be presented with a live video streaming view at block 5408. In another embodiment as has been described an inspector can be presented with a split video and form view at block 5408. Referring to further steps of the flow diagram of FIG. 8*a*, apparatus 100 at block 5410 waits for media file collection to be initiated. When initiating a media file collection, an inspector may be operating apparatus 100 in a measurement mode in which cursors can be positioned on said display for enabling an inspector to designate an area of a displayed image to be subject to a distance (length) measurement. In a measurement mode, the apparatus can calculate a distance (length) measurement between a pair of points designated to be subject to a distance measurement by placement of the cursors. When a media file collection is initiated with the apparatus in a measurement mode a media file collected pursuant to the initiation can include measurement data. When media file collection has been initiated, apparatus 100 can read metadata from the form set at block 5412 and associate metadata to the media file designated for collection in the manner described previously in connection with the flow diagram of FIG. 7*c*. Apparatus 100 can then proceed to save the metadata associated media file associated at block 5422 to the appropriate directory of the set of directories established at block 5403. For example, if the most recently actuated hot spot actuated is "hot spot 3," apparatus 100 at block 5422 can save the media file to the file directory C:\SN1234MARCH27917STAGE 3 that is indicated in the exemplary file directory structure indicated in FIG. 8*b*. At block 5424 apparatus 100 can determine whether all media files required for collection have been collected. In a useful embodiment a form builder as described in connection with FIGS. 10*a*-10*c* can include in a form set a list of media files similar to the list described in connection with FIG. 4*h* such as a number of media files and or type of media files that need to be collected subsequent to actuation of hot spot of form 7000 for a media collection corresponding to a specific physical area of an equipment article to be complete. At block 5424 apparatus 100 can reference such a list to determine if the required number of media files have been collected. In one embodiment apparatus 100 can count the number of files in the current directory to determine if the number of files corresponding to the current hot spot have been collected. If at block 5424 apparatus 100 determines that a number of collected media files is not equal to the number of files on the list, apparatus 100 proceeds to block 5410 to wait for collection of another media file to be initiated. If at block 5424 apparatus 100 determines that the number of media files collected corresponds to the number required on the list, apparatus 100 can proceed to block 5426 to change the appearance of form 7000. For example, the appearance of form 7000 can be changed such that the appearance of the hot spot for which media file collection was just completed is changed. Changing of the appearance of a hot spot is highly useful since such changing aids an inspector in determining what steps of an inspection procedure have been completed. An inspector can determine what stages of an inspection procedure have been completed and in the specific example what areas of an equipment article have been inspected and what areas of equipment article need to be inspected simply by observing the appearance of the hot spots of form 7000. At block 5426 apparatus 100 can change one or more of a size, shape, shading, texture, color of a hot spot. Apparatus 100 at block 5426 can also change a hot spot by disabling a hot spot, configuring the hot spot so that no hyperlink script is executed when the hot spot is actuated. It is seen that when apparatus 100 returns to block 5404 to redisplay a root form, e.g., root form 7000, a hot spot of the root form can have an appearance different from its appearance the last time the root form was displayed.

Referring to block 5428, apparatus 100 at block 5428 can update a report by transferring (e.g., copying) the media files collected by apparatus 100 since the last execution of updating block 5428 to all external computers 600-1, 700-1, 600-2, 700-2 that received the report at block 5403 (at the apparatus 100 the report would not require since it is updated by execution of saving block 5422).

Figure 9A:
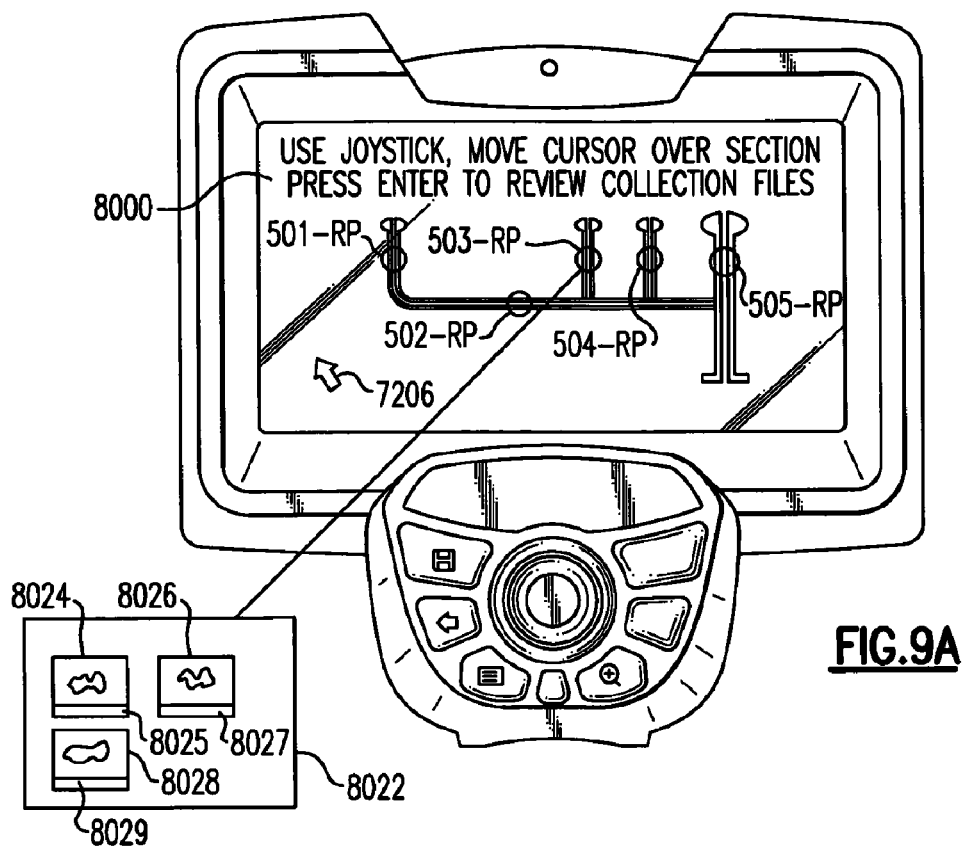
FIG. 9a is a view of an inspection apparatus in one embodiment when displaying a report form.
Figure 9B:
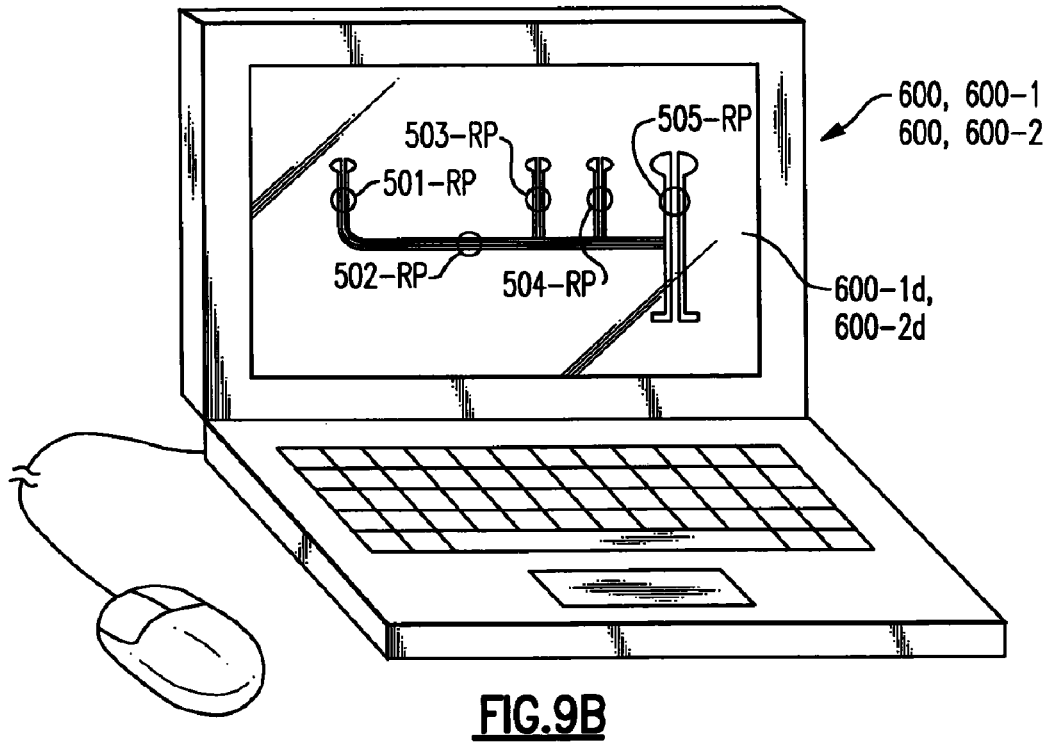

It has been indicated that at block 5403 apparatus 100 can generate a report. In FIG. 9*a* there is shown a graphical report in the form of a form having an appearance that is strikingly similar to the inspection procedure guide form 7000 shown in FIG. 7*a*. While report form 8000 has the equipment article graphical depiction as in guide form 7000 of FIG. 7*a* and has hot spots 501-RP, 502-RP, 503-RP, 504-RP, 505-RP in the same location in relation to the graphical depiction of the form and can be provided by a properly encoded HTML file, the report form of FIG. 9*a* is configured differently than the guide form of FIG. 7*a*. Specifically, the hot spots in the report form of FIG. 9*a* are configured differently that the guide form of FIG. 7*a*. In the report form of FIG. 9*a* the hot spots of the form can be linked to the allocated file directories set up at block 5403 so that actuation of a hot spot opens either a file in a directory associated with that hot spot (e.g., if there is one file in the directory) or a window enabling viewing of designators for files in the directory that has been associated with that hot spot (e.g., in the case there is more than one file in that directory). Apparatus 100 can utilize a root form 7000 to generate report form 8000. For example, apparatus 100 can copy the root form 7000, and change the coding of the form's hot spots for generating of a report form 8000. In another example, apparatus 100 can modify the appearance of guide form 7000 in building form 8000 so that it can be distinguished from form 7000, preserving at least one of the number of hot spots or the depiction of the equipment article and then can change hot spot coding.

In the report form of FIG. 9*a*, the hot spots 501-RP, 502-RP, 503-RP, 504-RP, 505-RP can be configured in so that actuation of a hot spot allows an inspector (or as will be discussed a supervisor or data management agent) to review media files that have been collected corresponding to an equipment article subject to collection. The report form can be configured so that the presentation to the viewer varies depending on which hot spot is actuated. Take the example where one media file has been collected correlated with hot spot 502-RP (e.g., by saving the files into a folder correlated with the hot spot) and three media files have been collected that have been correlated with hot spot 503-RP, e.g., by saving the files into a folder correlated with the hot spot). In such an example, apparatus 100 when hot spot 502-RP is actuated may open the media file correlated with the hot spot. Still referring to the described example, apparatus 100 may display window 8022 as shown in FIG. 9*a* when hot spot 503-RP is clicked on. Window 8022 includes thumbnails 8024, 8026, 8028 corresponding to each of the three media files collected corresponding to the hot spot 503-RP. Further displayed within window 8022 adjacent to an associated thumbnail can be the metadata 8025, 8027, and 8029 that has been associated with the respective files at block 5414 (FIG. 8*a*). Such metadata can include one or more of, e.g., metadata read from a form, metadata entered into a form, metadata from a sensor as described in connection with FIG. 6*a* and timestamp metadata. When a viewer clocks on one of the thumbnails, apparatus 100 can open the media file corresponding to the clicked on thumbnail so that the viewer can view the file.

In an important aspect, the report form 8000 of FIG. 9*a* is available for opening by an inspector at the time of performing an inspection procedure before an inspection procedure is complete. Apparatus 100 can be configured so that actuation of a designated button of apparatus 100 such as button 5144 results in a report form such as report form 8000 being displayed on display 1602 and display 42 (by default producing the view of the control and display module) no matter the current screen display view being displayed. Apparatus 100 can be configured so that a dedicated button of control interface 1604 (user interface), such as trigger button 5140 can be used to "toggle" between a first screen display in which a display screen of an inspection procedure is displayed (such as a streaming video display or a screen display in which a form such as form 7000 is displayed) on display 1602 and a second screen display in which report form 8000 is displayed. By way of illustration, an inspector may be conducting an inspection procedure wherein a streaming live video view is presented to the inspector. An inspector, in one embodiment, can actuate button 5140 or another other button of user interface 1604 and a report form 8000 can be presented for access to previously collected files. The inspector can then actuate button 5140 again to return to the live video streaming view. Accordingly, an inspector can review the result of a current media file collection procedure at any time. Such review might be beneficial; for example, if an inspector wishes to confirm the correctness of view taken or a measurement made where media image file displays a measurement result superimposed on an image from which the measurement was made. Also, a supervisor might visit an inspector during an inspection procedure and request that the inspector display media files collected during a current inspection. To satisfy such a request an inspector need only depress a button to drive the apparatus in a review mode in which report form is displayed.

In another aspect the configuration of the report described allows the report to be reviewed at an external computer at the time the inspection procedure is being conducted. Because report form 8000 and its linked media files are in transferable file form at the time the inspection is being conducted, and because all of the computers 600-1, 700-1, 600-2, 700-2 of system 1000 are IP addressable, the report can be accessed by an external computer 600-1, 700-1, 600-2, 700-2 at the time an inspection is being conducted. In one embodiment apparatus 100 at block 5403 can send the report including the report form 8000 and the established file directory structure to an external computer at the time an inspection is being conducted prior to any collection of media files. In one particularly useful example, apparatus 100 at block 5403 apparatus 100 can broadcast the report including the report form and the established file directory structure for use by several external computers 600-1, 700-1, 600-2, 700-2 all of which will receive updates during the procedure when each new file is collected. Also, prior to an exiting of the procedure, e.g., at block 5420 apparatus 100 can send the report form (e.g., in HTML format) together with all of its linked files to an external computer 600-1, 700-1, 600-2, 700-2. Alternatively, at any time apparatus 100 can send the report form 8000 to an external computer 600-1, 700-1, 600-2, 700-2, maintaining the linked media files at apparatus 100 such that the linked media files can be requested on actuation of a hot spot at the external computer 600-1, 700-1, 600-2, 700-2. In addition, by commanding an external computer 600-1, 700-1, 600-2, 700-2 to address apparatus 100 and to request requesting the report and the linked files for apparatus 1000 or just report form 8000 a supervisor or data management agent at the location of the external computer can access the report comprising report form 8000 and its linked media files without the report being sent by apparatus 100 prior to the request. Accordingly, a supervisor at the location of a spaced apart computer 600-1, 700-1, 600-2, 700-2 can comprehensively monitor the progress of an inspection being conducted, and not only the by the review of a real time video feed which can also be provided by apparatus 100, but by review of all media files collected from the time the inspection procedure commenced prior to the completion of the procedure. Furthermore, the system 1000 can be configured so that at an external computer 600-1, 700-1, 600-2, 700-2, a supervisor is presented with a split screen view wherein one of the views is a live streaming video and a second of the views is report form 8000 or another screen display associated with the report. It will be seen that the processing of updating block 5428 wherein collected media files can be broadcast to external devices 600-1, 700-1, 600-2, 700-2 receiving a report at block 5403 can also be carried out at block 5422. By executing the updating at block 5422, a media file can be broadcast each time a new media file is collected by apparatus 100 during execution of an inspection procedure.

Referring to further steps of the flow diagram of FIG. 8a, apparatus 100 at block 5416 can determine whether an inspector has exited an inspection procedure. At block 5416 apparatus 100 may determine whether an inspector has depressed button 5110 to end an inspection procedure. Alternatively, at block 5416 apparatus 100 can automatically exit an inspection procedure if apparatus 100 at block 5416 determines that all media files for each hot spot have been collected and all measurements have been taken. At block 5416, apparatus 100 can query whether an appearance of each hot spot has been changed to indicate a completed condition and if all of the hot spots have been changed, apparatus 100 can proceed to block 5418. At block 5418 apparatus 100 can create a ZIP file of all of the directories established at block 5403 including all of the metadata associated media files of those directories collected during the inspection procedure. The ZIP file and its contents can be stored on a storage device 3114 such as a hard drive. Within the ZIP file, apparatus 100 can include the generated report form 8000 so that within the ZIP file are included a report including the report form 8000 and all of the media files linked by the report form 8000, enabling graphical aided review of the collected media files at any computer which receives the ZIP file. At block 5420 apparatus 100 can transfer the ZIP file to an external computer 600-1, 700-1, 600-2, 700-2 for further processing and for viewing and analysis of the report. At block 5420 apparatus 100 can also save the ZIP file to a transportable storage medium so that the content of the ZIP file can be hand carried from apparatus 100 to a location of an external computer, e.g., computer 600-1, 700-1, 600-2, 700-2.

At e.g., steps 4038, 5011, 5318, 5418 of the flow diagrams described herein apparatus 100 can save all files collected during an inspection procedure to a memory storage device 3114, e.g., a hard drive and can simultaneously save all files to a transportable storage medium such as a CD or DVD so that results of a procedure can be hand carried away from apparatus 100 and then inserted into a disk drive of an external computer such as computer 600-1 or computer 600-2. In addition, except where otherwise noted, all steps of all the flow diagrams described herein can be executed automatically by apparatus 100 without any user input required for apparatus 100 to advance from step to step.

Form Builder

There can also be provided in the visual inspection system a user-interactive form builder that can include a graphical user interface that allows persons at an organization involved in running inspection operations to quickly develop forms for aiding an inspection process. New forms can be rapidly developed with use of the form builder. The form builder can include features allowing a developer to easily define, without typing of any program code, a complex interrelated set of screen views for display on a visual inspection apparatus that is customized for a particular visual inspection procedure. Because the form builder can be configured to build complex and highly featurized forms without typing in any program code, the software developer developing forms with use of form builder can be a person without any understanding of computer languages or program coding.

A form builder is provided for use in assisting a developer in the process of creating guide forms for use in guiding an inspector through an inspection process and having other complex features as have been described herein. For developing a set of guide forms including at least one form, a developer may first use the inspection apparatus to obtain a set of media files or else may acquire drawings such as isometric views for use in the form builder. The form builder can be configured so that when the set of files are associated into the form builder a series of thumbnails is presented in a window and a developer is prompted to pick one thumbnail for presenting as the root form in the form set. The root form thumbnail can represent an equipment article such as a large piece of equipment having several areas requiring inspection. When the root form thumbnail is selected, the developer is allowed to designate "hot spots" on the root form image corresponding to the selected thumbnail. Once the hot spots are designated and a "create form" button is pressed an HTML page can be created having the root form image and the designated hotspots superimposed on the root form image. A developer is then allowed by the form builder to develop sub-pages that are hyperlinked to hotspots. When developing a sub-page a developer is allowed to designate text or audio messages (possibly by selection from a menu) detailing inspection instructions, including instructions regarding media files to collect, and measurements to make. When developing an inspection sub-page a developer is also allowed to select further thumbnails from the thumbnail menu with larger views of the area of the hotspot to be subject to inspection. When developing an inspection sub-page a developer is also allowed to designate data entry fields including a menu option field. As part of the development process a developer can enter an index for the job to be performed e.g., equipment # or job #. The entered index together with the input data input by an inspector when completing the inspection can be passed as metadata into metadata-associated files created in accordance with a metadata-associating mode as described above. A developer is allowed to develop one or more sub-pages for each designated hot spot with use of the form builder. When the process is complete a series of hyperlinked forms can be created which in one example includes a root form having a referenced image representing an equipment article to be inspected with hot spots superimposed in the image in specific areas of the equipment article to be inspected. With use of the form builder, a root form having image superimposed hot spots can be created so that when a hot spot of the root form is clicked on, at least one sub-page is displayed detailing procedures of an inspection.

Figure 10A:
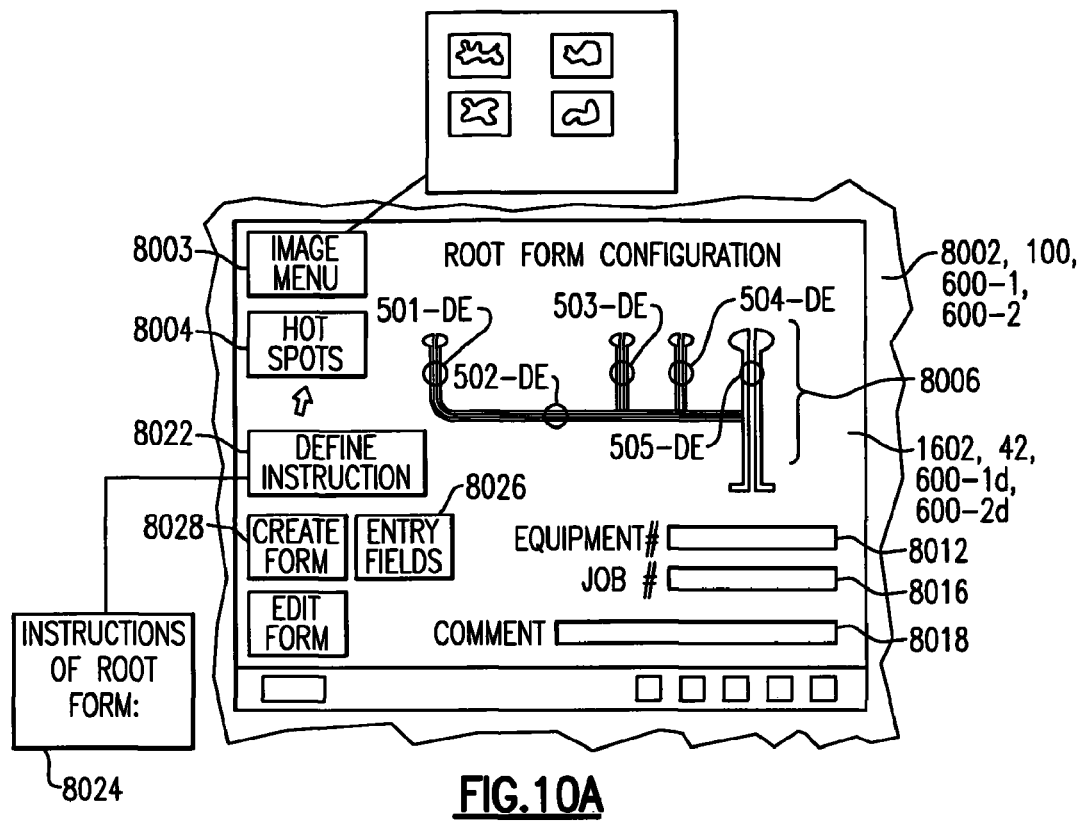
FIG. 10a is a view of a screen display illustrating operation of a form builder in one embodiment.
Figure 10B:
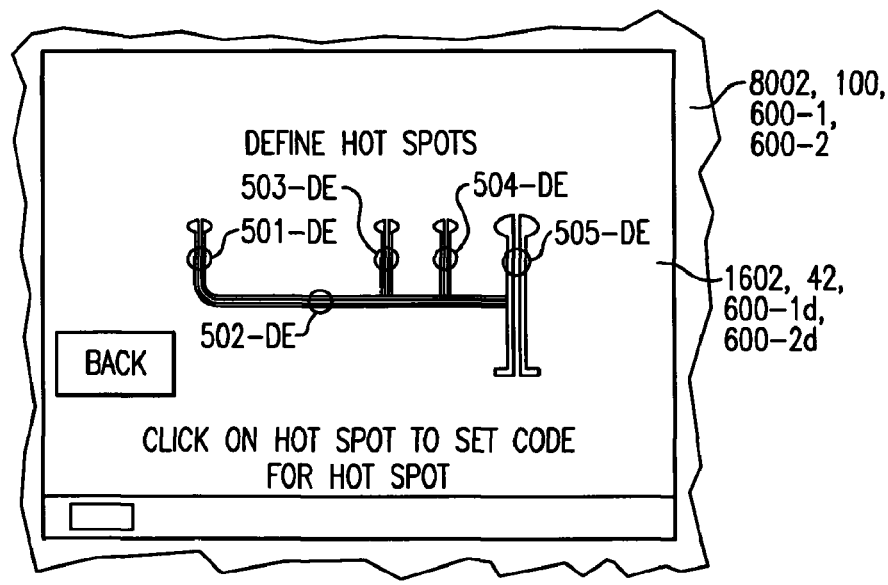
FIG. 10b is a view of a screen display illustrating operation of a form builder in one embodiment.
Figure 10C:
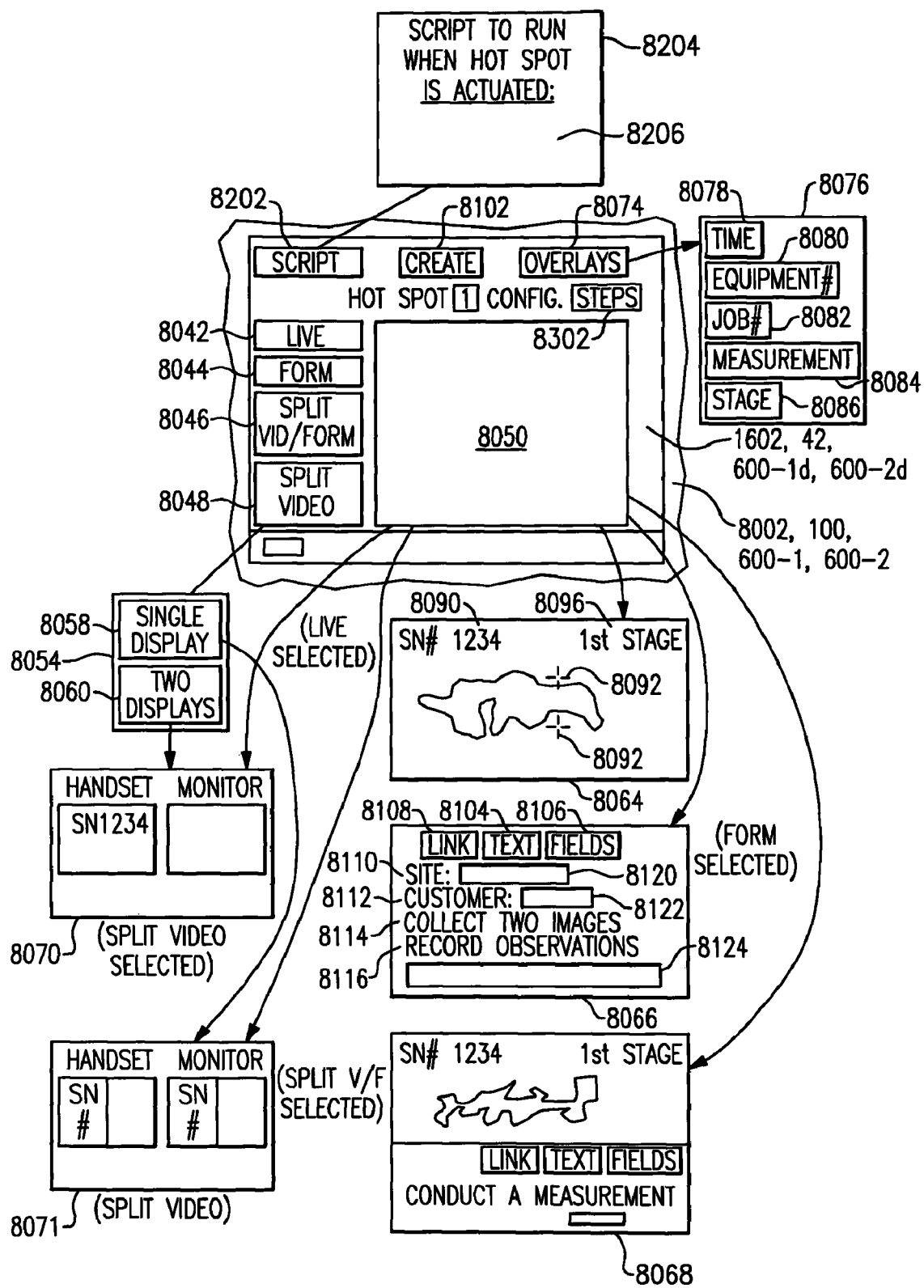
FIG. 10c is a view of a screen display illustrating operation of a form builder in one embodiment.

Referring to FIGS. 10a-10c, an illustrative example of a form builder is described. Any computer of system 1000 having a suitable user interface such as apparatus 100 or other computer of system 1000 such as computer 600-1, 600-2 can run a form builder application. When running the form builder application, the computer running the application can be regarded as a form builder. Referring to FIG. 10a, a main configuration display screen for a form builder is shown. Form builder 8002 can include an image menu button 8003. When image menu button 8003 is actuated, e.g., by clicking on with use of a pointer device a menu of designators for candidate images is shown. The designators for the candidate images displayed may be, e.g., thumbnail views of formatted JPG, BMP, GIF images or the like. The thumbnails may comprise image data or isometric drawing views. The candidate images can all depict a different industrial equipment article which may be subject to inspection. The equipment articles depicted may be, e.g., engines, generators, nuclear reactors, other power plant equipment articles, sewer systems, piping systems and the like. When designator is selected, a larger view of the equipment article of the selected image is displayed in main area. Once displayed, a developer can designate hot spots (i.e., buttons) on the displayed image. For example, a hot spot 501-DE, 502-DE, 503-DE, 504-DE, 505-DE can be included in the main configuration screen shown in FIG. 10*a*. A developer can designate a hot spot by clicking on hot spot button 8004 and dragging and dropping into a desired area of the depiction of the equipment area. When an equipment article is to be subject to inspection, it may be desirable to inspect several different areas of the equipment article. Hot spots can be defined with use of the form builder in order to designate areas which are to be subject to inspection. When an area of equipment article is subject to inspection, media files may be collected including representations of the area subject to be inspected. Also, measurements may be made relating to the area for inspection including the making of a dimensioning (distance i.e. length) measurement. In the example described in FIG. 10*a*, five (5) hot spots are defined. The hot spots define five areas of an equipment article to be subject to inspection. Often areas for inspection of an equipment article are to be subject to inspection in a specific order but in other instances the ordering of inspection areas. Where stages are to be executed in a specific ordering, the hot spots can be given a numbering corresponding to a desired ordering of inspection. In the example of FIG. 10*a*, hot spots 1 through 5 are defined. In placing the hot spots on the configuration screen of FIG. 10*a* a developer establishes a stage definition for an inspection procedure application. For guiding of an inspector and for improving data organization an inspection procedure can be broken down into stages, each stage including one or more procedure steps and possibly sub-stages. With use of the development screen as shown in FIG. 10*a* a developer can establish a stage definition for an inspection procedure application wherein for each stage an inspector can collect data relating to a specific physical area of an equipment article.

Referring to further aspects of the main configuration screen of FIG. 10*a*, the screen further includes data entry fields 8012, 8016, 8018. Data entry fields 8012, 8016, 8018 enable a developer to enter in data to be coded into or linked to the form being built. The data entered into fields 8012, 8016, 8018 can be used as metadata in a metadata association mode herein. Data entry field 8012 enables a developer to designate an equipment # of an equipment article to be subject to inspection. Data entry field 8016 enables a developer to enter job # for the equipment article to be subject to inspection. Data entry field 8018 enables a developer to enter any data the developer wishes. It will be seen that when the form built using builder is located on apparatus 100 for use in a media file collection (inspection) procedure, apparatus 100 may associate the data entered into fields into all media files collected during the media file procedure.

In addition, the form builder main form configuration screen of FIG. 10*a* can have a "define instruction" button 8022. When define instruction button 8022 is clicked on, a window 8024 may appear allowing a developer to establish instructions or other messages to an inspector to be displayed on a root form 7000 as shown in FIG. 7*a*. The instructions entered into area 8024 correspond to the instructions displayed in area 7024 of a root form 7000 when displayed during an inspection procedure. Such instructions can include e.g., "This inspection will require 1 video file and 1 image file to be collected." "This inspection requires 5 areas to be inspected, and a dimension measurement in each area." The equipment article of this inspection may be contaminated." "Fragile Equipment" as is indicated in form 7000 shown in FIG. 7*a*. A developer can designate any text in area 8024 and the text can be displayed in area 7024 when apparatus 100 opens the created form. When entry fields button 8026 is clicked on, a window may be display enabling a developer to designate a location of and prompts associated with data entry fields 7002, 7004, or form 7000. When a developer has completed configuration of a root form, a developer may click on create button 8028. When a create button 8028 is clicked on, a form is created except that hyperlinks associated with each hot spot 501-DE, 502-DE, 503-DE, 504-DE, 505-DE need to be defined.

After a root form create button 8028 is clicked on, the computer, e.g., computer 100, 600-1, 600-2 running the form builder application can display a hot spot configuration screen as shown in FIG. 10*b*. The hot spot configuration screen of FIG. 10*b* allows a developer to define the screen display displayed on a display apparatus 100 after a specific hot spot has been clicked on or otherwise activated. Referring again to the view of FIG. 7*a* showing a form 7000 displayed on apparatus 100 during an inspection procedure, clicking on a specific hot spot will cause a specific screen display to be displayed. In some instances, it may be desired that clicking on a hot spot, e.g., hot spot 503-IN will cause a live video view corresponding to the present filed of view of camera assembly 14 to be displayed. In other instances, it may be desired that clicking on a certain hot spot will not bring up a live view but will bring up a subform. The subform or second form may include text describing more detailed instruction relating to an inspection in the specific area of an equipment article designated by the hot spot and/or may allow an inspector to enter data specific to the hot spot into apparatus 100. In still other instances it may be desired that clicking on a specific hot spot will, bring up a split view showing a form having instruction and/or data entry fields together with a live view corresponding to the present filed of view of camera head assembly. In still other instances, it may be desired that by clicking on a certain hot spot, e.g., 502-IN (FIG. 7*a*) will bring up a split streaming video display as will be described further herein. The development screen shown in FIG. 10*c* allows a developer to define the screen display to be displayed by apparatus after a specific hot spot is clicked on.

By clicking on one of the hot spots 501-DE, 502-DE, 503-DE, 504-DE, 505-DE in the development screen of FIG. 10*b*, the form builder computer can, in accordance with the form builder application, display another development screen as shown in FIG. 10*c*. With use of the development screen as shown in FIG. 10*c*, a developer can define the screen display or a series of screen displays to be displayed by apparatus 100 after a hot spot, e.g., 501-IN is clicked on. In a specific embodiment, a developer with use of the display screen of FIG. 10*c* can define script that is executed by apparatus 100 after a specific hot spot of form 7000 is run. Such script, as will be described can, e.g., open a subform, establish a live view of a target corresponding to a field of view of camera head assembly 14, establish a split screen view wherein a form and a live view are displayed simultaneously on a display of apparatus or a split video view wherein a pair of video images are displayed by apparatus 100. The pair of video images can be displayed by a single display, or on two different displays. For example a first live video image can be displayed on a control and display module display 1602 and a second recorded streaming video image can be displayed on a second display such as monitor 42 of apparatus 100. Instead of being a recorded image the second streaming video image displayed by the second display can be another live view image from another source such as from overhead camera 5202 or from another inspection apparatus 100 (e.g., apparatus 100-2 where apparatus 100 is apparatus 100-1) being used in the same local facility with apparatus 100.

Referring to the development screen of FIG. 10*c*, the development screen of FIG. 10*c* may be displayed after hot spot 501-DE is clicked on in the development screen of FIG. 10*b*. The development screen of FIG. 10*c* has live button 8042, form button 8044, split video/form button 8046, and split video button 8048 and preview area 8050. In preview area 8050 there is displayed a preview of the view that will be displayed when the form set being created is run on apparatus 100. Clicking on live button 8042 establishes a hyperlink to a hot spot e.g., 501-IN of form, e.g., form 7000 so that a live view corresponding to the field of view of camera assembly 14 is established when a hot spot being configured is actuated. Clicking on form button 8044 establishes a hyperlink to the hot spot being configured so that a subform is displayed by apparatus 100 when the hot spot being configured is clicked on. Clicking on split video form button 8046 establishes a hyperlink to the hot spot being configured such that a split video and form (part of the screen will be video and part of the video will be a form) will be displayed by apparatus 100 when the hot spot being configured is clicked on. Clicking on split video button 8048 results in a hyperlink to the hot spot being configured such that a split video image is displayed by apparatus 100 when the hot spot is clicked on. When button 8048 is clicked on a submenu 8054 may be displayed. Clicking on single display button 8058 results in the hot spot being configured to be configured such that when the hot spot of form 7000 is clicked on, a pair of streaming video displays are displayed on a single display such as display 1602 of control and display module 16. Clicking on two display button 8060 configured the hot spot being configured so that when the hotspot is actuated a first streaming video image is displayed on display 1602 of control and display module 16 and a second streaming video image is displayed on display 42 of monitor 40.

In preview area 8050 a different preview screen is shown depending on which of buttons 8042, 8044, 8046, 8048 is actuated. Preview screen 8064 can be displayed when button 8042 is actuated, preview screen 8066 can be displayed when button 8044 is actuated, preview screen 8066 can be displayed when button 8046 is actuated and preview screen 8068 can be displayed in preview area 8050 when button 8046 is actuated. Preview screen 8070 can be displayed when button 8048 and then button 8060 are actuated. Preview screen 8071 can be displayed when button 8048 and then button 8058 are clicked on. Referring to preview screen 8064, preview screen 8064 simulates for a developer the view that will be observed by an inspector during an inspection procedure. A recorded video image can be displayed in area 8050 to simulate the live view that will be seen by an inspector during an inspection. A developer can configure overlays that will be displayed on a screen by clicking on overlay button 8074 to display overlay menu 8076. By clicking on equipment # button 8080, equipment # overlay 8090 is displayed on preview screen 8064. By clicking on measurement button 8084 cursors 8092 are overlaid in the preview screen 8064. By clicking stage button 8086 overlay 8096 is displayed indicating the stage of inspection. The "stage" of the inspection normally indicates the number of the hot spot. Thus, if hot spot 2 were being configured and not hot spot "1," then overlay would read "$2^{nd}$ Stage." By clicking on job #, button 8082, a job # overlay would be displayed. By clicking on time button 8078 a time overlay would be displayed. As indicated by preview screen 8068, 8070, and 8071, a developer can configure overlays when a split view or a split video view has been selected. When the hyperlink configuration has been completed, a developer may click on create button 8102. When create button 8102 is clicked on, a hyperlink is coded so that when the hot spot configured is clicked on when displayed on apparatus 100, a screen display is presented to an inspector corresponding to the view developed by the developer using the form builder.

Referring to preview screen 8066, preview screen 8066 is displayed when form button 8044 is clicked on. When preview screen 8066 is displayed in preview area 8050, a developer can define text and data input fields to be displayed by a form. By clicking on button 8104, a developer can define text to be displayed. By clicking on fields button 8106, a developer can define data entry fields of a displayed form. After clicking on text button 8106, a developer might be given cursor control to type in prompt 8110, prompt 8112, and prompt 8116, prompting a user to input data. The developer might also type in an instruction or another message to be read by an inspector when performing an inspection regarding the media file collection procedure. After clicking on button 8106, a developer may be given control to define data entry fields 8120, 8122, 8124 adjacent the previously defined prompts 8110, 8112, 8116. A developer may also be presented link button 8108. By clicking on link button 8108, a developer is able to define the screen display to be displayed after display of the form being configured. By actuating link button 8108 a developer may be presented with a display similar to the display of FIG. 8*c* except that the heading reading "HOT SPOT 1 CONFIGURATION" with HOT SPOT 1 SUB A CONFIGURATION" to designate to the developer that the developer is not designating a screen display to be displayed immediately following a hot spot actuation but rather a screen display to be displayed subsequent to the display of a form that is displayed immediately after a hot spot actuation.

Referring to screen display which is presented after split video button is actuated, it is seen that the configuration option available to the developer when selecting the live view or the form view remain available to a developer when selecting the split live view and form view option.

In many envisioned use cases, the form builder can be used by a developer who has no understanding of programming languages or how to write code. However, for flexibility purposes, the form builder can include script button 8202. When script button 8202 is clicked on, window 8204 can be called up enabling a developer to type in area 8206 script code that will be executed when a hot spot of a working form is actuated. It is envisioned that the features associated with script button 8202 will be used by developers who have an understanding of programming languages and experience in writing code and who would like to define code to be executed on the actuation of the hot button to provide functionality not presently selectable by way of menu selection.

Figure 10D:
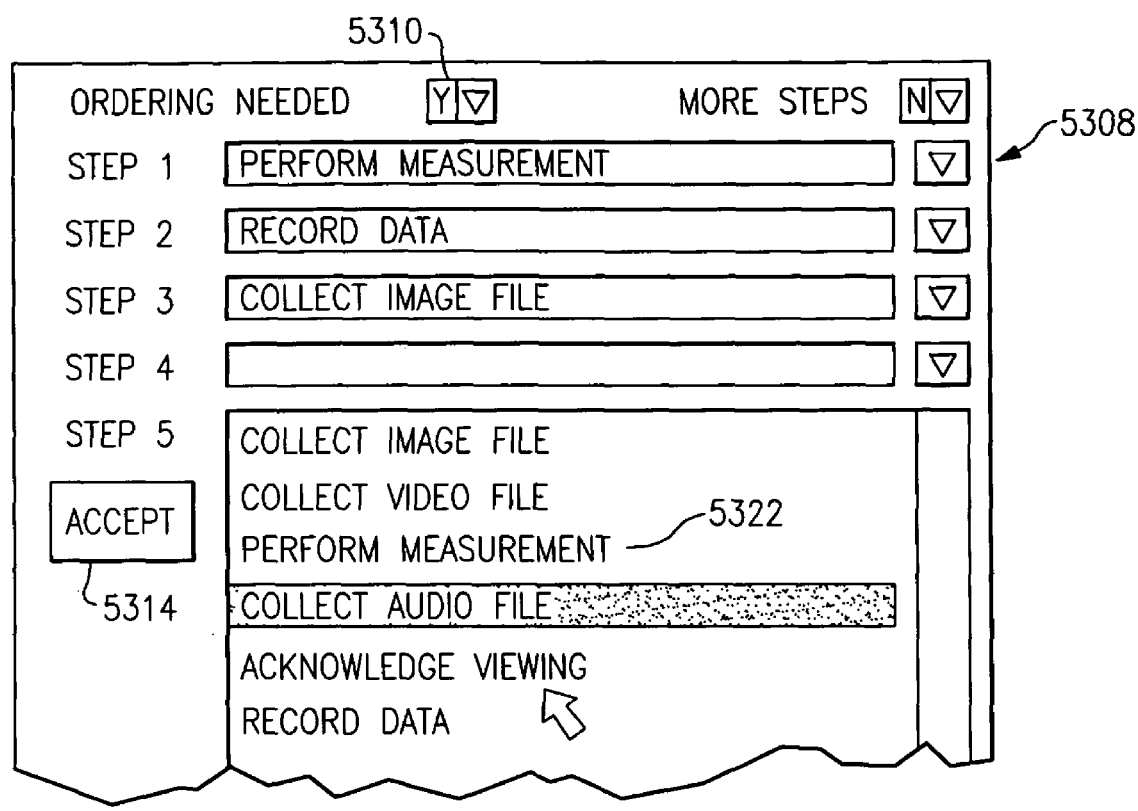
FIG. 10d is an exemplary window that can be displayed as part of a development screen of a form builder.

In addition the form builder can be configured so that by clicking on steps button 8302 a developer is allowed to define steps to be performed after an inspector actuates a certain hot spot. The form builder can be configured to that by clicking on button 8302 with use of a pointer on a computer the developer is using a menu as shown in FIG. 10d is presented. Using the menu 5308 as shown in FIG. 10d a developer can define the ordering of steps that need to be performed. Examples of steps that might be performed include image file collection, video file collection, measurement, audio file collection, acknowledge viewing, and record data. When an acknowledge viewing step is defined, an inspector is required to merely confirm (e.g., by pressing a yes/know button) the inspector has viewed an area without file collection. While in an illustrative embodiment the "perform measurement" menu option 5322 available in the menu of FIG. 10d can refer to a distance measurement, the list of menu options can be expanded so that additional types of measurements for performance during a procedure can be defined with use of the form builder. Such types of additional measurement steps can include, for example: ultrasound measurement, eddy current measurement, laser ultrasound measurement, magnetic measurement, and infrared measurement. When a record data step is defined, an inspector may be required to enter data using interface 1604 into a data entry field of a displayed form. Using menu 5308 it is seen that a developer is allowed to define a specific ordering of steps. By using field 5310 a developer can designate whether a specific ordering of steps is required in an inspection procedure. If the data entry field 5310 is marked "Y," an inspector will be required to complete steps in a specific order. When accept button 5314 is clicked the form builder can automatically establish code so that when the built set of one or more forms is run on apparatus, an inspector will be guided in a manner described previously in connection with FIGS. 4a through 4e. That is, the inspector can be provided with positive feedback when successfully completing a step (e.g., by highlighting of a displayed text description of a step), negative feedback when making an error in attempting to complete a step, positive feedback when completing the set of steps and negative feedback when attempting to exit the mode in which the inspector is guided through completion of a series of defined steps.

When the hyperlink configuration has been completed, a developer may click on create button. When create button is clicked on, a hyperlink is coded so that when the hot spot configured is clicked on when displayed on apparatus 100, a screen display is presented to an inspector corresponding to the view developed by the developer using the form builder.

After a set of one or more forms have been defined by a developer they are ready for use in an inspection procedure. If the forms are developed at apparatus 100, they may be stored in storage device 3114 of apparatus 100. If the forms are developed at a computer external and spaced apart form apparatus 100, the forms can be transferred from the external and spaced apart computer to apparatus 100 in response to a get command initiated by apparatus 100. If the forms are hyperlinked, only a root form need be transferred for the start of an inspection procedure, and subform may be transferred via actuation of a hyperlink. In one embodiment a set of forms are stored at server 700-2 and server 700-2 is an Internet server including a Universal Resource Locator (URL) address which is translatable into an IP address. In such an embodiment, an inspector using apparatus 100 can access a root form of a set of forms by sending a URL address to a browser of server 700-2 to invoke a get command. In another embodiment a form set can be sent from an external computer 600-1, 700-1, 600-2, 700-2 in the form of an executable file comprising all of the required media players and other referenced code of the form set.

Inspection guide forms can include script which when run by apparatus 100 produces a variety of useful results in addition to those already described. Script can be included in a form by being coded into the form or by the form having a reference to the script. In one example, a root form of a form set can include script which when executed by apparatus 100 results in apparatus 100 setting up a set of file directories (folders) in a hierarchical structure corresponding to the hot spots defined in the form set. In another example, script of a form set when run by apparatus 100 can cause the apparatus to change an appearance of a form such as a form hot spot when inspection processes corresponding to a hot spot have been completed. In another example, script of a form set when executed by apparatus 100 causes apparatus 100 to build a specially formatted report.

An inspector can be presented with a wide variety of visual stimuli for enhancing the performance of the inspector during a media file collection procedure. In one example, with use of an apparatus having one or two displays, i.e., one disposed on a control and display module and the other on an external monitor, an inspector can simultaneously be presented with two streamlining video views. In one example, a first streaming video view can be a live view corresponding to the field of view of the camera assembly, and a second streaming video view can be a recorded view produced by playing of a video file or an animated 3D model showing the region of interest or technique to be performed. The second recorded view can be designed to provide instructions to the inspector as to how an inspection is to be conducted. The first and second views can be produced on one screen or on different screens. The mode in which dual streaming videos are presented can be defined during the procedure form development process such that the dual streaming mode is activated when a hyperlink exiting a preceding form is clicked on, and is deactivated when a hyperlink displayed during operating in the dual streaming mode is clicked on.

Figure 11:
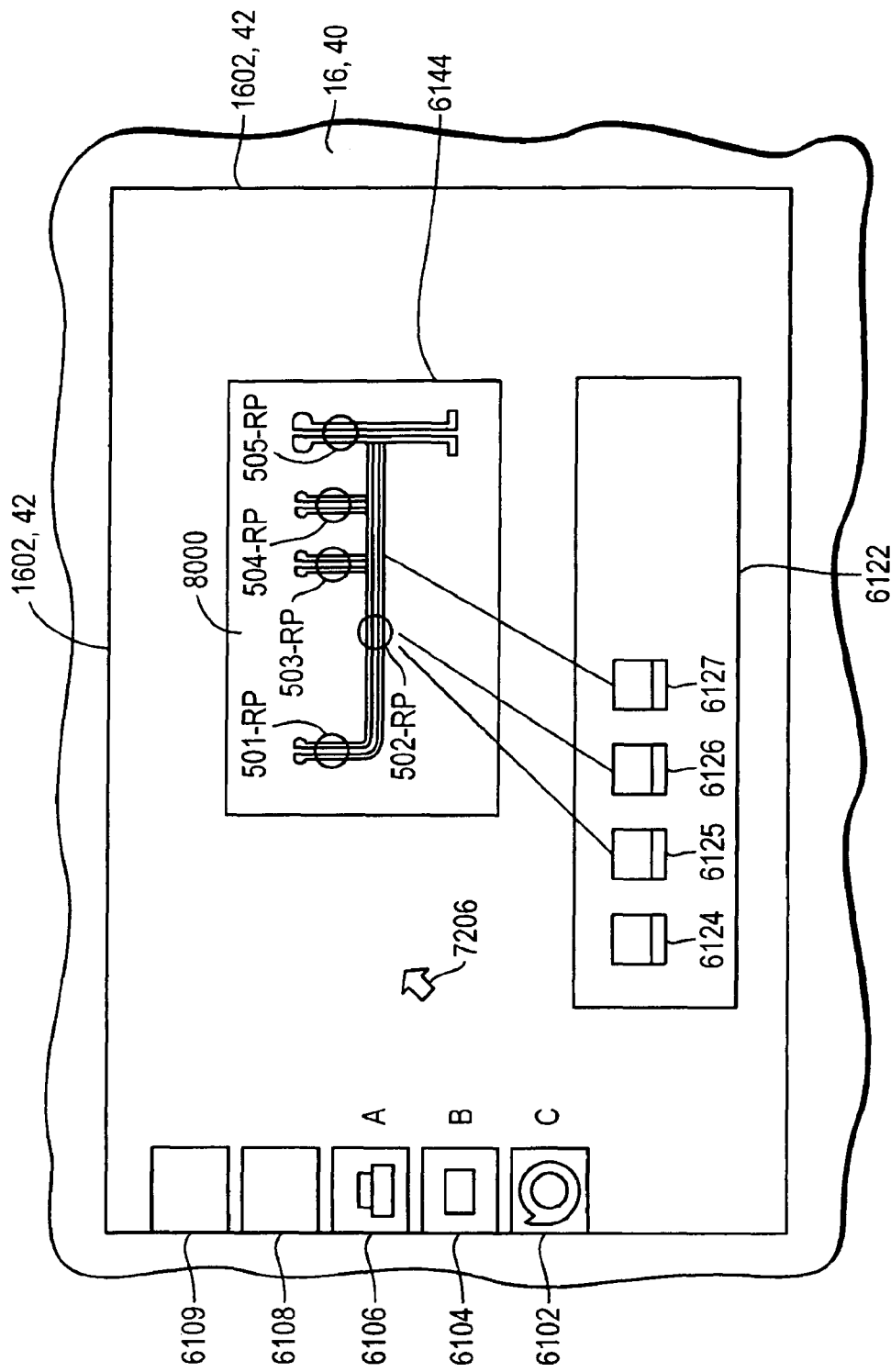
FIG. 11 illustrates a file management feature that can be implemented with use of a report form in which a file can be saved into a structured directory by dragging and dropping a file designator onto a hot spot.

In the view of FIG. 11 another feature which may be implemented in system 1000 is described. In some instances it is expected that an inspector may be conducting an inspection procedure, wherein an application such as described in connection with FIGS. 8a, 8b and 9a, has not been initiated, but that after commencement of the inspection procedure, the inspector realizes that media files being collected might be advantageously associated with media files that have already been saved into an organized directory structure as described in connection with FIG. 8b wherein files of the directory can be readily accessed with use of a report form such as report form 8000. Apparatus 100 can be configured in another aspect so that media files currently being saved into a default directory that is not part of an organized set of directories can be readily moved into a directory of an organized set of directories associated with report form 8000 as described in connection with FIG. 8b. Apparatus 100 can be configured in one embodiment so that by actuating a designated button of control and display interface 16 such as button 5144, apparatus 100 is driven into a "desktop" mode to display a screen display on display 1602 of hand graspable control and display module 16 a screen display in accordance with a common GUI based PC desktop screen display. Prior to actuation of button 5144, apparatus 100 may be displaying on display 1602 a live streaming video view and an inspector may have recently actuated interface to initiate collection of a media file. An example of a "desktop mode" screen display that may be displayed by on said display 1602 is shown in FIG. 11. As indicated by the reference numerals 40 and 42, apparatus 100 may be simultaneously be presenting the screen display at monitor 40. Referring to aspects of the screen display of FIG. 11, there may be included a plurality of icons 6102, 6104, 6106, 6108 and 6109 corresponding to a variety of advanced GUI based applications that may be selected by an inspector.

When icon 6102 is selected, an Internet browser is opened. When icon 6104 is selected (by clicking on) a file manager application is opened. When icon 6106 is selected, a text editor application is opened. Icons 6108 and 6109 indicate other advanced GUI based applications.

Referring to further aspects of the screen display (screen view) of FIG. 11, there may also be displayed window 6122 and report form 8000 as described previously. In window 6144 there may be displayed designators 6124, 6125, 6126, 6127 such as thumbnails for the last media files collected by apparatus 100. Designator 6127 may designate the last collected media file; designator 6126 may designate the next-to-last collected media file and so on. Importantly, apparatus 100 can also display on the screen display report form 8000 which can have substantially the appearance of guide form 7000. Apparatus 100 may be configured to utilize guide form 7000 in creating report form 8000, and can include one or more of the equipment article graphical depiction and the hot spot structure of guide form 7000.

In one embodiment, report form 8000 can be configured so that designators for files 6124, 6125, 6126, and 6127 can be dragged and dropped into file manager form 8000, to actuating saving of the file corresponding to the designator into the directory corresponding to the hot spot. By way of illustration, form 8000 can be configured so that when a designator such as designator 6125 is dragged and dropped onto hot spot 502-RP) using e.g., pointer device provided by the combination of joystick 5118 and button 5106, pointer device 5138, or pointer device 3120 (FIG. 1*a*) the file associated with the designator is automatically saved into the directory corresponding to the hot spot that has been previously set up by apparatus 100. In one embodiment, report form 8000 is configured that (a) when a plain pointer 7206 is clicked on a hot spot, a file is opened or designers for a content of a directory are displayed as described previously, and further so that (b) when a file designator for a file is dragged and dropped onto a hot spot the file designated by the designator is saved into the directory corresponding to the hot spot. It is understood that the file management file saving feature can be utilized at any computer of system 1000, e.g., computer 600-1, 600-2.

In one embodiment, apparatus 100 can be configured so that window 6122 displaying designators for the last collected files collected by the apparatus and form 1100 corresponding to a last generated report form generated by apparatus 100 are automatically displayed by default whenever button 5144 is actuated, even where; for example, apparatus 100 is presently displaying a live video streaming display. Accordingly, apparatus 100 can be configured so that with a single actuation of an actuator, an inspector or other user is presented with a user interactive GUI interface for saving a previously collected file into a directory of a structured set of directories. Alternatively, window 6122 and form 1100 can be accessed by opening other applications, accessing GUI menus from the other applications to open window 6122 and to open any previously generated report form generated by system 1000. It will be seen that by opening a previously generated form and windows displaying contents of unorganized sets of files, the unorganized files can easily be organized by dragging and dropping file designators designating the unorganized files into a displayed report form as described herein.

Modifying an Inspector Guide Application

It has been described that apparatus 100 can be configured to guide an inspector through an inspection procedure. An application for guiding an inspector can be regarded as an inspector guide application. In one embodiment, an inspection procedure can be divided into a series of stages, each stage corresponding to a different physical area of an equipment article subject to an inspection. Further, each stage can comprise one step or a plurality of steps. An inspector can be guided to complete each stage of an inspection. In being guided to complete each step, an inspector can be guided to perform a set of steps associated with each stage. The steps may be differentiated between stages. With some stages an inspector may be required to perform a series of steps in a particular order. With other stages an inspector can complete required steps in any order. An inspector can be provided with positive reinforcing and negative reinforcing feedback throughout completion of an inspection procedure. For example, a hot spot identifying a particular physical area of an equipment article and stage of a procedure may be caused to change appearance when a stage of a procedure is completed. An inspector may be provided with positive feedback when completing a step of a stage correctly and negative feedback when it is determine that an inspector has made an error in completing a step or stage of a procedure.

It has also been described that guiding procedures can be implemented with or without use of forms, e.g., an HTML form having a viewable component. A form, when displayed, can include a depiction of an equipment article to be inspected together with a set of hot spots, each hot spot indicating a different area of the equipment article and a different stage of an inspection procedure. Forms can be configured so that particular script code can be run when a hot spot of a form is actuated. The particular script code can configure apparatus 100 to display a set of prompts, each prompt prompting an inspector to complete a particular step of a stage. The particular script code, in one embodiment, can also cause an inspection apparatus to set up a file directory corresponding to the particular hot spot.

An application (which may or may not employ forms) that guides an inspector through an inspection can be executed each time an inspection needs to be performed. For example, an application that is created for guiding an inspector through an inspection can be run a first time soon after it is created and then run again sometime later (e.g., six months later) when the equipment article needs to be re-inspected. Some guided procedures can be expected to include several, to dozens, to hundreds of data collection steps. The inventors observed that an application for guiding an inspector through an inspection could be improved if the number of stages and/or steps of guided inspection could be reduced in a logical manner; i.e., if unnecessary stages and/or steps could be identified and if during a second, third, or Nth time an equipment article is inspected an inspector were guided to complete a subset of the stages and/or steps of a complete inspection, i.e., were guided in such a manner as to complete only a subset of stages and/or steps currently requiring completion, e.g., were guided in such manner as to avoid completing stages and/or steps of an inspection not requiring re-inspection when an inspection is repeated. In such manner, a time for completing an inspection could be reduced.

A system and method for reducing a number of steps that an inspector is guided through in a guided inspection is described in connection with Table 1, and FIGS. 12, 13, 14 and 15.

TABLE 1

| Stage | Step | Prompt | File Type |
|---|---|---|---|
| 1.0 | 1.1 | Take Picture of First Joint | JPG |
| 1.0 | 1.2 | Take Picture of Second Joint | JPG |
| 2.0 | 2.1 | Take Picture | JPG |
| 2.0 | 2.2 | Record Movie | MPEG |

TABLE 1-continued

| Stage | Step | Prompt | File Type |
|---|---|---|---|
| 2.0 | 2.3 | Perform Measurement | JPG |
| 3.0 | 3.1 | Record Movie | MPEG |
| 4.0 | 4.1 | Take Picture | JPG |
| 5.0 | 5.1 | Perform Measurement | JPG |
| 5.0 | 5.2 | Take Picture of First Valve | JPG |
| 5.0 | 5.3 | Take Picture of Second Valve | JPG |

In Table 1 there is shown a representation of an inspector guide application for guiding an inspector for purposes of conducting an inspection. An inspection can include a number of stages and a number of steps, and an inspector, in accordance with an inspector guide application can be prompted e.g., with a displayed prompt or textual indicator or other indicator (e.g., a hot spot) to perform each stage. An inspector can also be prompted, e.g., with a displayed textual message or other indicator to execute each step. In the first column of Table 1 there is shown indicators for each stage of an inspection. In the second column of Table 1 there is shown indicators for a number of steps (e.g., 1.1, 1.2, 2.1 . . . ) of an inspection procedure. In the third column there is shown a displayed prompt associated with each step, and in the fourth column of Table 1 there is shown the file type that is to be collected by an inspector as a result of performing a step of an inspection procedure. In the example of Table 1 there is represented an application for guiding an inspector to perform an inspection procedure including ten steps separated into five stages, each stage relating to a different physical area of an equipment article. In the example provided, the third and fourth stages include one step, the first stage includes two steps, and the second and fifth stages include three steps. While an inspection procedure application having multiple stages is described, guided inspection applications can be provided having no stage definitions, i.e., having a single stage. Also, as will be described, a guided inspection application can be provided having stage definitions but no step definitions, e.g., an inspector may be guided to perform an inspection of a particular physical area of an equipment article, but may not be guided to perform any particular step once so guided.

In providing system 1000 in which stages of a guided procedure can be selectively enabled, media files collected during the course of performing an inspection can be provided in such a manner as to include a reference to a guided stage being completed at the time the media file was collected. Likewise, in providing a system 1000 in which steps of a guided procedure can be selectively enabled, media files collected during the course of performing an inspection can be provided in such manner as to include a reference to a guided step being performed at the time the media file was collected. For example, if the media file is collected pursuant to a first step of a first stage of a guided procedure, it could be provided with the reference 1.0 to indicate that the file was collected pursuant to completion of the first stage and the reference 1.1 to indicate that the file was collected pursuant to the execution of a first step of a first stage. If a media file is collected pursuant to the execution of a second step of a first stage, the file can be provided with the references 5.0 (stage reference) and 5.1 (step reference) and so on.

Figure 12:
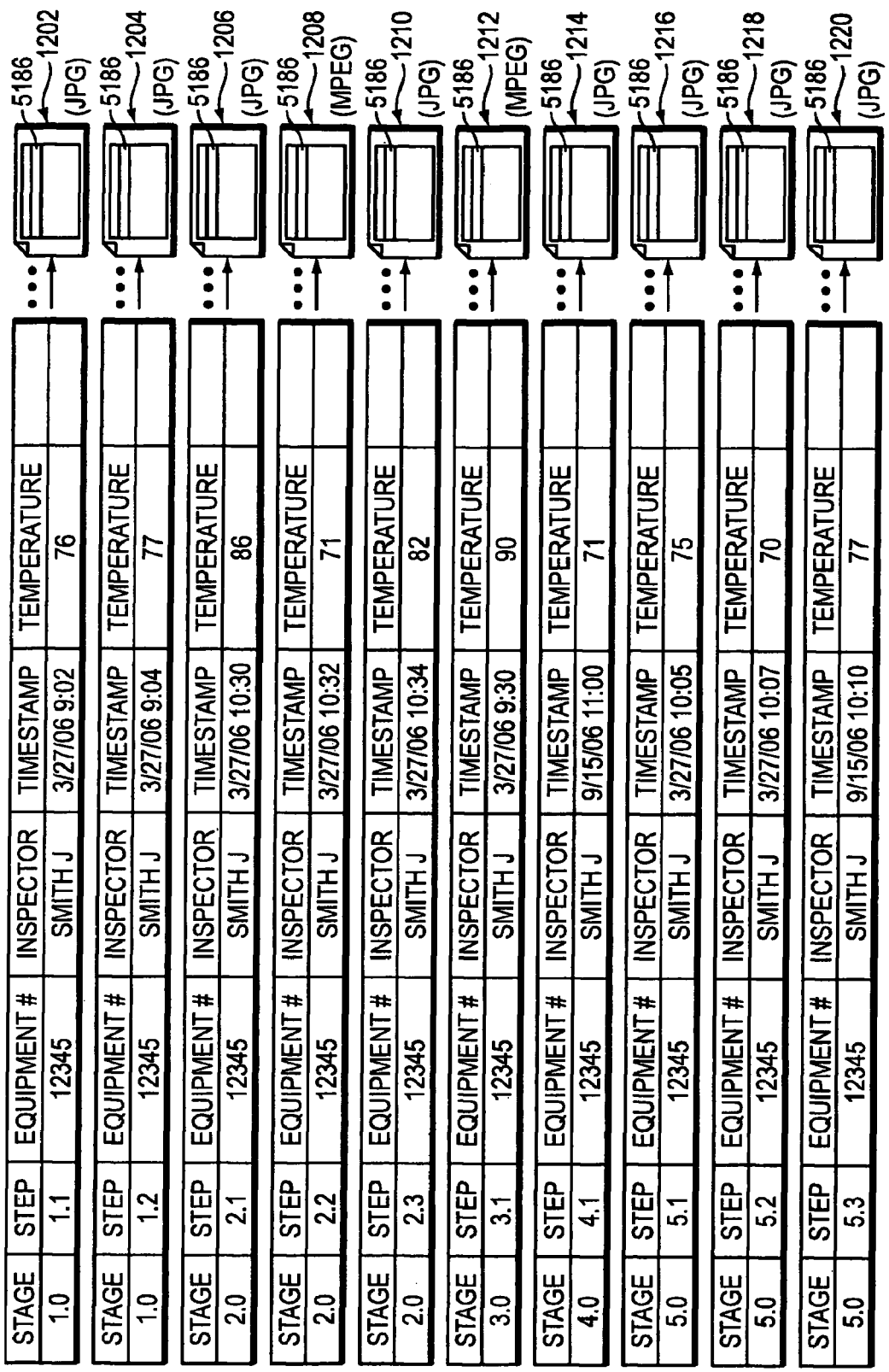
FIG. 12 is a diagram illustrating an association between media files and metadata which can be provided with use of the system wherein a data structure can be provided including a media file and associated metadata, wherein the metadata can include a stage indicator and a step indicator.

A representation of a set of files that might be collected during a guided procedure is shown in FIG. 12. Each of the files 1202, 1204, 1206, 1208, 1210, 1212, 1214, 1216, 1218, 1220 can include a reference to the procedure stage being completed and the procedure step being executed at the time the file was collected. Providing each file 1202, 1204, 1206, 1208, 1210, 1212, 1214, 1216, 1218, 1220 with a reference to the procedure stage and/or procedure step being completed at the time the file was collected, as will be described, can be useful in facilitating selective enabling of procedure stages and/or steps. In the embodiment of FIG. 12, reference data including a stage identifier, step identifier, equipment # (e.g., a serial #) and a time stamp is incorporated into reserved or empty fields 5186 of each collected media file and thereby can be associated with the media file. The reference data of a media file could also be written to another file for association with the media file. For example, an XML text file or another type of text file could be provided for each collected media file, and reference data (e.g., step, equipment #, inspector, time stamp reference data) could be expressed as text of the text file. As described herein in connection with FIGS. 5b and 5c, such reference data associated with collected media files that describes the files, or is otherwise "data about the data" can be regarded as metadata. In addition to including equipment data, inspector data, and time stamp data, such data can include e.g., sensor generated data (e.g., GPS generated location data), site data, apparatus identifier data, and numerous other data. For associating metadata expressed as text of a text file to a media file, it has been explained that the text file including the metadata file can include a reference to the media file to which it is associated. Also, association between a media file and a text file including metadata for the media file can be provided with a common naming scheme, e.g. wherein a media file and a text file are provided with names having a common text string.

A method for selectively enabling procedure stages and/or steps of a guided procedure is shown and described with reference to the flow diagram of FIG. 13. At block 1302 a computer of system 1000 can get a set of files. For example, at block 1302 a computer of system 1000 can get a set of files corresponding to a certain procedure. In one embodiment of system 1000, each guided inspection procedure application (inspector guide application) can include a reference to an equipment # of an equipment article being subjected to inspection and each file that is collected by system 1000 can be provided with an equipment # reference number. When a guided inspection procedure is being run having a certain equipment # identifier, each file that is collected during execution of the procedure can be allocated the same equipment # identifier. After system 1000 has been put into use for some time, it is expected that several files will have been collected, each having a specific equipment # identifier which identifies both (1) the equipment article subject to inspection and, because guided procedure applications can be named in accordance with a specific article of equipment, and (2) a guided inspection procedure application for guiding an inspection of that particular equipment article. At block 1302 in getting a set of files system 1000 may get a set of files having the identifier of a particular equipment #. Accordingly, at block 1302, system 1000 may establish a set of files for further examination that pertain to a particular guided inspection procedure application.

Figure 13:
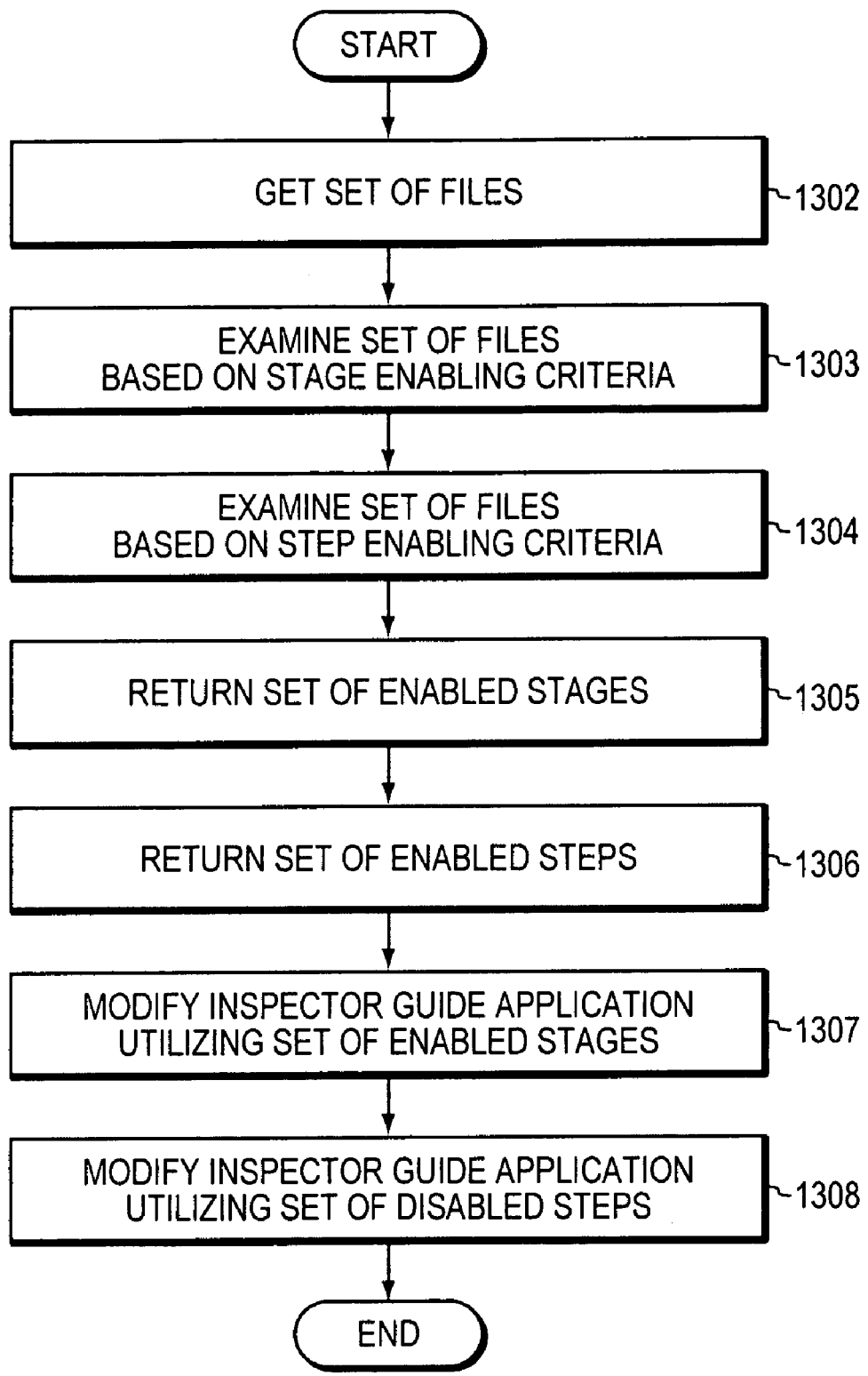
FIG. 13 is a flow diagram illustrating an application for modifying an inspector guide application responsively to an examination of at least one of file data of one or more media file and metadata associated with the one or more media file.

With further reference to the flow diagram of FIG. 13, system 1000 at block 1303 can examine a set of files based on stage enabling criteria. In examining a set of files at block 1303, system 1000 can examine each file's file data (e.g., encoded digitized image data) and/or metadata associated with the file. In executing block 1303, system 1000 can apply a number of alternative criteria. For example, system 1000 can apply criteria for enabling stages of an inspector guide application based on a time stamp data, on file quality, on file type and/or on numerous other criteria. At block 1304, apparatus 100 can examine the set of files retrieved at block 1302 based on a step enabling criteria. In examining a set of files, system 1000 can examine each file's file data (e.g., encoded digitized image data) and/or metadata associated with the file. In executing block 1304 system 1000 can apply a number of alternative criteria. For example, system 1000 can identify procedure steps for enabling based on a time stamp data, on file quality, on file type and/or on numerous other criteria. Regarding procedure blocks 1303 and 1304, system 1000 can be configured to automatically apply the criteria or else can be configured so that an inspector and/or a manager/supervisor can manually select the criteria.

At block 1305, system 1000 can return a set of enabled stages. In executing block 1305, system 1000 can examine files (including reference data [metadata] of each file) according to the criteria, and can return the stage identifier of each file satisfying the criteria. For example, if a temperature criteria is used, and according to the temperature criteria, stages having files with temperature metadata of over 80 are selectively enabled. In the example of Table 1, stages 2.0 and 3.0 would be selectively enabled by application of the stage enabling criteria. In the example described, a rule is applied where a stage is enabled after application of a stage enabling criteria if one file having a reference to the stage satisfies the applied criteria. However, an alternative rule could be applied where a stage is enabled only if, e.g., N files or a full step set of files (i.e., a file for each step of a stage) satisfies the applied criteria. At block 1306 system 1000 can return a set of enabled steps after examining a set of files based on step disabling criteria. In executing block 1306 system 1000 can examine files (including reference data [metadata] of each file) according to the criteria, and can return the step identifier of each file satisfying the criteria. For example, if a time stamp criteria is used, and according to the time stamp criteria, steps resulting in a collected file having a time stamp outside of a six month time window are selectively enabled (assuming the application of the flow diagram of FIG. 13 is run on Dec. 15, 2006) running of the application of the flow diagram of FIG. 13 would result in steps 1.0, 1.2, 2.1, 2.2, 2.3, 3.1, 5.1, and 5.2 being selectively enabled (the file having the step identifiers of 4.1 and 5.3 are the only files summarized in Table 1 with the time stamp within the six month window).

At block 1307 system 1000 can modify the inspector guide application utilizing the set of returned enabled steps. Referring to the example described, if stages 1.0, 4.0, and 5.0 are to be disabled and only stages 2.0 and 3.0 are selectively enabled, system 1000 can modify the inspector guide application in such manner that an inspector is not prompted to complete the disabled stages when the guide application is run. For example, prompts associated with the disabled stages may not be displayed or else may be displayed in an alternative manner. In one embodiment the inspector guide application, when a stage is not selectively enabled (i.e., is disabled), may cause apparatus 100 to avoid displaying any prompt prompting completion of the stage. In another embodiment, the prompt can be displayed but can be displayed in such manner as to indicate that the stage has been completed or otherwise does not require completion, at the present time, thus indicating to the inspector that the inspector need not complete the stage at the present time.

At block 1308 system 1000 can modify the inspector guide application utilizing the set of returned enabled steps. Referring to the example described, if steps 4.1 and 5.3 are to be disabled and only steps 1.1, 1.2, 2.1, 2.2, 2.3, 3.1, 5.1, and 5.2 are selectively enabled, system 1000 can modify the inspector guide application in such manner that an inspector is not prompted to complete the disabled steps when the guide application is run. For example, prompts associated with the disabled steps may not be displayed or else may be displayed in an alternative manner. In one embodiment the inspector guide application, when a step is not selectively enabled (i.e., disabled), may cause apparatus 100 to avoid displaying any prompt prompting completion of the step. In another embodiment, the prompt can be displayed but can be displayed in such manner as to indicate that the step has been completed or otherwise does not require completion, thus indicating to the inspector that the inspector need not complete the step at the present time. At block 1308 system 1000 can modify the inspector guide application in such manner as to indicate that a stage has been completed or otherwise does not require completion if at block 1308 the set of disabled steps includes each step of a particular stage. In such manner the inspector is guided so as not to complete inspection steps of stages that do not require completion at the present time. Also, at block 1308, system 1000 can disable each step associated with each stage that has been disabled (i.e., has not selectively enabled).

It will be seen that the application described with reference to FIG. 13 can significantly reduce the number of stages and/or steps needed to complete an inspection procedure. Regarding a time stamp step disabling criteria, an enterprise can have a policy wherein only aged inspections are repeated. Accordingly, a time stamp criteria for enabling inspection procedure stages and/or steps can help focus resources on inspections that have not been recently updated.

Stage and/or step enabling criteria can be automatically applied, or else can be applied in response to a user selection by an inspector or supervisor. Regarding a time stamp enabling criteria, a time stamp enabling criteria can be applied automatically or manually.

In one embodiment, system 1000 can apply a file quality stage and/or step enabling criteria. In applying a file quality stage and/or step enabling criteria, system 1000 can examine collected media files to determine whether the files pass a certain quality indicator criteria. For example, system 1000 may examine file data of image files or video files to determine whether they satisfy a certain brightness criteria. If a certain brightness criteria is not satisfied (e.g., if the file data indicates the image or video data is too dark) for a file, the stage and/or step referenced in the file can be selectively enabled so that when an inspection guide application is run again, the inspector is prompted to repeat the stage and/or step referenced in the file, so that the defective file is replaced. If the certain brightness criteria is satisfied (the image or video files are sufficiently bright), system 1000 can disable stages and/or steps referenced in the passing files so that an inspector is not prompted to repeat collection of a stage and/or step which has already resulted in a passing file being collected.

In another embodiment, system 1000 can apply a represented feature enabling criteria. The criteria can be applied to enable stages and/or steps. In applying a represented feature disabling criteria, system 1000 can examine file data of collected files to determine whether the file data represents a certain represented feature. For example, system 1000 can examine an image file using image recognition methods to determine whether an image file includes a representation of a crack. If a representation of a crack is detected, the system enables the stage and/or step referenced by the file including the representation of the crack, so that when an inspection guide application pertaining to the subject equipment article is run again, an inspector is prompted to repeat the stage and/or step where an inspector is prompted to take a picture of an area determined to have a crack.

It has been indicated that system 1000 can be configured to apply stage/step enabling (disabling) criteria automatically or in response to a user-initiated (e.g., inspector initiated or supervisor initiated) selection. Time stamp, file quality and represented feature step disabling criteria can be applied automatically or in response to a user selection. In another aspect, system 1000 can be configured to periodically, at predetermined intervals, run the stage and/or step enabling application summarized by the flow diagram of FIG. 13 and can send alerts responsively to running of the application. For example, if after running the application, examining the files subject to examination results in one or more steps being included in a set of selectively enabled steps (indicating that it would be beneficial to repeat one or more steps of a procedure) system 1000 may send various alerts (e.g., via e-mail) prompting various personnel to run the inspector guide application again. Regarding alerts, system 1000 can also be configured so that a user (e.g., an inspector or a supervisor) can select, at predetermined intervals, whether alerts should be sent.

In one example, system 1000 can be configured to apply a time stamp stage and/or step enabling criteria daily and can be further configured to send alerts responsively to the daily running of the application so that aged files are quickly identified and an inspector is prompted to expeditiously replace or supplement such aged files with more recent files. System 1000 can be configured to apply an image quality and/or image represented feature stage and/or step enabling criteria on a daily basis and can further be configured to responsively send alerts in the manner described. Accordingly, as new files are collected, they are expeditiously run through quality and characteristic checks, and inspectors are prompted to repeat file collection steps if a file is of poor quality or if a problem area is noted (if according to the represented feature criteria problems are looked for). In addition to being configured to run the step disabling application at set time periods (e.g., daily, weekly, monthly), system 1000 can be configured to run the application of the flow diagram of FIG. 13 immediately on receiving any file or immediately on receiving confirmation that procedure is complete. In such manner an inspector can be prompted to repeat any necessary steps at a time at which the inspector is in a position to operate inspection apparatus 100 (i.e., at a time at which the inspection is operating the apparatus and is proximate an inspection apparatus) and at a time at which the inspection apparatus 100 is in position to perform inspection of a particular equipment article.

Figure 14:
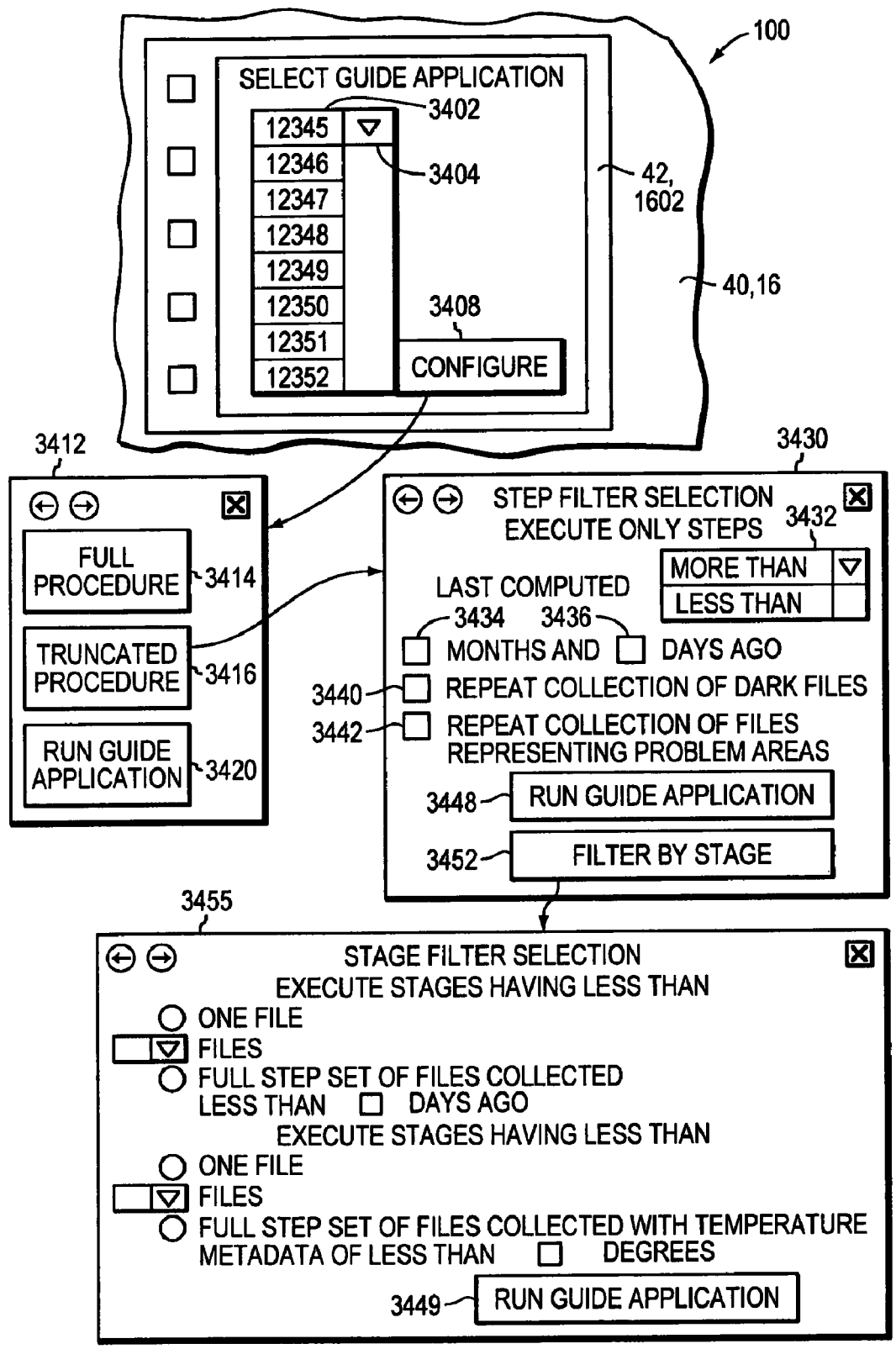
FIG. 14 is a representation of an exemplary graphical user interface which may be used by an inspector using an inspection apparatus in modifying an inspector guide application.

The application described with reference to FIG. 13 can be run on any computer of system 1000. For example, the application can be run on apparatus 100 on computer 600-1 or and/or computer 600-2. FIG. 14 shows an exemplary user interface which may be presented to an inspector operating inspection apparatus 100. The user interface of FIG. 14 may be used by an inspector to configure a guide application so that when a guide application is run, one or more steps of a procedure may be selectively enabled such that there is no prompting of an inspector to complete certain steps that are not selectively enabled (i.e., which are selectively disabled).

Referring to the user interface of FIG. 14, an inspector can use data entry field 3402 to designate a guide application to be run. An inspector may actuate down button 3404 to access designators for each guide application available in system 1000. It has been mentioned that in the embodiment described, guide applications can be identified by equipment #. When a guide application is selected, an inspector can actuate configure button 3408 to access window 3412 presenting a plurality of additional options. In window 3412 in the exemplary embodiment described, there is provided full procedure button 3414 and a truncated procedure button 3416. If full procedure button 3414 is highlighted and the run guide application button 3420 is actuated, a full guide application can be run by apparatus 100, i.e., an application wherein each stage (if present) and each step (if present) of an inspector guide procedure is enabled and wherein an inspector is prompted to execute each stage (if applicable) and each step (if applicable) of an inspection procedure.

If an inspector actuates truncated procedure button 3416, an inspector can be presented with window 3430 which has various data entry fields that allow an inspector to define various step enabling criteria. Window 3430 enables an inspector to designate step enabling criteria. Inspection apparatus 100 can also be configured to display a window enabling an inspector to designate stage enabling criteria as will be described herein. Referring to window 3430, an inspector can use data entry fields 3432, 3434, 3436 to define a time window for application of time stamp step enabling criteria. It is noted that the time stamp step enabling criteria can be applied so that only the steps completed most long ago or alternatively, most recently, can be disabled.

Referring to data entry area 3440, an inspector can enter a check in data entry field 3440 to indicate that the inspector would like a quality based step enabling criteria to be applied. Also, an inspector can enter a check in data entry field 3442 to indicate that an inspector would like a represented feature based step disabling criteria to be applied.

Referring to further aspects of the user interface described with reference to FIG. 14, the user interface can include a window 3455 enabling an inspector to designate (select) stage enabling criteria. The stage enabling criteria can include any of the stage enabling criteria described herein. In the example of FIG. 14, an inspector can cause display of stage enabling criteria selection window 3455 on display 1602, 40 of apparatus 100 by actuating button 3452 of window 3430. Referring to the specific example of window 3455, an inspector can select a time stamp criteria for enabling stages and a temperature criteria for enabling stages. It is observed that each stage can be referenced by several files and that the several files may have references to different steps. Accordingly, window 3455 has numerous data entry fields enabling an inspector to select rules for application of the stage enabling criteria (e.g., whether a stage will be enabled if a single file referencing the stage satisfies the criteria, N files, or a fill "step set" of files, e.g., a set of files references to a stage, wherein each step of the stage has a file referencing the step).

Referring further to the user interface of FIG. 14, system 1000 can be configured so that when an inspector actuates run button 3448 or 3449, apparatus 100 runs the stage/step enabling application described with reference to FIG. 13 to modify the selected guide application and then runs the modified guide application. As described herein, while many application coding methods are possible, the guide application can be implemented with use of one or more forms such as HTML forms having a viewable component. A form having hot spots can be configured so that script code causing certain prompting actions is run when a particular hot spot is actuated.

A supervisor working at local workstation 600-1 or remote workstation 600-2 may also be provided with a user interface allowing the supervisor to configure guide applications utilizing data collected during past inspections. The user interface made available to a supervisor may be identical to the user interface made available to the inspector, but in some embodiments the user interface is made available to a supervisor at computer 600-1 and/or computer 600-2 is different than the user interface available to the inspector at apparatus 100. In one embodiment, the user interface for configuring guide application made available to a supervisor has a more expansive set of controls for configuring guide applications than the user interface made available to an inspector. In one embodiment the user interface made available to a supervisor has at least one control not among the set of controls available with use of the user interface provided an inspector at an inspection apparatus. In one embodiment, the user interface made available to an inspector has available a first set of controls that may be actuated and the user interface made available to the supervisor at computers 600-1, 600-2 has an available second set of controls that may be actuated by a supervisor and the first set of controls are more limited than the second set of controls. In one embodiment, the second set of controls includes at least one control not among the first set of controls. In one embodiment, the first set of controls is different than the second set of controls. The inventors determined that configuring apparatus 100 so that apparatus 100 is restricted from presenting a control that is presented a supervisor at a workstation computer 600-1, 600-2 can reduce the risk of a person without substantial background knowledge respecting enterprise initiatives and policies configuring an inspection guide application in an undesirable manner.

Figure 15A:
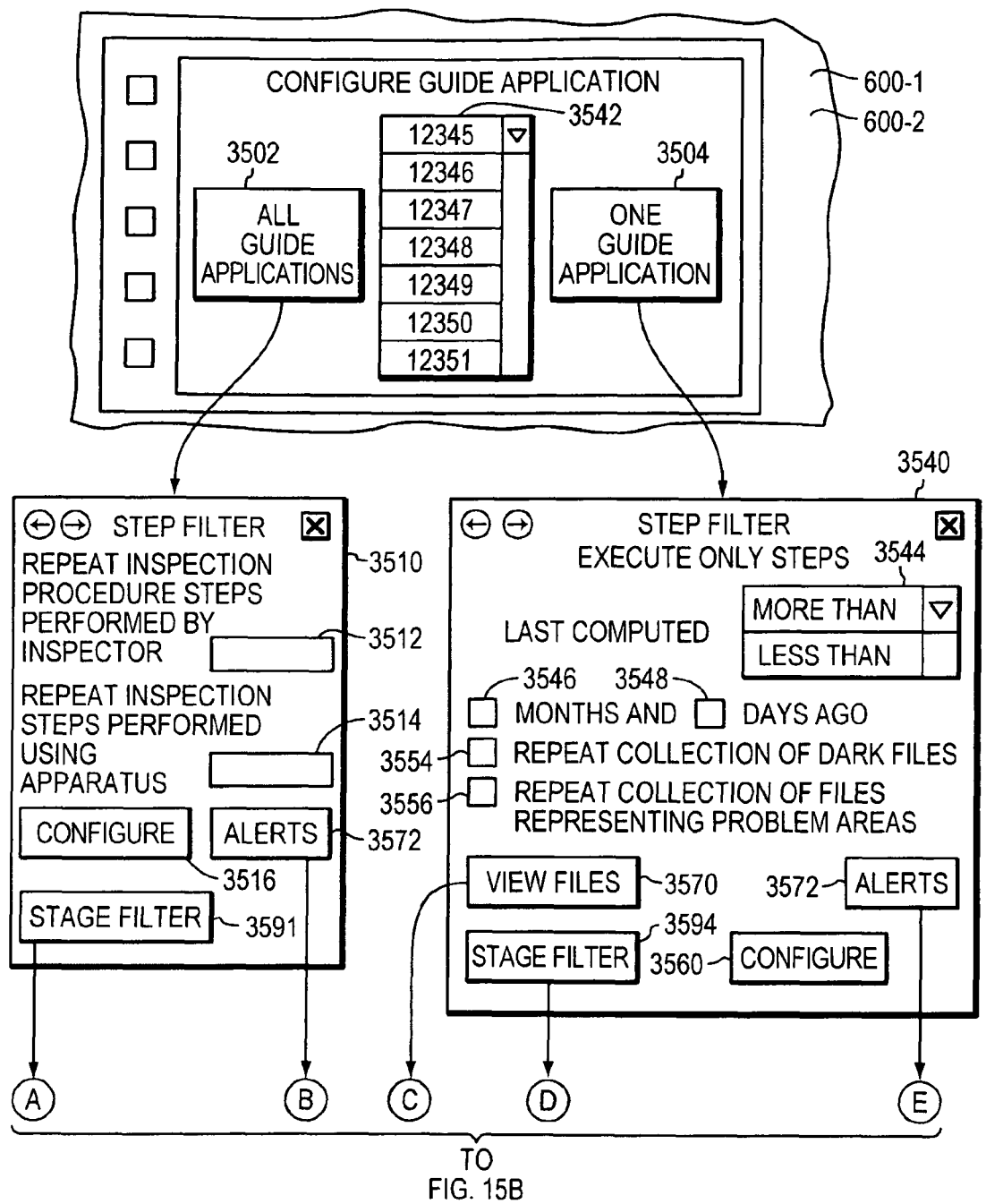
FIG. 15 is a representation of an exemplary graphical user interface which may be used by a supervisor using a computer spaced apart and external from an inspection apparatus in modifying an inspector guide application.
Figure 15B:
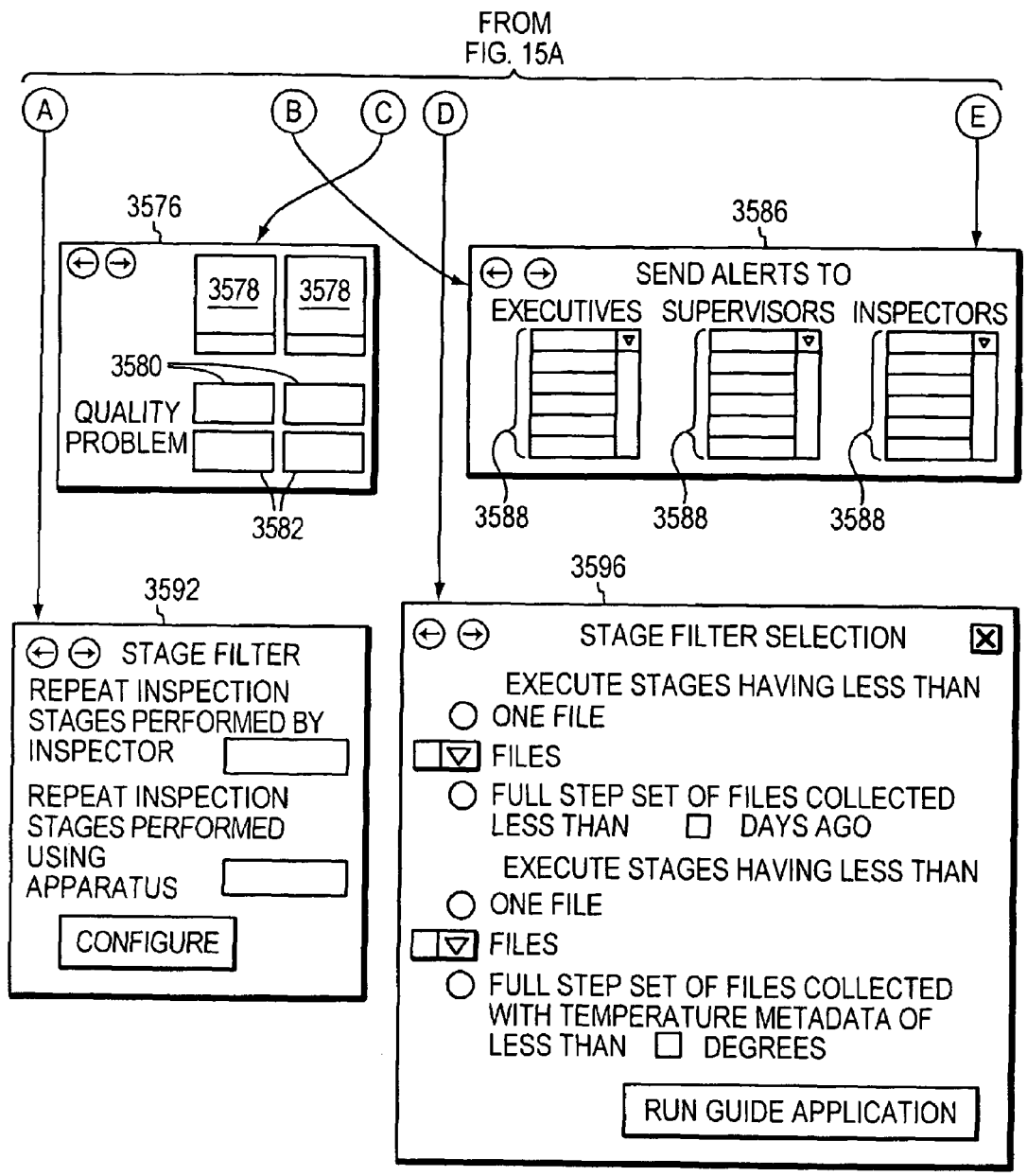

Referring to the user interface of FIG. 15, a supervisor may select all guide applications button 3502 or may select one guide application button 3504. When a supervisor selects all guide applications button 3502, a user is presented with window 3510 allowing selection of step enabling criteria that affects all guide applications in system 1000 and not just a single guide application pertaining to a single equipment article. Referring to window 3510, window 3510 includes inspector data entry field button 3512 and apparatus data entry field button 3514. A supervisor may enter the name of a particular inspector in field 3512 and may enter an identifier for a particular inspection apparatus in area 3514. When configure button 3516 is actuated, the application described with reference to the flow diagram of FIG. 13 is run in the manner described previously. It is seen that the set of files retrieved at block 1302 can include files corresponding to numerous different inspector guide applications. If inspector field 3512 is filled in, the set of files subject to examination can include files collected by a certain inspector. If apparatus field 3514 is filled in, the set of files retrieved at block 1302 can include files collected using a certain inspection apparatus 100. If a supervisor observes that a certain inspector is performing poorly, the supervisor may enter the poorly performing inspector's name in data entry field 3512 so that inspections performed by the poorly performing inspector are performed again. If a supervisor observes that a certain inspection apparatus 100 has been performing poorly, the supervisor can enter an identifier for the apparatus in data entry field 3514 so that inspections performed using the poorly performing apparatus are performed again. In one embodiment, system 1000 is configured so that button 3512, field 3512 and field 3514 are not presented in the user interface presented to an inspector at apparatus 100. It can be seen that when the application described with reference to FIG. 13 is run pursuant to use of all guide applications window 3510, numerous guide applications indexed by several different equipment # identifiers can be modified.

Regarding window 3510, window 3510 enables a supervisor to select step enabling criteria. The user interface of FIG. 15 can also be configured so that a supervisor can select stage enabling criteria. For example, the user interface can be established so that when a supervisor actuates button 3591, window 3592 is displayed enabling a supervisor to select stage enabling criteria.

Referring to window 3540, system 1000, in one embodiment, can be configured so that when one guide button 3504 is actuated, a supervisor is presented with window 3540. In the embodiment shown, when window 3540 is presented, a supervisor is allowed to enter data for disabling steps of a procedure identified by the identifier presently entered in data entry field 3542. Using fields 3544, 3546, 3548, a supervisor can define a time stamp window for a time stamp step disabling criteria to be applied. Using field 3554, a supervisor can designate that a quality based step enabling criteria is to be applied and using field 3556 a supervisor can designate whether the supervisor that a represented feature based step disabling criteria is to be applied. When a supervisor actuates button 3560, the application described with reference to the flow diagram of FIG. 13 is run to modify a selected inspector guide application of system 1000.

Regarding window 3510, window 3510 enables a supervisor to select step enabling criteria. The user interface of FIG. 15 can also be configured so that a supervisor can select stage enabling criteria. For example, the user interface can be established so that when a supervisor actuates button 3591, window 3592 is displayed enabling a supervisor to select stage enabling criteria.

Referring to further aspects of the exemplary user interface described with reference to FIG. 15, the user interface can include a window 3596 enabling an inspection to designate (select) stage enabling criteria for a specifically selected guide application for a particular equipment article. The stage enabling criteria can include any of the stage enabling criteria described herein. In the example of FIG. 15, an inspector can cause stage enabling criteria selection window 3596 to be displayed on display 600-1*d*, 600-2*d* by activating button 3594 of window 3540. Referring to the specific example of window 3596, an inspector can select a time stamp criteria for enabling stages and a temperature criteria for enabling stages. It is observed that each stage can be referenced by several files and that the several files may have references to different steps. Accordingly, window 3596 has numerous data entry fields enabling an inspector to select rules for application of the stage enabling criteria (e.g., whether a stage will be enabled if a single file referencing the stage satisfies the criteria, N files, or a full "step set" of files, e.g., a set of files referenced to a stage, wherein each step of the stage has a file referencing the step).

Prior to actuating configure button 3560, a supervisor can actuate view files button 3570 and/or alerts button 3572. When view files button 3570 is selected, a supervisor can be presented with window 3576 which allows a supervisor to grade files for quality and/or for represented features. Window 3576 can include thumbnails 3578 designating particular files which, when actuated, result in playing of the file (displaying an image or running a movie). In data entry field 3580, a supervisor can enter a grade for the quality of the file (e.g., 1 for poor to 10 for highest quality). In data entry field 3582, a supervisor can enter whether a file indicates the presence of a represented feature (e.g., a crack, a leak, etc.). Such data entered by a supervisor can be associated as metadata to the reviewed files. Accordingly, in examining files to determine if a file quality or a represented feature criteria has been satisfied, system 1000 can examine metadata associated with a file rather than file data.

Still referring to the user interface of FIG. 15, window 3540 can include alert button 3572. When alert button 3572 is actuated, a supervisor may be presented with window 3586 allowing the supervisor to designate persons to whom alerts are to be sent to if the step disabling application is run and one or more steps are not disabled (indicating that re-inspection would be beneficial). E-mail addresses of various persons may be selected using data entry field 3588 so that selected persons are given e-mail notices notifying them that running of a particular guide application for re-inspection of a particular equipment article would be beneficial. As is indicated by alerts button 3572 of window 3510, system 1000 can be configured so that alerts configuration window 3588 can also be accessed by a supervisor when interacting with window 3510 in order to run a step disabling application with respect to more than one guide application.

It has been described that a set of stages and or steps of an inspector guide application can be selectively enabled and further that a set of stages and/or steps of an inspector guide application can be selectively disabled. In the example of the flow diagram of FIG. 13, a set of selectively enabled stages and/or steps (and therefore inherently a set of disabled stages and/or steps) can be returned responsively to an examination of previously collected files (including file data and associated metadata). In another example, a set of selectively enabled stages and/or steps (and therefore inherently a set of disabled stages and/or steps) can be returned responsively to an output from an output device. An output device can be provided, e.g., by a real time clock, or a sensor, e.g., a temperature sensor or a humidity sensor. The inventors observed that it may be desirable to selectively enable (and therefore selectively disable) stages and/or steps of an inspector guide application responsively to an output from an output device. For example, it may be desirable to avoid prompting completion of stages and or steps of an inspector guide application under certain temperature conditions or under certain humidity conditions. It may also be desirable to avoid prompting for completion of certain stages or steps of an inspector guide procedure depending on the time of day that the inspector guide application is run.

A method for operating an inspection apparatus is described with reference to FIG. 16. At block 5602 an inspector guide application is provided in such form that the inspector guide application can be modified responsively to an output from a data output device. For example, an inspector guide application can be provided in such form that prompts for prompting a certain stage or certain step are not displayed or are displayed in an alternative manner if the stage or step does not appear on a returned set of enabled stages or steps. Also, in one example, a stage enabling table such as table 5620 as shown in FIG. 17 can be provided to determine a returned set of enabled stages and a step enabling table such as table 5622 as shown in FIG. 18 can be provided to determine a returned set of enabled steps. In the table of FIG. 17, grid entries of "1" indicate enabled stages whereas in the table of FIG. 18, grid entries of "1" indicate enabled steps. Table 5620 can be regarded as a stage enabling table while table 5622 regarded as a step enabling table.

Figures 16, 17, 18:
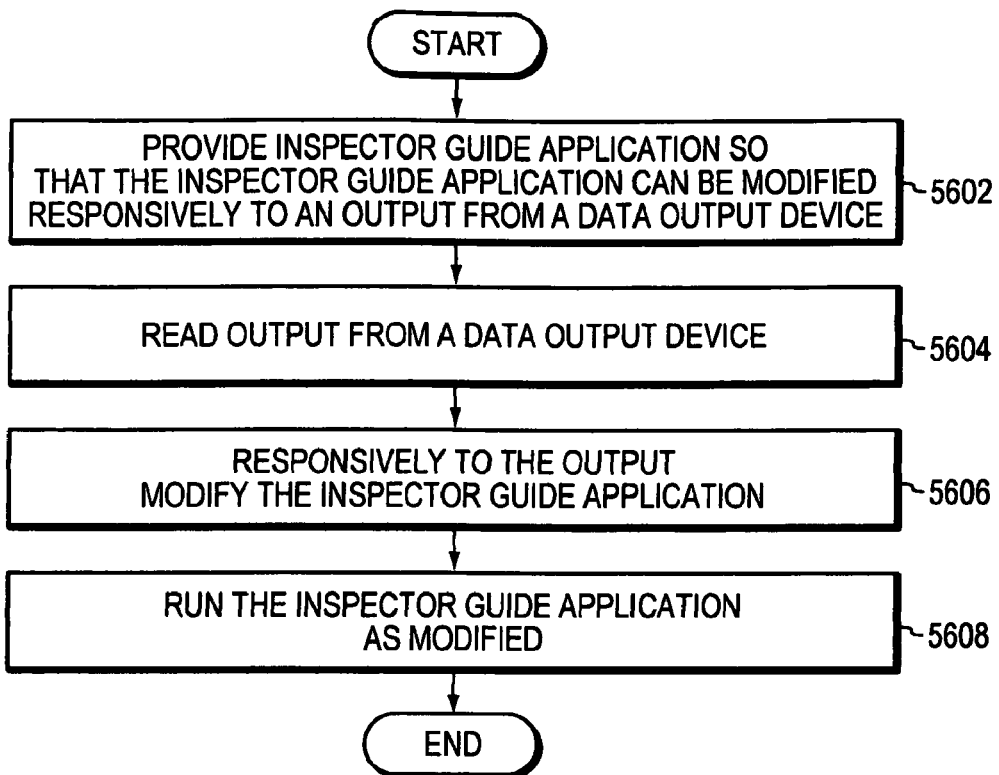
FIG. 16 is a flow diagram illustrating an application for operating an inspection apparatus wherein an inspector guide application is modified responsively to an output of a data output device.
FIG. 17 is a table for use in selectively enabling stages of an inspector guide application in one embodiment.
FIG. 18 is a table for use in selectively enabling steps of an inspector guide application in one embodiment.

With further reference to the flow diagram of FIG. 16, system 1000 at block 5604 can read an output from a data output device. The data output device can be, e.g., a real time clock or a sensor. Where provided by a sensor, the data output device can be, e.g., a thermal sensor or a humidity sensor. In executing block 5604, system 1000 can read, e.g., a timestamp output from a real time clock, an output from a temperature sensor or a humidity sensor. The inventors observed that it may be desirable to limit the number of stages and/or steps that an apparatus prompts for performance depending on output from a data output sensor. For example, at a certain time of day it may be desired to disable certain stages or steps. At a certain temperature or humidity, it may be desirable to disable certain stages and/or steps.

Responsively to said output system 1000 at block 5606 can modify an inspector guide application to selectively enable (and therefore selectively disable) at least one of a stage and a step of said inspector guide application. In modifying an inspector guide application system 1000 can disable a set of stages of an inspector guide application and/or a set of steps of an inspector guide application. In another aspect, system 1000 can be configured so that at block 5606, system 1000 can read an output from an output device for determining whether to read data from a stage enabling table and can further be configured that at block 5606 system 1000 can read an out from an output device in determining whether to read data from a step enabling table. In disabling a stage (which occurs where a particular stage is not among a set of selectively enabled stages), system 1000 can change a coding of an inspector guide application so that prompts including indicators prompting performance of the stage are not displayed or are displayed in such manner as to indicate that the stage need not be completed during a present inspection. In disabling a stage, system 1000 can code an inspector guide application so that a particular directory for saving files during execution of the stage is not established. In disabling a stage where an inspector guide application is provided by an HTML form, a hot spot associated with the disabled stage can be re-coded so that actuation of the hot spot will not have the effect of producing a live view indicating entry of the stage. In disabling a step, system 1000 can change a coding of an inspector guide application so that prompts including indicators prompting performance of a step are not displayed or are displayed in such manner to indicate that the step need not be performed during a current inspection. Still referring to the flow diagram of FIG. 16, system 1000 at block 5608 can run an inspector guide application on said inspection apparatus 100 as modified in said modifying step of block 5606 to guide an inspector in performing an inspection.

A small sample of systems methods and apparatus that are described herein is as follows:

A1. An apparatus for performance of visual inspection respecting an industrial equipment article, the apparatus comprising:
an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;
wherein said apparatus is configured to operate in a mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and
wherein said apparatus is also configured in a mode in which said apparatus displays on said display a form including a depiction of said industrial equipment article and a plurality of hot spots disposed on said form, the apparatus further being configured allocate a set of file directories corresponding to said plurality of hot spots, the apparatus further being configured so a media file that is collected is stored to a certain one of said set of file directories, the certain one directory being determined by which of said hotspots was most recently actuated.

B1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application retaining a list representing steps of said inspection procedure that are to be performed by an inspector, the apparatus processing data received by said apparatus to determine whether a step of said procedure has been performed, the apparatus updating a screen display displayed on said display of said display and control module to provide positive feedback to said inspector when said apparatus determines that a step of said procedure has been completed, said apparatus further processing data received by said apparatus to determine with reference to said list whether said inspection procedure has been completed and updating a screen display to provide positive feedback to said inspector when said apparatus determines that said procedure has been completed.

C1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application retaining a list representing steps of said inspection procedure that are to be performed by an inspector for completion of said inspection procedure, the apparatus in accordance with the application examining data received by said apparatus to determine whether data received by said apparatus indicates that an inspector has made an error in attempting to complete one of said steps, said apparatus updating a screen display displayed on said display to provide negative feedback to said inspector when said apparatus determines that said inspector has made an error in attempting to complete a step of said inspection procedure.

C2. The apparatus of (c1), wherein said updating includes changing an appearance of text describing a step of said procedure.

D1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application retaining a list representing steps of said inspection procedure that are to be performed by an inspector for completion of said inspection procedure, the apparatus in accordance with the application examining data received by said apparatus to determine whether data received by said apparatus indicates that an inspector has made an error in attempting to complete one of said steps, said apparatus updating a screen display displayed on said display to provide negative feedback to said inspector when said apparatus determines that said inspector has made an error in attempting to complete a step of said inspection procedure.

E1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus wherein actuation of said certain actuator of said user interface when said certain actuator is in a normal configuration provides an exit function, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application disabling an exit function normally provide by actuation of said actuator of said control and display module when said application is initiated so that when said application is initiated actuation of said certain actuator by an inspector does not result in exiting of said application, the functioning associated with said certain actuator being configured so that when said certain actuator is actuated during execution of said application but prior to completion of said steps, said apparatus provides negative feedback indicating to an inspector performing said inspection procedure that said inspection procedure has not been completed.

E2. The apparatus of (e1), wherein said negative feedback is in the form of a displayed message on said display of said control and display module.

E3. The apparatus of (e1), wherein said apparatus is configured so that when said certain actuator is actuated during execution of said application but prior to completion of said steps, sends an message to an external computer indicating that an inspector has attempted to exit a procedure prior to completion of a procedure.

F1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate is accordance with an application in which an inspector is guided through an inspection procedure having a plurality of steps, wherein at least one of said steps is to complete a measurement by operating said apparatus in said measurement mode, the apparatus guiding an inspector in completing an inspection procedure by displaying on said display of said control and display module a depiction of an equipment article while said inspection procedure is being completed by said inspector, and further displaying on said display a data entry field, the apparatus associating as metadata media files collected by an inspector during execution of said inspection procedure data that is input into said displayed date entry field by an inspector, so that a media file that is transferred from said apparatus to an external computer has associated therewith as metadata data entered into said data entry field by said inspector.

G1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate in accordance with an inspection procedure application in which an inspector is guided through an inspection procedure having a plurality of steps, wherein at least one of said steps is to complete a measurement by operating said apparatus in said measurement mode, wherein said apparatus is configured so that subsequent to initiation of said inspection procedure application and prior to completion of said procedure, said apparatus generates a user-interactive report enabling an inspector to review results of said inspection procedure prior to completion of said inspection procedure, the report including hot spots which when actuated results in at least one of (i) a collected media files being opened or (ii) a depiction of a collected media filed being displayed, the apparatus being configured to automatically transfer said report to at least one computer external with said apparatus prior to completion of said inspection procedure.

G2. The apparatus of (G1), wherein said report includes a graphical depiction of an equipment article.

G3. The apparatus of (G1), wherein said graphical depiction is an isometric view.

G4. The apparatus of (G1), wherein said graphical depiction is an image collected by an inspection apparatus.

G5. The apparatus of (G1), wherein said apparatus is configured to automatically send each file collected by said apparatus during execution of said inspection procedure to an external computer prior to collection of a next file.

H1. An apparatus for performance of visual inspection respecting an industrial equipment article, the apparatus comprising:

an elongated inspection module, a camera assembly and a control and display module, the camera assembly including an imaging sensor and a lens focusing an image of an industrial equipment article onto said imaging sensor, the control and display module being disposed at a proximal end of said elongated inspection module, said control and display module including a display and a user interface, the user interface enabling a user to input commands into said apparatus, said user interface further enabling said inspector to control a position of said elongated inspection module relative to an industrial equipment article being inspected;

wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors, and wherein said apparatus is also configured to operate in accordance with an inspection procedure application in which an inspector is guided through an inspection procedure, said apparatus in accordance with said application prompting an inspector to conduct said inspection procedure in a series of stages wherein data relating to a different physical area of said equipment article is to be collected during execution of each stage, wherein said apparatus is configured to utilize a stage definition of said inspection procedure application in order to automatically establish a directory structure corresponding to said series of stages so that a file collected during execution of said inspection procedure is saved into a directory corresponding to a stage being executed during collection of the file.

I1. A system for use in a visual inspection system in which media files respecting an equipment article are collected, the system comprising:

an visual inspection apparatus comprising an elongated inspection module, a camera assembly and a hand graspable control and display module, the camera assembly including an imaging sensor and a lens focusing an image of an industrial equipment article onto said imaging sensor, the hand graspable control and display module being disposed at a proximal end of said elongated inspection module, said hand graspable control and display module including a display and a user interface, the user interface enabling a user to input commands into said apparatus, said user interface further enabling said inspector to control a position of said elongated inspection module relative to an industrial equipment article being inspected, wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors; and a user interactive form builder for use in building at least one form for display on said display of said hand graspable display and control module for use in guiding an inspector in performing an inspection procedure for inspecting an equipment article, the form builder being configured for use by a developer without any understanding of programming languages and being configured to build said at least one form without typing of any program code into said form builder, the form builder enabling a developer to define, without typing of any program code into said form builder at least one of: (a) graphic of said at least one form, (b) a hot spot of said at least one form, (c) a data entry area of said at least one form, and (d) a stage definition for said instruction procedure.

I2. The system of (I1) wherein, said interactive form builder enables a developer to define a set of steps to be performed in an inspection procedure.

J1. An apparatus for performance of visual inspection respecting an industrial equipment article, the apparatus comprising:

an elongated inspection module;

a camera assembly including an image sensor and a lens focusing an image of an industrial equipment article onto said image sensor;

a control and display module including a display and a user interface, the user interface enabling a user to input commands into said apparatus, said user interface further enabling said inspector to control a position of said elongated inspection module relative to an industrial equipment article being inspected;

an interconnect module;

a base module;

wherein said apparatus is configured to operate in a mode in which cursors can be positioned on said display for enabling an inspector to designate an area of a displayed image to be subject to a distance measurement, the apparatus further being configured so that said apparatus calculates a distance measurement between a pair of point designated to be subject to a distance measurement by placement of said cursors, and wherein said apparatus is also configured in a mode in which said apparatus displays on said display a form including a depiction of said industrial equipment article and a plurality of inspector actuatable hot spots superimposed in said form, the apparatus further being configured allocate a set of file directories corresponding to said plurality of hot spots, the apparatus further being configured so a media file that is collected is saved to a certain one of said set of file directories, the certain one directory being determined by which of said hotspots was most recently actuated.

K1. A procedure form builder for use in a building form for use in guiding a user in the collection of media files while using a visual inspection apparatus for inspecting an industrial equipment article, the form builder including:

an image selection area enabling a developer to designate an image as a root form image, the form builder being configured so that the designated root form image can be an industrial equipment article, the form builder creating a root form including said designated image;

the form builder further allowing a form developer to establish on said root form a series of hot spots, each hot spot corresponding to an area of said industrial equipment article to be subject to inspection.

K2. The procedure form builder of (K1), further enabling the developer to designate links associates with each hot spot.

K3. The procedure form builder of (K1), wherein said procedure form builder enables a developer to define a sub-form hyperlinked to said root form by way of one of said defined hot spots.

K4. The procedure form builder of (K1), wherein said procedure form builder enables said form builder to select a live view as a hyperlink associated with a hot spot.

K5. The procedure form builder of (K1), wherein said procedure form builder enabled said form developer to select a live view with superimposed measurement view as a hyperlink associated with a hot spot.

K6. The procedure form builder of (K1) wherein said form builder attaches script to a form built by said form builder so that when said a form is opened at a visual inspection apparatus said script is run.

K7. The procedure form builder of (K1), enabling a form developer to create a set of hyperlinked forms having a hierarchical tree structure, and wherein said form builder attaches script to a form of said set of forms for execution by a viewing apparatus to create a set of file directories corresponding to a hierarchical tree structure of said set of forms.

L1. An apparatus for performance of visual inspection respecting an industrial equipment article, the apparatus comprising:
an elongated inspection module;
a camera assembly including an image sensor and a lens focusing an image of an industrial equipment article onto said image sensor;
a control and display module including a display and a user interface, the user interface enabling a user to input commands into said apparatus including commands to collect an image file comprising a representation of said industrial equipment article, and to collect a video file comprising a representation of said industrial equipment article, said user interface further enabling said inspector to control a position of said elongated inspection module relative to an industrial equipment article being inspected;
an interconnect module;
a base module;
wherein said apparatus is configured to operate in a mode in which cursors can be positioned on said display for enabling an inspector to designate an area of a displayed image to be subject to a distance measurement, the apparatus further being configured so that said apparatus calculates a distance measurement between a pair of points designated to be subject to a distance measurement by placement of said cursors, and
wherein said apparatus is also configured in a mode in which said apparatus tags media files that are collected in response to a user input command with metadata, the apparatus displaying a form for use in assisting an inspector in collecting media files, the form including a representation of said industrial equipment article, the metadata being at least one of (1) data that is taken from said form and (2) data input into said form by an inspector.

M1. An apparatus for performance of visual inspection respecting an industrial equipment article, the apparatus comprising:
an elongated inspection module;
a camera assembly including an image sensor and a lens focusing an image of an industrial equipment article onto said image sensor;
an interconnect module;
a base module;
wherein said apparatus is configured to operate in a mode in which cursors can be positioned on said display for enabling an inspector to designate an area of a displayed image to be subject to a distance measurement, the apparatus further being configured so that said apparatus calculates a distance measurement between a pair of points designated to be subject to a distance measurement by placement of said cursors, and
wherein said apparatus is also configured in a mode in which said apparatus associates media files that are collected in response to a user input command, whether image media files or video media files with metadata describing the collected files, and wherein said apparatus associates media files that are designated for collection by at least one of (i) writing both the metadata and a reference to the designated media file to a common text based document and by (ii) writing the metadata to the media file; and
a control and display module including a display and a user interface, the user interface enabling a user to input commands into said apparatus including commands to collect an image file comprising a representation of said industrial equipment article, and to collect a video file comprising a representation of said industrial equipment article, said user interface further enabling said inspector to control a position of said elongated inspection module relative to an industrial equipment article being inspected.

M2. The apparatus of (M1), wherein said apparatus is configured to parse said metadata from a form displayed by said apparatus for use in aiding an inspector in the collection of media files.

N1. An apparatus for performance of visual inspection respecting an industrial equipment article, the apparatus comprising:
an elongated inspection module;
a camera assembly including an image sensor and a lens focusing an image of an industrial equipment article onto said image sensor;
a control and display module including a display and a user interface, the user interface enabling a user to input commands into said apparatus including commands to collect an image file comprising a representation of said industrial equipment article, and to collect a video file comprising a representation of said industrial equipment article, said user interface further enabling said inspector to control a position of said elongated inspection module relative to an industrial equipment article being inspected;
an interconnect module;
a base module;
wherein said apparatus is configured to operate in a mode in which cursors can be positioned on said display for enabling an inspector to designate an area of a displayed image to be subject to a distance measurement, the apparatus further being configured so that said apparatus calculates a distance measurement between a pair of points designated to be subject to a distance measurement by placement of said cursors, and
wherein said apparatus is also configured in a mode in which said apparatus generates a report including (i) a plurality of media files; and (ii) a root record form including a depiction of said industrial equipment article subject to visual inspection, the root record file having a series of hot spots defined on said equipment article depiction, the report being configured so that when said form is displayed, and a one of said hot spots is actuated, a media file corresponding to said one hot spot is opened.

O1. A method for providing a labeled and searchable file in an industrial visual inspection system, the method comprising:
(a) providing a visual inspection apparatus comprising an elongated inspection module, a camera assembly and a hand graspable control and display module, the camera assembly including an imaging sensor and a lens focusing an image of an industrial equipment article onto said imaging sensor, the hand graspable control and display module being disposed at a proximal end of said elongated inspection module, said hand graspable control and display module including a display and a user interface, the user interface enabling a user to input commands into said apparatus, said user interface further enabling said inspector to control a position of said elongated inspection module relative to an industrial equipment article being inspected, wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors;

(b) providing a form builder configured for use by persons without any understanding of programming languages;

(c) without typing any code into said form builder defining with use said form builder an HTML form having a data entry field;

(d) opening the form on the apparatus;

(e) receiving in said data entry field data input into said data entry field by an inspector conducting an inspection of an industrial equipment article;

(f) associating the received data entered into said data entry field by an inspector at step (e) as metadata with a media file to collect at said apparatus, in response to input of a command by said inspector, a metadata-associated media file; and (g) transferring said metadata-associated media file to an external computer external to said apparatus.

P1. A method for development and dissemination of data in an industrial visual inspection system, the method comprising:

(a) providing a visual inspection apparatus comprising an elongated inspection module, a camera assembly and a hand graspable control and display module, the camera assembly including an imaging sensor and a lens focusing an image of an industrial equipment article onto said imaging sensor, the hand graspable control and display module being disposed at a proximal end of said elongated inspection module, said hand graspable control and display module including a display and a user interface, the user interface enabling a user to input commands into said apparatus, said user interface further enabling said inspector to control a position of said elongated inspection module relative to an industrial equipment article being inspected, wherein said apparatus is configured to operate in a measurement mode in which cursors can be positioned on said display for enabling an inspector to designate an area of a displayed image to be subject to a distance measurement, the apparatus further being configured so that said apparatus can calculate a distance measurement between a pair of points designated to be subject to a distance measurement by placement of said cursors;

(b) providing a form builder configured for use by persons without any understanding of programming languages;

(c) without typing any code into said form builder defining with use said form builder a form having at least one of a graphical depiction of an industrial equipment article, a set of hot buttons of a certain number, and a stage definition;

(d) opening the form built at step (c) to initiate an inspection procedure application;

(e) utilizing the form built at step (c) to generate a user interactive report form, the user interactive report form having at least one of (i) a graphical depiction of said equipment article (ii) said certain number of hot buttons or (iii) a number of hot buttons corresponding to said stage definition; and (f) transferring said user interactive report form generated at step (e) to an external computer.

Q1. A method for performing inspection of a desired region of an industrial component, comprising the steps of:

(a) providing at least one template for conducting the inspection in the form of an electronic image selected from the group of electronic images consisting of: an electronic manual describing the industrial component and a series of user-readable instructions for carrying out inspection;

(b) providing an inspection apparatus comprising an elongated inspection module and a control and display module;

(c) disposing the inspection module near the desired region;

(d) manipulating the control and display module to cause the inspection module to sense an inspection condition of the desired region;

(e) saving data from the inspection module along with data reflecting the sensed inspection condition;

(f) automatically generating at said apparatus a user-interactive report of the performed inspection from said saved data.

Q2. A method according to (Q1), wherein steps (a), (b), (c), (d), and (e) are performed in any desired sequence.

Q3. A method according to (Q1), wherein the sensed inspection condition is an inspection condition selected from the group of inspection conditions consisting of: (1) distance measurement; (2) temperature measurement; (3) X-ray measurement; (4) eddy current measurement; (5) ultrasound measurement; (6) visual inspection; and (7) laser ultrasound measurement.

Q4. A method according to (Q1), further comprising the step of using said control and display module to initiate a corrective action on said industrial component desired region based on said visual inspection.

Q5. A method according to (Q1), wherein the corrective action is one selected from the group of corrective actions consisting of: (1) grinding: (2) cleaning; (3) cutting; (4) grasping; (5) stapling; and (6) nitrogen purging.

Q6. A method according to (Q1), further comprising the step of automatically sending said report from said apparatus to an external computer.

Q7. A method according to (Q1), wherein said industrial component is selected from the group of industrial components consisting of: (1) vehicle engine; (2) power plant; and (3) fluid conduit.

AA1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, including commands to collect an image file comprising a representation of said industrial equipment article, and to collect a video file comprising a representation of said industrial equipment article, said apparatus further being configured to enable said inspector to control a position of said elongated inspection module relative to an industrial equipment article being inspected;

wherein said apparatus is also configured in a mode in which said apparatus associates metadata to media files that are collected in response to a user input command, whether said media files are image media files or video media files, the apparatus when associating metadata to a media file at least one of writes the metadata to a text file or to said media file, the metadata including an equipment article identifier, wherein said apparatus is configured to send collected media files having associated metadata to a computer external to said apparatus.

AA2. The apparatus of AA1, wherein said apparatus runs an application prompting an inspector to complete at least one of a stage and a step of an inspection procedure.

AA3. The apparatus of AA1, wherein said apparatus associates a media files that is designated for collection with metadata relating to media file by writing both the metadata and a reference to the designated media file to a common text file.

AA4. The apparatus of AA1, wherein said apparatus associates a media files that is designated for collection with metadata relating to media file by establishing a common naming scheme between a media file and a text based document including said metadata.

AA5. The apparatus of AA1, wherein said apparatus is configured to parse said metadata from a form displayed by said apparatus for use in guiding an inspector in the collection of media files.

AA6. The apparatus of AA1, wherein said apparatus reads said equipment article identifier from an inspector guide application running on said apparatus for guiding an inspector.

AA7. The apparatus of AA1, wherein said apparatus is configured to enable to enable an inspector to enter said equipment article identifier into said apparatus.

AA8. The apparatus of AA1, wherein said equipment article identifier is an equipment serial number.

AA9. The apparatus of AA1, wherein said metadata further includes metadata selected from the group consisting of an inspector identifier and a site identifier.

AA10. The apparatus of AA1, wherein said metadata further includes sensor output metadata selected from the group consisting of location data and temperature data.

AA11. The apparatus of AA1, wherein said apparatus is configured to run an application guiding an inspector to collect a plurality of media files, wherein said apparatus is further configured to associate metadata including equipment article identifier metadata with each media file collected.

AA12. The apparatus of AA1, wherein said apparatus includes control interface having a joystick and a plurality of buttons.

AA13. The apparatus of AA1, wherein said apparatus includes a control interface having a touch screen overlay.

BB1. An apparatus for performance of visual inspection respecting an industrial equipment article, the apparatus comprising:
an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;
wherein said apparatus is also configured in a mode in which said apparatus associates metadata to media files that are collected in response to a user input command, the apparatus when associating metadata to a media file at least one of writes the metadata to a text or to said media file, the apparatus displaying a data entry field in which an inspector can enter data, the apparatus being configured to associate as metadata to a media file that is collected file data entered into said data entry field by an inspector.

BB2. The apparatus of BB1, wherein said apparatus runs an application prompting an inspector to complete at least one of a stage and a step of an inspection procedure.

BB3. The apparatus of BB1, wherein said apparatus is configured to send said collected media file and said associated metadata to a computer external to said apparatus.

BB4. The apparatus of BB1, wherein said apparatus displays a form including said data entry field.

CC1. An apparatus for performance of visual inspection respecting an industrial equipment article, the apparatus comprising:
an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;
wherein said apparatus is also configured in a mode in which said apparatus associates media files that are collected in response to a user input command with metadata, the apparatus being configured to associate as metadata to a collected media file both inspector input data input into said apparatus by an inspector and sensor output data output by a sensor.

CC2. The apparatus of CC1, wherein said sensor output data includes data output from a sensor on-board said apparatus.

CC3. The apparatus of CC1, wherein said sensor output data includes data output from a sensor off-board relative to said apparatus.

CC4. The apparatus of CC1, wherein said sensor output data includes data output from a location sensor.

CC5. The apparatus of CC1, wherein said apparatus is configured to send said collected media file and said associated metadata to a computer external to said apparatus.

CC6. The apparatus of CC1, wherein said apparatus is configured so that said apparatus when associating metadata to a media file writes the metadata to at least one of a text file or to said media file.

DD1. An apparatus for performance of visual inspection respecting an industrial equipment article, the apparatus comprising:
an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;
wherein said apparatus is also configured in a mode in which said apparatus associates media files that are collected in response to a user input command with metadata, the apparatus being configured to associate as metadata when said media files are collected sensor output data output by a sensor, the apparatus further being configured to send a collected media file having associated sensor output metadata to a computer external to said apparatus.

DD2. The apparatus of DD1, wherein said apparatus runs an application prompting an inspector to complete at least one of a stage and a step of an inspection procedure.

DD2.5 The apparatus of DD1, when said apparatus is configured to further associate as metadata data entered into said apparatus by an inspector.

DD3. The apparatus of DD1, wherein said sensor output data includes data output from a sensor on-board said apparatus.

DD4. The apparatus of DD1, wherein said sensor output data includes data output from a sensor off-board relative to said apparatus.

DD5. The apparatus of DD1, wherein said sensor output data includes data output from a location sensor.

DD6. The apparatus of DD1, wherein said apparatus is configured to send collected media file having associated sensor output metadata responsively to a request from an external computer.

DD7. The apparatus of DD1, wherein said apparatus is configured to send collected media file having associated sensor output metadata responsively to a collection of said media file by said apparatus.

DD8. The apparatus of DD1, wherein said apparatus is configured to send collected media file having associated sensor output metadata responsively to a completion of an inspection procedure in which an inspector is guided to collect a plurality of media files.

DD9. The apparatus of DD1, wherein said apparatus is configured so that said apparatus when associating metadata to a media file writes the metadata to at least one of a text file or to said media file.

EE1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is configured to run an application for guiding an inspector to perform an inspection procedure and wherein said apparatus is configured so that said apparatus associates a media file that is collected in response to a user input command with metadata as part of completing said inspection procedure, the apparatus being configured to associate as metadata to said collected media file data read from said application for guiding an inspector.

EE2. The apparatus of EE1, wherein said apparatus runs an application prompting an inspector to complete at least one of a stage and a step of an inspection procedure.

EE3. The apparatus of EE1, wherein said application for guiding said inspector utilizes forms.

EE4. The apparatus of EE1, wherein said apparatus is configured to send said collected media file and said associated metadata to a computer external to said apparatus.

EE5. The apparatus of EE1, wherein said apparatus is configured so that said apparatus when associating metadata and a media file writes the metadata to at least one of a text file or to said media file.

FF1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured in a mode in which said apparatus tags media files that are collected in response to a user input command with metadata, the apparatus displaying a form for use in guiding an inspector in collecting media files, the form including a representation of said industrial equipment article, the metadata being at least one of (1) data that is read from said form without being input by an inspector and (2) data input into said form by an inspector, wherein said apparatus is configured so that said apparatus when associating metadata to a media file writes the metadata to at least one of a text file or to said media file.

GG1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate in accordance with an application in which an inspector is guided through an inspection procedure having a plurality of steps, wherein at least one of said steps is to complete a measurement by operating said apparatus in a measurement mode, the apparatus guiding an inspector in completing an inspection procedure by displaying on said display a depiction of an equipment article while said inspection procedure is being completed by said inspector, and further displaying on said display a data entry field, the apparatus associating as metadata media files collected by an inspector during execution of said inspection procedure data that is input into said displayed data entry field by an inspector, so that a media file that is transferred from said apparatus to an external computer has associated therewith as metadata data entered into said data entry field by said inspector.

HH1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is configured to operate in accordance with an application wherein an inspector is guided through an inspection procedure having a plurality of steps, the apparatus in accordance with the application retaining a list representing steps of said inspection procedure that are to be performed by an inspector, the apparatus processing data received by said apparatus to determine whether a step of said procedure has been performed, the apparatus updating a screen display displayed on said display to provide positive feedback to said inspector when said apparatus determines that a step of said procedure has been completed, said apparatus further processing data received by said apparatus to determine with reference to said list whether said inspection procedure has been completed and updating a screen display to provide positive feedback to said inspector when said apparatus determines that said procedure has been completed.

HH2. The apparatus of HH1, wherein said application is coded utilizing HTML forms.

II1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate in accordance with an application wherein an inspector is guided through an inspection procedure having a plurality of steps, wherein at least one of said steps is to complete a measurement by operating the apparatus in accordance with the application examining data received by said apparatus to determine whether data received by said apparatus indicates that an inspector has made an error in attempting to complete one of said steps, said apparatus updating a screen display displayed on said display to provide negative feedback to said inspector when said apparatus determines that said inspector has made an error in attempting to complete a step of said inspection procedure.

II2. The apparatus of II1, wherein said updating includes changing an appearance of text describing a step of said procedure.

II3. The apparatus of II1, wherein said apparatus in examining said data examines a file type of a collected media file.

II4. The apparatus of II1, wherein said apparatus in examining said data examines a file length of a collected media file.

II5. The apparatus of II1, wherein said apparatus in examining said data examines file data of a collected media file.

JJ1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application retaining a list representing steps of said inspection procedure that are to be performed by an inspector for completion of said inspection procedure, the apparatus in accordance with the application examining data received by said apparatus to determine whether data received by said apparatus indicates that an inspector has made an error in attempting to complete one of said steps, said apparatus updating a screen display displayed on said display to provide positive feedback to said inspector when said apparatus determines that said inspector has successfully completed a step of said inspection procedure.

JJ2. The apparatus of JJ1, wherein said updating includes changing an appearance of text describing a step of said procedure.

JJ3. The apparatus of JJ1, wherein said apparatus in examining said data examines a file type of a collected media file.

JJ4. The apparatus of JJ1, wherein said apparatus in examining said data examines a file length of a collected media file.

JJ5. The apparatus of JJ1, wherein said apparatus in examining said data examines file data of a collected media file KK1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate is accordance with an application wherein an inspector is guided through an inspection procedure having a plurality of steps, wherein at least one of said steps is to complete a measurement by operating said apparatus in said measurement mode, the apparatus in accordance with the application disabling an exit function normally provide by actuation of said actuator of said control and display module when said application is initiated so that when said application is initiated actuation of said certain actuator by an inspector does not result in exiting of said application, the functioning associated with said certain actuator being configured so that when said certain actuator is actuated during execution of said application but prior to completion of said steps, said apparatus provides negative feedback indicating to an inspector performing said inspection procedure that said inspection procedure has not been completed.

KK2. The apparatus of KK1, wherein said negative feedback is in the form of a displayed message on said display of said control and display module.

KK3. The apparatus of KK1, wherein said apparatus is configured so that when said certain actuator is actuated during execution of said application but prior to completion of said steps, sends an message to an external computer indicating that an inspector has attempted to exit a procedure prior to completion of a procedure.

LL1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate in accordance with an application in which an inspector is guided through an inspection procedure having a plurality of stages, each stage corresponding to a different area of said inspection article, the apparatus in guiding an inspector in completing an inspection procedure displaying on said display a depiction of said equipment article together with indicators disposed to indicate different areas of said equipment article, at least one of said indicators indicating that a certain area of said equipment article requires inspection.

LL2. The apparatus of LL1, said apparatus being configured so that an appearance of at least one of said indicators is responsive to data collected by said inspection apparatus.

LL3. The apparatus of LL1, wherein at least one of the indicators indicates that a certain area of said equipment article one of (1) does not require inspection or (2) has already been inspected.

LL4. The apparatus of LL1, wherein said indicators are provided by hotspots.

LL5. The apparatus of LL1, wherein said application is coded utilizing at least one form having a displayable component displayable with use of a browser program.

AAA1. A method for operating a visual inspection system having a visual inspection apparatus of the type including an elongated inspection module adapted to be articulated by an inspector, and a two dimensional image sensor generating image signals, said method comprising the step of:

(a) providing an inspector guide application for running on said visual inspection apparatus that guides an inspector in completing an inspection by presenting prompts prompting said inspector to complete at least one of a plurality of stages and a plurality of steps:

(b) associating metadata to a media file collected during completion of said inspection procedure the media file including file data and, the metadata including at least one of stage indicator and a step indicator;

(c) examining at least one of said file data and said associated metadata referred to in step (b) to determine whether at least one of a stage indicated by said stage indicator and a step indicated by said step indicator is to be selectively enabled; and (d) modifying said inspector guide application responsively to said examining step (c).

AAA2. The method of AAA1, wherein said system in which said apparatus is incorporated is configured so that said examining step is executed automatically.

AAA3. The method of AAA1, wherein said system in which said apparatus is incorporated is configured so that said examining step can be caused to be actuated by an inspector operating said inspection apparatus.

AAA4. The method of AAA1, wherein said system in which said apparatus is incorporated is configured so that said examining step can be caused to be actuated by a supervisor operating a workstation computer spaced apart from said inspection apparatus.

AAA5. The method of AAA1, wherein said examining step including the step of applying a time stamp criteria.

AAA6. The method of AAA1, wherein said examining step includes the step of applying a file quality criteria.

AAA7. The method of AAA1, wherein said examining step includes the step if applying a represented feature criteria.

AAA8. The method of AAA1, wherein said modifying step includes the step of modifying said inspector guide application so that a prompt for a stage indicated in said stage indicator is either not presented or is presented in such manner that said inspector is informed that said stage indicated by said stage indicator need not be performed.

AAA9. The method of AAA1, wherein said modifying step includes the step of modifying said inspector guide application so that a prompt for a step indicated in said step indicator is either not presented or is presented in such manner that said inspector is informed that said step indicated by said step indicator need not be performed.

AAA10. The method of AAA1, wherein said providing step includes the step of providing an inspector guide application so that an inspector is prompted to complete a certain number of steps, and wherein said modifying step includes the step of modifying said inspector guide application so that said inspector is prompted to perform less than said certain number of steps.

BBB1. An apparatus for performance of visual inspection respecting an industrial equipment article, the apparatus comprising:
an elongated inspection module, a two dimensional image sensor generating image signals, and a display, the apparatus being configured to enable an inspector to input commands into said apparatus including commands to collect an image file comprising a representation of said industrial equipment article, and to collect a video file comprising a representation of said industrial equipment article, said apparatus further being configured to enable said inspector to control a position of said elongated inspection module relative to an industrial equipment article being inspected;
wherein said apparatus is configured so that when a media file is collected metadata is associated with the collected media file, the metadata including at least one of a stage identifier and a step identifier.

CCC1. A data structure for use in an inspection system in which an articles is inspected, the data structure comprising:
a media file selected from the group consisting of an image file and a video file; and
metadata associated with the media file, the metadata being selected from the group consisting of a stage identifier and a step identifier, the stage identifier identifying area of said article, the step identifier identifying a step of a procedure for inspecting said article.

CCC2. The data structure of CCC1, wherein said metadata includes both of said stage identifier and said step identifier.

CCC3. The data structure of CCC1, wherein said metadata is at least one of written to said media file or to a text file.

DDD1. A system for use in conducting an inspection of an equipment article, said system comprising:
(a) an inspection apparatus for use in conducting inspections of an equipment article, said inspection apparatus being configured to run an inspector guide application for guiding an inspector in the performance of an inspection procedure relating to said equipment article, said inspector guide application presenting an inspector with a plurality of prompts;
(b) wherein said system is adapted so that said system can examine data collected by said apparatus during a first running of said inspector guide application; and
(c) wherein said system, responsively to said examination of said data collected during said first running of said inspector guide application, modifies said inspector guide application so that a behavior of said apparatus when running said inspector guide application after said inspector guide application is modified is different than a behavior of said apparatus during said first running of said inspector guide application.

DDD2. The system of DDD1, wherein said system includes a user interface for use by a user of said system, said user interface enabling said user to define a criteria for use in examining said data collected by said apparatus.

DDD3. The system of DDD2, wherein said user interface is incorporated into said inspection apparatus.

DDD4. The system of DDD2, wherein said user interface is incorporated into a supervisor work station spaced apart from said inspection apparatus.

DDD5. The system of DDD1, wherein said system is adapted to examine data collected by said apparatus based on criteria selected from the group consisting of a timestamp criteria, a quality criteria and a represented feature criteria.

DDD6. The system of DDD1, wherein said system includes a first user interface at said apparatus for enabling an inspector to define criteria for use in examining said data collected by said apparatus, and a second user interface at a work station spaced apart from said apparatus for enabling a supervisor to define criteria for use in examining said data collected by said apparatus.

DDD7. The system of DDD6, wherein said system is configured so that a first set of controls are made available with use of said first user interface and a second set of controls are made available with use of said second user interface, wherein second set of controls available to a supervisor include at least one control not among said first set of controls.

DDD8. The system of DDD6, wherein said system is configured so that a first set of controls are made available with use of said first user interface and a second set of controls are made available with use of said second user interface, the first set of controls being different from said second set of controls.

DDD9. The system of DDD1, wherein said inspection apparatus is a visual inspection apparatus.

EEE1. A method for operating an inspection system comprising a visual inspection apparatus having an elongated inspection module, the method comprising the steps of:
running an inspector guide application on said inspection apparatus to guide an inspector in performing a plurality of steps of an inspection procedure relating to an equipment article, wherein inspection apparatus while running said inspector guide application prompts an inspector to perform a certain step;

examining at a computer external from said inspection apparatus at least one of file data of a media file collected pursuant to said performance of said certain step, or metadata associated with said media file wherein said examining step includes the step of applying a step enabling criteria;

if said examining step indicates that said at least one of said file data and saved metadata satisfies said criteria sending a communication from said external computer to said inspection apparatus to indicate that said step enabling criteria has been satisfied; and causing said inspection apparatus to re-prompt for completion of said certain step responsively to receipt of said communication.

EEE2. The method of EEE1, wherein said system is configured so that said causing step can be executed prior to completion of said inspection procedure.

EEE3. The method of EEE1, wherein said examining said media file step includes the step of examining metadata associated with said media file.

EEE4. The method of EEE1, wherein said examining step including the step of applying a time stamp criteria.

EEE5. The method of EE1, wherein said examining step includes the step of applying a file quality criteria.

EEE6. The method of EEE1, wherein said examining step includes the step if applying a file represented feature criteria.

FFF1. A method for operating an inspection apparatus having an elongated inspection module and an image sensor, the method comprising the steps of:

providing an inspector guide application so that said inspector guide application can be modified responsively to an output from a data output device, the inspector guide application being configured to guide an inspector to complete at least one of stages and steps of an inspection procedure for inspecting an equipment article;

reading an output from and data output device; and responsively to said output modifying said inspector guide application to selectively enable at least one of a set of stages and a set of steps of said inspector guide application; and running said inspector guide application on said inspection apparatus as modified in said modifying step to guide an inspector in performing an inspection.

FFF2. The method of FFF1, wherein said reading step includes the step of reading an output of a real time clock.

FFF3. The method of FFF2, wherein said reading step includes the step of reading an output from a sensor.

FFF4. The method of FFF2, wherein said reading step includes the step of reading an output from a sensor provided by a temperature sensor.

GGG1. An apparatus for performance of visual inspection respecting an industrial equipment article, the apparatus comprising:

an elongated inspection module, a two dimensional image sensor generating image signals, a control interface, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate in accordance with an inspection procedure application in which an inspector is guided through an inspection procedure, said apparatus in accordance with said application prompting an inspector to conduct said inspection procedure in a series of stages wherein data relating to a different physical area of said equipment article is to be collected during execution of each stage, wherein said apparatus is configured to utilize a stage definition of said inspection procedure application in order to automatically establish a directory structure corresponding to said series of stages so that a file collected during execution of said inspection procedure is saved into a directory corresponding to a stage being executed during collection of the file.

GGG2. The apparatus of GGG1, wherein said control interface includes a joystick and a plurality of buttons.

GGG3. The apparatus of GGG1, wherein said control interface includes a touch screen overlay.

HHH1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured in a mode in which said apparatus displays on said display a form including a depiction of said industrial equipment article and a plurality of hot spots disposed on said form, the apparatus further being configured allocate a set of file directories corresponding to said plurality of hot spots, the apparatus further being configured so a media file that is collected is stored to a certain one of said set of file directories, the certain one directory being determined by which of said hotspots was most recently actuated.

HHH2. The apparatus of HHH1, wherein said hot spot is superimposed on said depiction of said industrial equipment article.

III1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;

wherein said apparatus is also configured to operate in accordance with an inspection procedure application in which an inspector is guided through an inspection procedure having a plurality of steps, wherein at least one of said steps is to complete a measurement by operating said apparatus in said measurement mode, wherein said apparatus is configured so that subsequent to initiation of said inspection procedure application and prior to completion of said procedure, said apparatus generates a user-interactive report enabling an inspector to review results of said inspection procedure prior to completion of said inspection procedure, the report including hot spots which when actuated result in at least one of (i) a collected media files being opened or (ii) a depiction of a collected media file being displayed, the apparatus being configured to automatically send said report to at least one computer external with said apparatus.

III2. The apparatus of III1, wherein said report includes a graphical depiction of an equipment article.

III3. The apparatus of III1, wherein said graphical depiction is an isometric view.

III4. The apparatus of III1, wherein said graphical depiction is an image collected by an inspection apparatus.

III5. The apparatus of III1, wherein said apparatus is configured to automatically send each file collected by said apparatus during execution of said inspection procedure to an external computer prior to collection of a next file.

JJJ1. A system for use in a visual inspection system in which media files respecting an equipment article are collected, the system comprising:

an inspection apparatus comprising an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected; and a user interactive form builder for use in building at least one form for display on said display of said hand graspable display and control module for use in guiding an inspector in performing an inspection procedure for inspecting an equipment article, the form builder being configured for use by a developer without any understanding of programming languages and being configured to build said at least one form without typing of any program code into said form builder, the form builder enabling a developer to define, without typing of any program code into said form builder at least one of: (a) graphic of said at least one form, (b) a hot spot of said at least one form, (c) a data entry area of said at least one form, and (d) a stage definition for said instruction procedure.

JJJ2. The system of JJJ1 wherein, said interactive form builder enables a developer to define a set of steps to be performed in an inspection procedure.

KKK1. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected, and wherein said apparatus is configured in a mode in which said apparatus displays on said display a form including a depiction of said industrial equipment article and a plurality of inspector actuatable hot spots superimposed in said form, the apparatus further being configured to allocate a set of file directories corresponding to said plurality of hot spots, the apparatus further being configured so a media file that is collected is saved to a certain one of said set of file directories, the certain one directory being determined by which of said hotspots was most recently actuated.

KKK2. The apparatus of KKK1, where said hot spots are disposed to designate different areas of same industrial equipment article.

LLL1. A procedure form builder for use in a building a form for use in guiding a user in the collection of media files while using a visual inspection apparatus for inspecting an industrial equipment article, the form builder including:

an image selection area enabling a developer to designate an image as a root form image, the form builder being configured so that the designated root form image can be an industrial equipment article, the form builder creating a root form including said designated image;

the form builder further allowing a form developer to establish on said root form a series of hot spots, each hot spot corresponding to an area of said industrial equipment article to be subject to inspection.

LLL2. The procedure form builder of LLL1, further enabling the developer to designate links associates with each hot spot.

LLL3. The procedure form builder of LLL1, wherein said procedure form builder enables a developer to define a sub-form hyperlinked to said root form by way of one of said defined hot spots.

LLL4. The procedure form builder of LLL1, wherein said procedure form builder enables said form builder to select a live view as a hyperlink associated with a hot spot.

LLL5. The procedure form builder of LLL1, wherein said procedure form builder enabled said form developer to select a live view with superimposed measurement view as a hyperlink associated with a hot spot.

LLL6. The procedure form builder of LLL1, wherein said form builder attaches script to a form built by said form builder so that when said a form is opened at a visual inspection apparatus said script is run.

LLL7. The procedure form builder of LLL1, enabling a form developer to create a set of hyperlinked forms having a hierarchical tree structure, and wherein said form builder attaches script to a form of said set of forms for execution by a visual inspection apparatus to create a set of file directories corresponding to a hierarchical tree structure of said set of forms.

MMM1. An apparatus for performance of visual inspection respecting an industrial equipment article, the apparatus comprising:

an elongated inspection module, a two dimensional image sensor generating image signals, a control interface, and a display, the apparatus being configured to enable an inspector to input commands into said apparatus, said apparatus further being configured to enable said inspector to control a position of said elongated inspection module relative to an industrial equipment article being inspected, and wherein said apparatus is also configured in a mode in which said apparatus generates a report including (i) a plurality of media files; and (ii) a root record form including a depiction of said industrial equipment article subject to visual inspection, the root record form having a series of hot spots defined on said equipment article depiction, the report being configured so that when said form is displayed, and a one of said hot spots is actuated, a media file corresponding to said one hot spot is opened.

NNN1. A method for providing a labeled and searchable file in an industrial visual inspection system, the method comprising:

(a) providing an apparatus for performance of visual inspection respecting an industrial equipment article, the apparatus comprising:

an elongated inspection module, a two dimensional image sensor generating image signals, a control interface, and a display, the apparatus being configured to enable an inspector to input commands into said apparatus, said apparatus further being configured to enable said inspector to control a position of said elongated inspection module relative to an industrial equipment article being inspected;

(b) providing a form builder configured for use by persons without any understanding of programming languages;

(c) without typing any code into said form builder defining with use said form builder an HTML form having a data entry field;

(d) opening the form on the apparatus;

(e) receiving in said data entry field data input into said data entry field by an inspector conducting an inspection of an industrial equipment article;

(f) associating the received data entered into said data entry field by an inspector at step (e) as metadata with a media file to collect at said apparatus, in response to input of a command by said inspector, a metadata-associated media file; and (g) transferring said metadata-associated media file to an external computer external to said apparatus.

OOO1. A method for development and dissemination of data in an industrial visual inspection system, the method comprising:

(a) providing an apparatus for performance of visual inspection respecting an industrial equipment article, the apparatus comprising an elongated inspection module, a two dimensional image sensor generating image signals, a control interface, and a display, the apparatus being configured to enable an inspector to input commands into said apparatus, said apparatus further being configured to enable said inspector to control a position of said elongated inspection module relative to an industrial equipment article being inspected;

(b) providing a form builder configured for use by persons without any understanding of programming languages;

(c) without typing any code into said form builder defining with use said form builder a form having at least one of a graphical depiction of an industrial equipment article, a set of hot buttons of a certain number, and a stage definition;

(d) opening the form built at step (c) to initiate an inspection procedure application;

(e) utilizing the form built at step (c) to generate a user interactive report form, the user interactive report form having at least one of (i) a graphical depiction of said equipment article (ii) said certain number of hot buttons or (iii) a number of hot buttons corresponding to said stage definition; and (f) transferring said user interactive report form generated at step (e) to an external computer.

It has been noted that features described herein can be incorporated into visual inspection systems other than industrial equipment article visual inspection systems. It has also been indicated, as noted with references to non-visual inspection systems that features described herein can also find use in inspection systems other than visual inspection systems. The term "adapted" herein has the same meaning as the term "configured".

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

While methods and apparatuses have been described herein having a particular number of elements, it is understood in every instance the described method or apparatus can be practiced with less than the specifically described number of elements. While the present invention has been particularly shown and described with reference to the preferred mode as illustrated in the drawings, it will be understood by one skilled in the art that various changes in detail may be effected therein without departing from the spirit and scope of the invention as defined by claims that can be supported by the present description and drawings.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An apparatus for performance of visual inspection respecting an industrial equipment article, the apparatus comprising:

an elongated inspection module, a two dimensional image sensor generating image signals, and a display, wherein said apparatus is configured to enable an inspector to input commands into said apparatus, wherein said apparatus is further configured to enable said inspector to control a position of said elongated inspection module relative to an industrial equipment article being inspected, wherein said apparatus is also configured to execute a measurement mode in which said apparatus embeds metadata in media files that are collected in response to a command input by said inspector during steps of an inspection procedure, wherein the measurement mode displays a data entry field in which said inspector can enter data, wherein the metadata comprises data entered into said data entry field by said inspector, and wherein said apparatus, during execution of the measurement mode, is configured to modify the display for subsequent steps of the inspection procedure based on the metadata.

2. The apparatus of claim 1, wherein said apparatus is configured to send said collected media file and said associated metadata to a computer external to said apparatus.

3. The apparatus of claim 1, wherein said apparatus displays a form including said data entry field.

4. An apparatus for performance of visual inspection respecting an industrial equipment article, the apparatus comprising:

an elongated inspection module, a two dimensional image sensor generating image signals, and a display, the apparatus being configured to enable an inspector to input commands into said apparatus during an inspection procedure, said apparatus further being configured to enable said inspector to control a position of said elongated inspection module relative to an industrial equipment article being inspected;

wherein said apparatus is also configured in a measurement mode in which said apparatus embeds metadata in media files that are collected in response to a user input command, wherein the metadata comprises data entered into said data entry field by said inspector and sensor output data output by a sensor, wherein said apparatus, during execution of the measurement mode, is configured to modify the display for subsequent steps of the inspection procedure based on the metadata.

5. The apparatus of claim 4, wherein said sensor output data includes data output from a sensor on-board said apparatus.

6. The apparatus of claim 4, wherein said sensor output data includes data output from a sensor off-board relative to said apparatus.

7. The apparatus of claim 4, wherein said sensor output data includes data output from a location sensor.

8. The apparatus of claim 4, wherein said apparatus is configured to send said collected media file and said associated metadata to a computer external to said apparatus.

9. The apparatus of 4, wherein said apparatus is configured so that said apparatus when associating metadata to a media file writes the metadata to at least one of a text file or to said media file.

10. An apparatus for performance of visual inspection respecting an industrial equipment article, the apparatus comprising:
- an elongated inspection module, a two dimensional image sensor generating image signals, and a display, the apparatus being configured to enable an inspector to input commands into said apparatus, said apparatus further being configured to enable said inspector to control a position of said elongated inspection module relative to an industrial equipment article being inspected;
- wherein said apparatus is also configured to operate in accordance with a measurement mode that embeds metadata in media files, wherein an inspector is guided through an inspection procedure having a plurality of steps to capture the media files, the measurement mode disabling an exit function normally provided by actuation of said actuator of said control and display module when said application is initiated so that when said measurement mode is initiated actuation of said certain actuator by an inspector does not result in exiting of said measurement mode, the functioning associated with said certain actuator being configured so that when said certain actuator is actuated during execution of said application but prior to completion of said steps, said apparatus provides negative feedback indicating to an inspector performing said inspection procedure that said inspection procedure has not been completed,
- wherein said apparatus is configured to use metadata that comprises data entered into a data entry field by said inspector and is embedded in the captured media files during execution of the measurement mode, and
- wherein said apparatus, during execution of the measurement mode, is configured to modify the display for subsequent steps of the inspection procedure based on the metadata.

11. The apparatus of 10, wherein said negative feedback is in the form of a displayed message on said display of said control and display module.

12. The apparatus of 10, wherein said apparatus is configured so that when said certain actuator is actuated during execution of said application but prior to completion of said steps, sends an message to an external computer indicating that an inspector has attempted to exit a procedure prior to completion of a procedure.

* * * * *

UNITED STATES PATENT AND TRADEMARK OFFICE
CERTIFICATE OF CORRECTION

PATENT NO. : 8,368,749 B2  
APPLICATION NO. : 11/645082  
DATED : February 5, 2013  
INVENTOR(S) : Lambdin et al.

It is certified that error appears in the above-identified patent and that said Letters Patent is hereby corrected as shown below:

In the Specifications:

In Column 2, Line 42, delete "joystick." and insert -- joystick; --, therefor.

In Column 3, Line 27, delete "spot." and insert -- spot; --, therefor.

In Column 5, Line 10, delete "this," and insert -- this --, therefor.

In Column 10, Lines 13-14, delete "Flash/PCMCLA/PC" and insert -- Flash/PCMCIA/PC --, therefor.

In Column 17, Lines 48-49, delete "interface 1602" and insert -- interface 1604 --, therefor.

In Column 18, Line 40, delete "interface 1602" and insert -- interface 1604 --, therefor.

In Column 20, Line 44, delete "ARLEADY" and insert -- ALREADY --, therefor.

In Column 21, Line 11, delete "associated 1" and insert -- associated --, therefor.

In Column 28, Line 28, delete "C:\SN1234MARCH27917STAGE 3" and insert -- C:\SN1234MARCH27917\STAGE 3 --, therefor.

In Column 52, Line 14, delete "(c1)," and insert -- (C1), --, therefor.

In Column 53, Line 31, delete "(e1)," and insert -- (E1), --, therefor.

In Column 53, Line 34, delete "(e1)," and insert -- (E1), --, therefor.

In Column 53, Line 37, delete "an message" and insert -- a message --, therefor.

Signed and Sealed this  
Twenty-third Day of April, 2013

Teresa Stanek Rea  
*Acting Director of the United States Patent and Trademark Office*

CERTIFICATE OF CORRECTION (continued)
U.S. Pat. No. 8,368,749 B2

In Column 65, Line 47, delete "media file" and insert -- media file. --, therefor.

In Column 66, Line 14, delete "an message" and insert -- a message --, therefor.

In Column 69, Line 25, delete "EE1," and insert -- EEE1, --, therefor.

In Column 70, Line 38, delete "I111." and insert -- III1. --, therefor.

In Column 71, Line 33, delete "JJJ1 wherein," and insert -- JJJ1, wherein --, therefor.

In Column 71, Line 56, delete "where" and insert -- wherein --, therefor.

In the Claims:

In Column 75, Line 6, in Claim 9, delete "of 4," and insert -- of claim 4, --, therefor.

In Column 76, Line 18, in Claim 11, delete "of 10," and insert -- of claim 10, --, therefor.

In Column 76, Line 21, in Claim 12, delete "of 10," and insert -- of claim 10, --, therefor.

In Column 76, Line 24, in Claim 12, delete "an message" and insert -- a message --, therefor.